(12) United States Patent
Vastmans et al.

(10) Patent No.: US 9,310,578 B2
(45) Date of Patent: Apr. 12, 2016

(54) ENCLOSURE FOR PROVIDING POWER AND DATA TO A REMOTE RADIO HEAD

(71) Applicants: Tyco Electronics Raychem BVBA, Kessel-Lo (BE); Tyco Electronics UK Ltd., Swindon, Wiltshire (GB); Tyco Electronics AMP GmbH, Berlin (DE); ADC Czech Republic, s.r.o., Brno (CZ)

(72) Inventors: Kristof Vastmans, Boutersem (BE); Ian Miles Standish, Flintshire (GB); Sven Schuemann, Berlin (DE); Eberhard Kahle, Hoppegarten (DE); Juraj Marak, Calovec (SK); Pieter Arthur Anna De Vos, Berchem (BE)

(73) Assignees: CommScope Connectivity Belgium BVBA (BE); CommScope Connectivity UK Limited (GB); ADC Czech Republic S.R.O. (CZ); CommScope Technologies LLC, Hickory, NC (US)

( * ) Notice: Subject to any disclaimer, the term of this patent is extended or adjusted under 35 U.S.C. 154(b) by 0 days.

(21) Appl. No.: 14/800,878

(22) Filed: Jul. 16, 2015

(65) Prior Publication Data

US 2016/0033730 A1    Feb. 4, 2016

Related U.S. Application Data

(63) Continuation of application No. 13/632,781, filed on Oct. 1, 2012, now Pat. No. 9,106,981.

(60) Provisional application No. 61/542,514, filed on Oct. 3, 2011.

(51) Int. Cl.
*G02B 6/00*    (2006.01)
*G02B 6/10*    (2006.01)
(Continued)

(52) U.S. Cl.
CPC ............ *G02B 6/4448* (2013.01); *G02B 6/4477* (2013.01); *H02G 15/10* (2013.01)

(58) Field of Classification Search
CPC ............ G02B 6/36; G02B 6/00; G02B 6/255; B23P 13/00; H05K 13/00
USPC ........ 385/131–139, 147; 361/679.01; 174/59; 362/231, 311, 267, 294
See application file for complete search history.

(56) References Cited

U.S. PATENT DOCUMENTS

| | | |
|---|---|---|
| 4,850,014 A | 7/1989 | Gillis et al. |
| 4,917,615 A | 4/1990 | Franks, Jr. |

(Continued)

FOREIGN PATENT DOCUMENTS

| | | |
|---|---|---|
| WO | WO 2008/074013 A2 | 6/2008 |
| WO | WO 2010/047920 A2 | 4/2010 |

OTHER PUBLICATIONS https://www.youtube.com/watch?v=Q6bOQKm61gY, uploaded May 22, 2011, Opterna FTTA Solution Part 02, Installation demo.

(Continued)

*Primary Examiner* — Akm Enayet Ullah
(74) *Attorney, Agent, or Firm* — Merchant & Gould P.C.

(57) ABSTRACT

Certain types of aggregation enclosures include cable input ports and downwardly angled cable output ports. A cover is pivotally coupled to the body so that the cover moves between an open position and a closed position. A modular component panel may be disposed within the enclosure. The component panel includes one or more distribution components (e.g., fiber distribution components or power distribution components) configured to connect at least a portion of an incoming cable to at least a portion of an outgoing cable.

21 Claims, 40 Drawing Sheets

(51) Int. Cl.
*G02B 6/44* (2006.01)
*H02G 15/10* (2006.01)
*G02B 6/255* (2006.01)
*B23P 13/00* (2006.01)
*H05K 13/00* (2006.01)

(56) References Cited

U.S. PATENT DOCUMENTS

| | | | |
|---|---|---|---|
| 5,497,444 A | 3/1996 | Wheeler | |
| 5,544,006 A | 8/1996 | Radloff et al. | |
| 5,717,810 A | 2/1998 | Wheeler | |
| 6,160,946 A | 12/2000 | Thompson et al. | |
| 6,591,051 B2 | 7/2003 | Solheid et al. | |
| 6,766,094 B2 | 7/2004 | Smith et al. | |
| 6,795,552 B1 | 9/2004 | Stanush et al. | |
| 6,798,967 B2 | 9/2004 | Battey et al. | |
| 6,815,612 B2 | 11/2004 | Bloodworth et al. | |
| 7,013,074 B2 | 3/2006 | Battey et al. | |
| 7,113,679 B2 | 9/2006 | Melton et al. | |
| 7,120,347 B2 | 10/2006 | Blackwell, Jr. et al. | |
| 7,264,402 B2 | 9/2007 | Theuerkorn et al. | |
| 7,292,763 B2 | 11/2007 | Smith et al. | |
| 7,370,187 B2 | 5/2008 | Yardumian et al. | |
| 7,397,997 B2 | 7/2008 | Ferris et al. | |
| 7,400,815 B2 | 7/2008 | Mertesdorf et al. | |
| 7,414,190 B2 | 8/2008 | Vo | |
| 7,416,349 B2 | 8/2008 | Kramer | |
| 7,480,437 B2 | 1/2009 | Ferris et al. | |
| 7,489,849 B2 | 2/2009 | Reagan et al. | |
| 7,499,622 B2 | 3/2009 | Castonguay et al. | |
| 7,539,387 B2 | 5/2009 | Mertesdorf et al. | |
| 7,539,388 B2 | 5/2009 | Mertesdorf et al. | |
| 7,619,160 B2 | 11/2009 | Grunwald et al. | |
| 7,650,055 B2 | 1/2010 | Cox et al. | |
| 7,653,282 B2 | 1/2010 | Blackwell, Jr. et al. | |
| 7,661,392 B2 | 2/2010 | Conger et al. | |
| 7,669,045 B2 | 2/2010 | Yardumian et al. | |
| 7,744,286 B2 | 6/2010 | Lu et al. | |
| 7,744,288 B2 | 6/2010 | Lu et al. | |
| 7,762,726 B2 | 7/2010 | Lu et al. | |
| 7,795,533 B2 | 9/2010 | Bravo et al. | |
| 7,941,027 B2 | 5/2011 | Mertesdorf et al. | |
| 7,942,590 B2 | 5/2011 | Lu et al. | |
| 7,959,361 B2 | 6/2011 | Lu et al. | |
| RE43,762 E | 10/2012 | Smith et al. | |
| 8,363,999 B2 | 1/2013 | Mertesdorf et al. | |
| 8,532,490 B2 | 9/2013 | Smith et al. | |
| 8,929,740 B2 | 1/2015 | Smith et al. | |
| 9,106,981 B2 | 8/2015 | Vastmans et al. | |
| 2007/0272440 A1 | 11/2007 | Grunwald et al. | |
| 2010/0000758 A1 | 1/2010 | Bravo et al. | |
| 2010/0025286 A1* | 2/2010 | Mangaroo | G06F 1/1626 206/701 |
| 2011/0097052 A1 | 4/2011 | Solheid et al. | |
| 2011/0262146 A1 | 10/2011 | Khemakhem et al. | |
| 2011/0311226 A1 | 12/2011 | Smith et al. | |
| 2012/0237173 A1* | 9/2012 | Alston | G02B 6/4442 385/97 |

OTHER PUBLICATIONS

International Search Report (PCT/EP2012/069331) mailed Oct. 5, 2013 (5 pages).

* cited by examiner

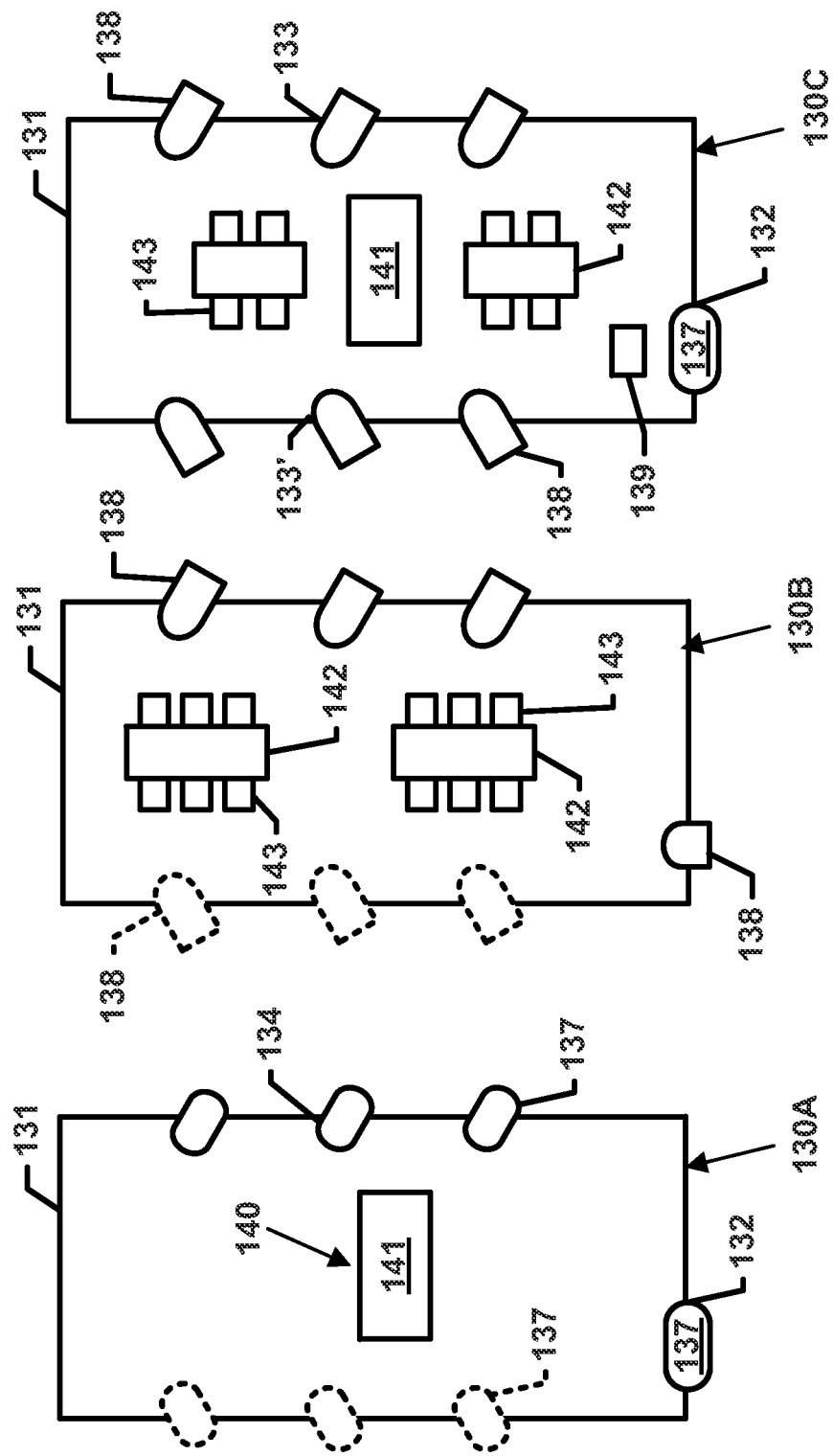

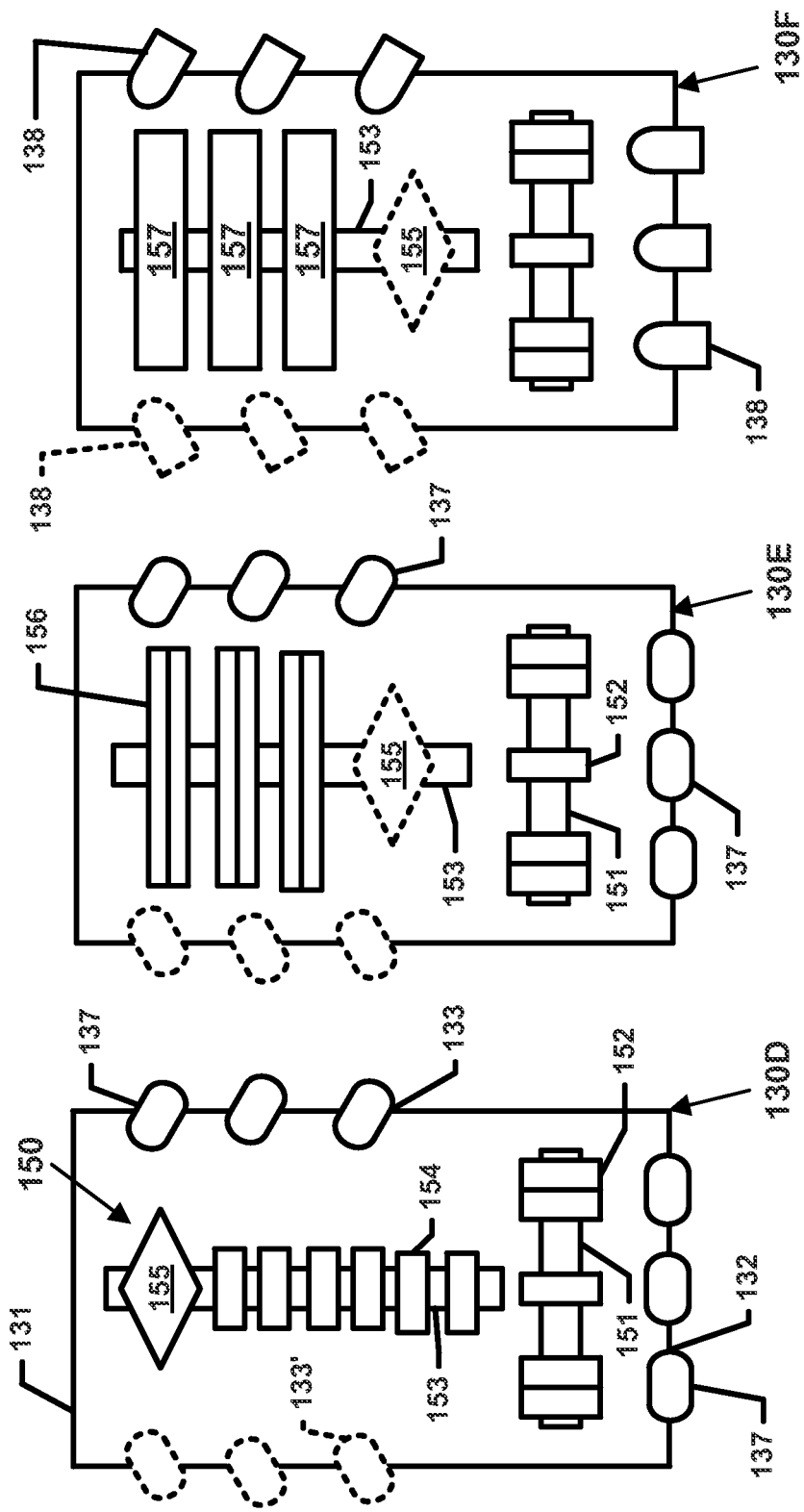

ENCLOSURE FOR PROVIDING POWER AND DATA TO A REMOTE RADIO HEAD

CROSS-REFERENCE TO RELATED APPLICATION

This application is a continuation of application Ser. No. 13/632,781, filed Oct. 1, 2012, now U.S. Pat. No. 9,106,981, which application claims the benefit of provisional application Ser. No. 61/542,514, filed Oct. 3, 2011, which applications are incorporated herein by reference in their entirety.

BACKGROUND

In recent years, the telecommunications industry has experienced rapid growth by offering a variety of new and improved services to customers. This growth has been particularly notable in the area of wireless communications, e.g., cellular, personal communication services (PCS) and other mobile radio systems. The technology is continually evolving as consumer needs change and new ideas are developed. As new wireless technologies are developed, companies must invest large amounts of time and resources to upgrade all their existing hardware so that it is compatible with the new technology. Often a change in one component of a system requires an update of the entire system. In this ever changing environment, system design flexibility is a significant advantage.

SUMMARY

Aspects of the present disclosure relate to enclosure assemblies. The enclosure can include an aggregation box or housing that is disposed on an antenna tower or rooftop and that is adapted to connect incoming cables (e.g., riser cables) to outgoing cables (e.g., jumper cables). The outgoing cables may be routed from the aggregation box to one or more remote radio heads (RRHs) and/or to one or more antennas. One or more modular component plate assemblies may be mounted within an interior of the aggregation box to customize the aggregation box.

In accordance with some aspects of the disclosure, a fiber optic component plate assembly may be mounted within an enclosure configured to accommodate fiber optic cables.

In accordance with some aspects of the disclosure, an electrical component plate assembly may be mounted within an enclosure configured to accommodate electrical power cables.

A variety of additional aspects will be set forth in the description that follows. These aspects can relate to individual features and to combinations of features. It is to be understood that both the foregoing general description and the following detailed description are exemplary and explanatory only and are not restrictive of the broad concepts upon which the embodiments disclosed herein are based.

BRIEF DESCRIPTION OF THE DRAWINGS

The accompanying drawings, which are incorporated in and constitute a part of the description, illustrate several aspects of the present disclosure. A brief description of the drawings is as follows:

FIGS. 3-5 show block diagrams of optical components disposed within the interior of an example terminal housing in accordance with the principles of the present disclosure;

FIGS. 6-8 show block diagrams of electrical components disposed within the interior of an example terminal housing in accordance with the principles of the present disclosure;

DETAILED DESCRIPTION

Reference will now be made in detail to the exemplary aspects of the present disclosure that are illustrated in the accompanying drawings. Wherever possible, the same reference numbers will be used throughout the drawings to refer to the same or like structure.

Figure 1:
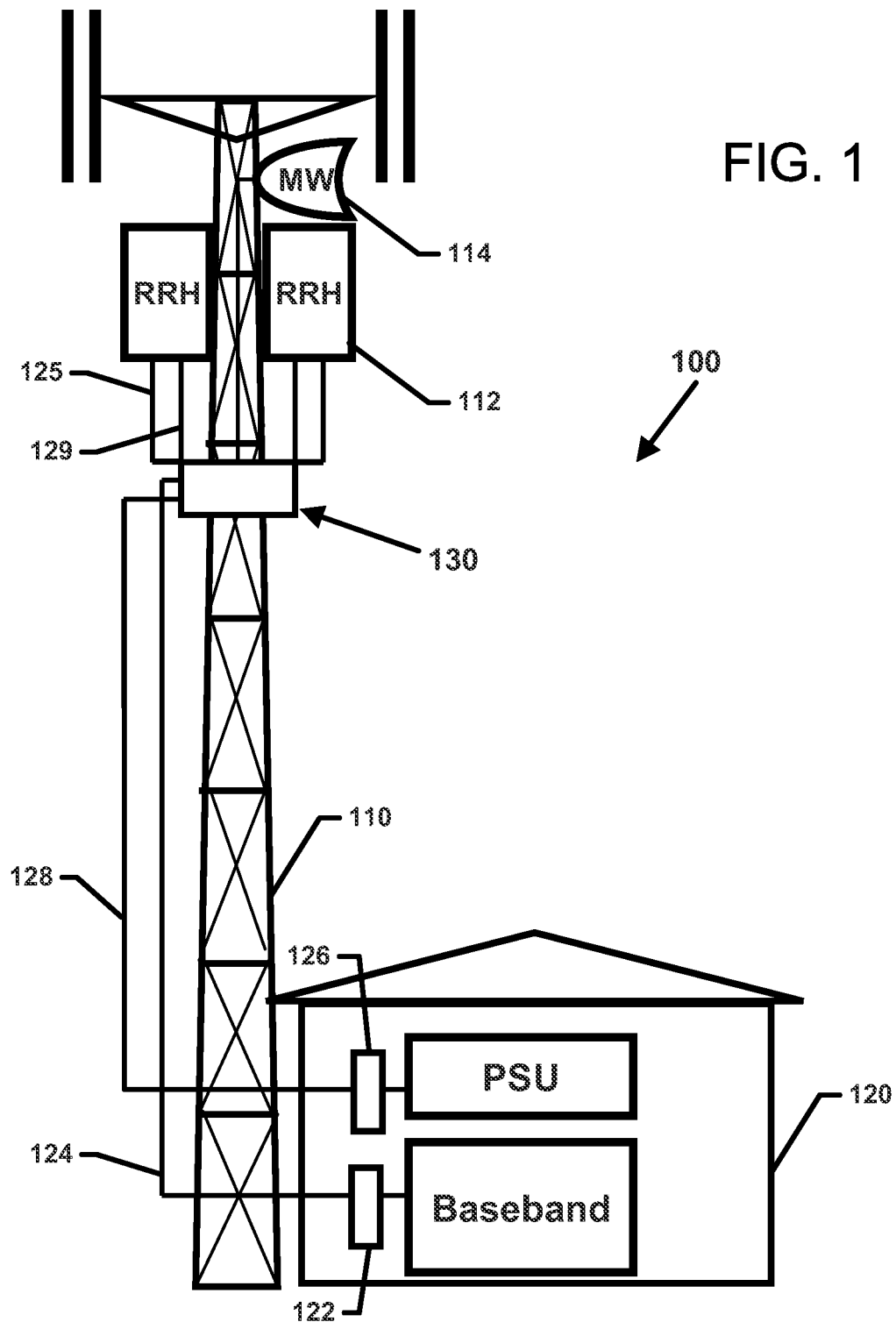
FIG. 1 is a schematic representation of a portion 100 of an example telecommunications network.

Referring now to FIG. 1, a schematic representation of a portion 100 of an example telecommunications network is shown. The example network portion 100 includes an antenna tower (i.e., or mast) 110 and a hut 120 containing base station equipment. One or more cables connect equipment located in the hut 120 to equipment mounted to the antenna tower 110. In some implementations, at least one optical fiber cable 124 and at least one electrical cable 128 connect the base station equipment to the tower equipment. In other implementations, the network portion 100 may have only fiber cables 124 or only electrical cables 128.

As the term is used herein, a "cable" refers to a physical medium that is capable of carrying power or data signals along its length. Non-limiting examples of suitable cables include optical fiber cables, electrical cables, and hybrid cables. For example, a fiber optic cable includes one or more optical fibers that are configured to carry optical signals along their length. The fibers in a fiber optic cable may be buffered and/or jacketed (e.g., individually or as a group). Certain types of fiber optic cables may be terminated with one or more connectors (e.g., SC, LC, FC, LX.5, or MPO connectors). In certain implementations, the connectors may be duplex connectors (e.g., to accommodate transmit and receive signals for the RRHs 112). In certain implementations, one or more of the connectors may be environmentally sealed (e.g., ODVA compliant connectors).

An electrical cable includes one or more conductors (e.g., wires) that are configured to carry power and/or electrical signals along their length. The conductors in an electrical cable may be insulated (e.g., individually or as a group). Non-limiting examples of electrical cables include power cables, coaxial cables, and twisted-pair cables. Certain types of electrical cables may be terminated with one or more connectors or connector assemblies (e.g., CPC connectors, RJ jacks and plugs, DSX jacks and plugs, BNC connectors, F connectors, punch-down terminations, or bantam jacks and plugs). A hybrid cable includes a combination of one or more wires and one or more optical fibers that may be insulated/jacketed.

The hut 120 is disposed near a base portion of the tower 110. The hut 120 is a structure that provides protection from the elements for various pieces of network equipment. For example, the hut 120 may house a fiber network terminal 122 and/or a power terminal 126. The fiber terminal 122 is configured to receives and distribute optical signals (e.g., baseband signals) received at the fiber network terminal 122. In various implementations, the fiber terminal 122 includes optical splices, optical adapters, optical splitters, and/or optical storage. The power terminal 126 is configured to provide power to the transceivers 112 and/or the antennas 114 from a power supply unit (PSU). In certain implementations, the power terminal 126 includes equipment providing overvoltage protection.

The equipment mounted to the antenna tower 110 (e.g., at a mast of the tower 110) includes one or more transceivers (e.g., a remote radio head (RRH)) 112. In the example shown, three transceivers 112 are disposed on the antenna tower 110. In other implementations, however, greater or fewer transceivers 112 may be disposed on the antenna tower 110. In some implementations, one or more antennas 114 are disposed on the antenna tower 110 and operatively coupled to the transceivers 112. In other implementations, the equipment may include a hybrid transceiver and antenna.

In some implementations, the network portion 100 forms an example cellular site that creates an area of telecommunications coverage (i.e., a cell) in a cellular network. In other implementations, the antenna tower 110 may be used for other types of applications. Each transceiver 112 is adapted to transmit and receive signals to and from devices (e.g., mobile phones, smart-phones, devices with wireless internet connectivity, etc.) of subscribers to the cellular network via the antennas 114. In some implementations, a feeder cable assembly connects each transceiver 112 to an antenna 114. In certain implementations, the feeder cable assembly includes a coaxial cable. In other implementations, each transceiver 112 is otherwise coupled to an antenna 114.

One or more aggregation boxes (also known as service terminals or distribution boxes) 130 also are disposed on the tower 110. Each aggregation box 130 is configured to connect incoming cables 124, 125 routed from the hut 120 to outgoing cables 128, 129 routed to the RRHs 112. In some implementations, a single aggregation box 130 is provided for each transceiver 112. In other implementations, a single aggregation box 130 is provided for multiple transceivers 112. In still other implementations, a plurality of aggregation boxes 130 may be provided for each transceiver 112. For example, a first aggregation box may manage fiber cables routed to the transceiver 112 and a second aggregation box may manage electrical cables routed to the transceiver 112.

The aggregation box 130 receives the fiber cable 124, the electrical cable 128, or both from the hut 120. In some implementations, the aggregation box 130 receives one or more first fiber cables 124 and outputs one or more second fiber cables 125. The first and second fiber cables 124, 125 are optically coupled by components disposed within the aggregation box 130. In other implementations, the aggregation box 130 receives one or more first electrical cables 128 and outputs one or more second electrical cables 129. The first and second electrical cables 128, 129 are electrically coupled by components disposed within the aggregation box 130. In some implementations, at least one fiber aggregation box and at least one electrical aggregation box are mounted at an antenna tower 110. In other implementations, one or more fiber aggregation boxes are mounted to an antenna tower 110 and the incoming power cables 125 are routed directly to the RRHs without first passing through an aggregation box.

In still other implementations, the aggregation box 130 may receive and output both fiber cables and electrical cables. Components within the aggregation box 130 organize and manage the cables. In yet still other implementations, the aggregation box 130 may receive and/or output one or more hybrid electro/optical cables. Components within the aggregation box 130 couple together the hybrid cables with other hybrid cables or a combination of fiber and electrical cables.

In still other implementations, the aggregation box 130 may be disposed on a rooftop of a building instead of on an antenna tower. In some such implementations, the base station equipment is disposed in a basement of the building. In other such implementations, the base station equipment is disposed on the rooftop. In still other implementations, the base station equipment may be disposed anywhere in or adjacent to the building (e.g., in a hut located adjacent the building).

Figure 2:
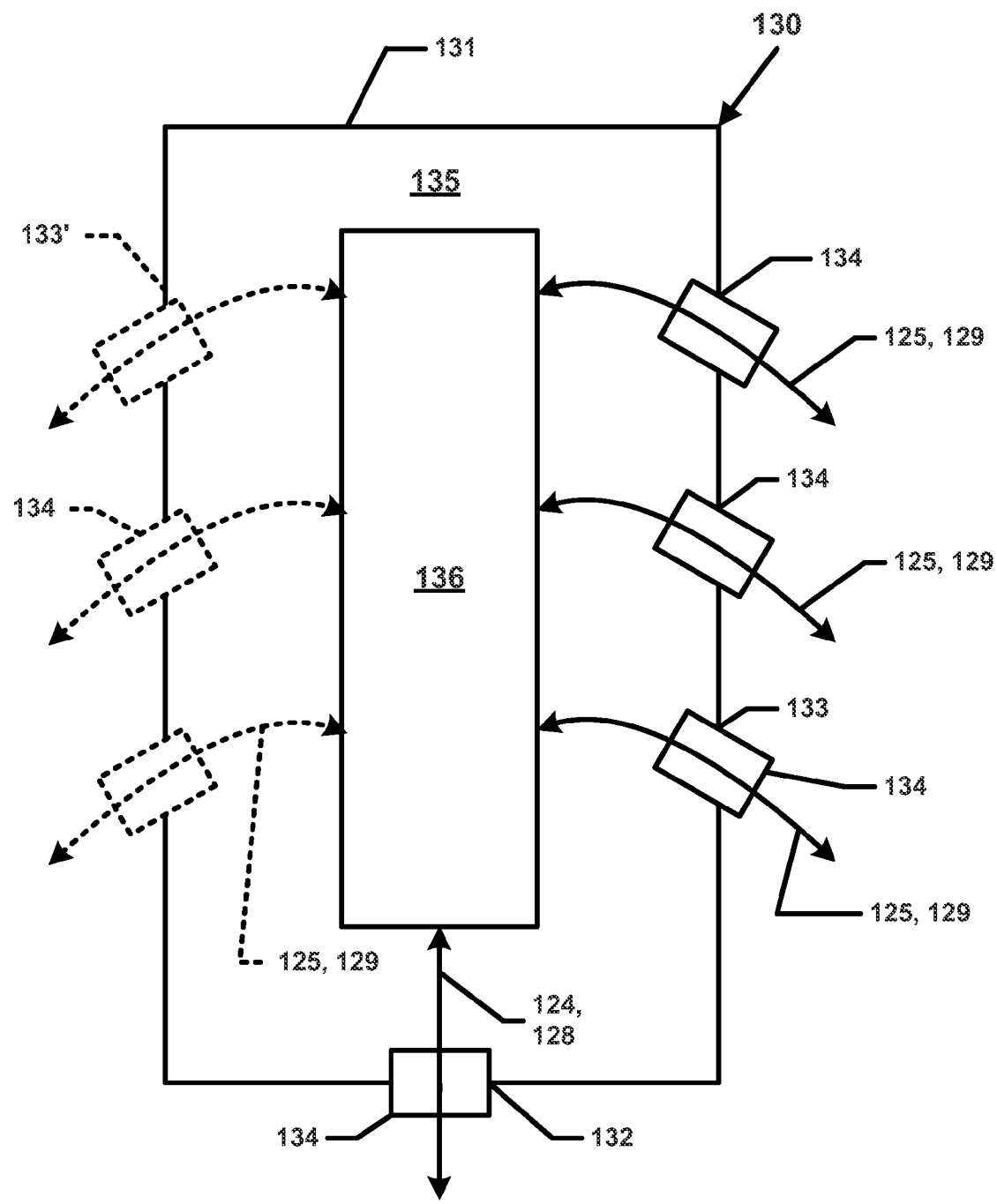
FIG. 2 is a schematic block diagram of an example aggregation box suitable for mounting to an antenna tower.

FIG. 2 is a schematic block diagram of an example aggregation box 130 suitable for mounting to an antenna tower. The aggregation box 130 is configured to receive at least one incoming cable 124, 128 and to output at least three outgoing cables 125, 129. As used herein, the terms "incoming" and "outgoing" are used for convenience and are not intended to be exclusory. Signals carried over the cables may travel in either or both directions along the cables. Accordingly, the incoming cables 124, 128 may carry input and/or output signals. Likewise, the outgoing cables 125, 129 may carry input and/or output signals.

The aggregation box 130 includes a housing 131 defining an interior 135. The housing defines an input port 132 and multiple output ports 133. Each port 132, 133 defines an opening in the housing 131 that provides access to an interior 135 of the housing 131. For example, in some implementations, one or more cables may pass through each port 132, 133. In other implementations, one or more connecting structures (e.g., fiber optic adapters or electrical sockets) may be disposed at the ports 132, 133 for receiving cables. In certain implementations, the connecting structures are environmentally sealed (also known as ruggedized or hardened). In some implementations, the input port 132 is defined at a bottom of the housing 131 and the output ports 133 are defined along one side of the housing 131. In certain implementations, additional output ports 133' may be defined along a second side of the housing 131.

In some implementations, each input port 132 provides access to the interior 135 of the housing 131. In some implementations, an input port 132 may form a sealed pass-through (e.g., a gland) for an incoming cable. In other implementations, an input port 132 may form a sealed connection interface (e.g., a sealed fiber optic adapter). In still other implementations, the input port 132 defines an unsealed aperture. In certain implementations, the cable 124, 128 includes multiple fibers or conductors. In other implementations, each input port 132 may receive a plurality of cables 124, 128 (e.g., two, three, four, six, ten, and twelve). In some implementations, each output port 133, 133' is configured to receive a single cable 125, 129 therethrough. In certain implementations, the cable 125, 129 includes multiple fibers or conductors. In other implementations, each output port 133, 133' may receive a plurality of cables 125, 129 (e.g., two, three, four, six, ten, and twelve). In some implementations, each output port 133 includes adapters configured to receive single fiber connectors. In other implementations, each output port 133 includes adapters configured to receive duplex fiber connectors. In still other implementations, each output port 133 includes adapters configured to receive multi-fiber connectors (e.g., MPO connectors).

Sealing structures 134 may be disposed at the input port 132 and at the output ports 133 to maintain the interior characteristics of the aggregation box 130 by sealing the interior from the external environment. Each sealing structures 134 may secure the respective cable to the housing 131. Each sealing structure 134 may provide strain relief to the respective cable. In some implementations, one or more of the sealing structures 134 includes cable glands through which the cables pass to enter the housing 131.

In other implementations, one or more of the sealing structures 134 include plug-and-play (PnP) connection interfaces, which provide quick connection and disconnection of cables routed to the aggregation box 130. In certain implementations, the PnP connection interfaces are ruggedized (i.e., hardened). Some non-limiting example ruggedized PNP optical connection interfaces are disclosed in U.S. Pat. Nos. 7,113,679, 7,264,402, 7,744,288, 7,762,726, 7,744,286, 7,942,590, and 7,959,361, the disclosures of which are hereby incorporated herein by reference. Another example sealed connection interface includes FullAXS® Fiber-to-the-Antenna connector sold by Tyco Electronics Corporation of Berwyn, Pa.

In some implementations, the sealing structures 134 are disposed at an angle relative to the sides of the housing 131. For example, in certain implementations, exterior ports of the sealing structures 134 may face downwardly to alleviate strain on the outgoing cables and/or enhance cable routing. In certain implementations, the sealing structures 134 are disposed in angled tiers along one or both sides of the housing 131. In the example shown, the sealing structures 134 are disposed in three tiers on a first side of the housing 131. Additional sealing structures 134 optionally may be disposed (e.g., in one or more angled tiers) at output ports 133' along a second side of the housing 131.

One or more incoming cables 124, 128 are routed into the interior 135 of the terminal housing 131 through the sealing structure 134 disposed at the input port 132. One or more outgoing cables 125, 129 are routed out of the interior 135 of the housing 131 through the sealing structures 134 disposed at the output ports 133. In some implementations, one or more of the incoming cables 124, 128 or portions thereof (e.g., fibers or conductors) may pass through the housing 131 without being connected to an outgoing cable 125, 129. These pass-through incoming cables may be routed to another aggregation box 130 as part of a cascade configuration. In some implementations, the housing 131 defines a butt-end housing. In such implementations, a pass-through incoming cable may enter the housing 131 through an input port 132 and may exit the housing 131 through another input port 132 or through an output port 133, 133'.

Example electrical cables 128, 129 each include one or more conductors (e.g., wires). In some implementations, the conductors may be terminated at plugs (e.g., an RJ plug, a USB plug, etc.). In other implementations, the ends of the conductors may be not pre-terminated. In some implementations, example optical cables 124, 125 include a plurality of optical fibers. For example, in various implementations, the optical cables 124, 125 may include two, four, eight, twelve, and thirty-two optical fibers. In other implementations, the optical cables 124, 125 may have a greater or lesser number of optical fibers. In some implementations, multiple optical fibers are terminated at a multi-fiber connector (e.g., an MPO connector). In other implementations, the optical fibers are separately terminated by single-fiber connectors (e.g., LC connectors, SC connectors, ST connectors, LX.5 connectors, etc.). In still other implementations, an optical cable 124, 125 may have a single optical fiber that is unterminated or terminated by a single fiber connector.

FIGS. 3-8 illustrate example interior configurations for various aggregation boxes 130. One or more optical components 140 are disposed within the interior of the terminal housing 131 in FIGS. 3-5 and one or more electrical components 150 are disposed within the interior of the terminal housing 131 in FIGS. 6-8. In other implementations, however, any desired combination of optical and/or electrical components may be disposed within the housing 131. In some implementations, cable glands 137 are disposed at the input port 132 and/or output ports 133, 133' of the housing 131. In other implementations, connection interfaces 138 are disposed at the input port 132 and/or output ports 133, 133' of the housing 131. In certain implementations, a combination of cable glands 137 and connection interfaces 138 may be disposed at the ports 132, 133 (e.g., see FIG. 5).

FIG. 3 is a schematic block diagram of an example aggregation box 130A having an input port 132 defined at a bottom of the housing 131 and output ports 133 disposed at a first side of the housing 131. Cable glands 137 are position at the input port 132 and at the output ports 133. In certain implementations, the housing 131 also may define additional output ports at a second side of the housing 131. In some such implementations, cable glands 137 also may be disposed in the additional output ports. Of course, in other implementations, one or more of the cable glands 137 may be replaced with a connector interface 138.

An optical splice arrangement 141 is disposed within the interior of the housing 131 of aggregation box 130A. The optical splice arrangement 141 is configured to optically splice one or more fibers from the incoming cable 124 to fibers of the outgoing cable 125. In some implementations, the optical splice arrangement 141 includes one or more splice trays or cassettes. In other implementations, the optical splice arrangement 141 includes one or more splice holders (e.g., see 510 at FIGS. 33-35). In certain implementations, one or more cable management elements 144 (e.g., fiber spools, bend radius limiters, retaining fingers, routing flanges, etc.) also are disposed within the interior of the housing 131.

FIG. 4 is a schematic block diagram of an example aggregation box 130B having an input port 132 defined at a bottom of the housing 131 and output ports 133 disposed at a first side of the housing 131. Connector interfaces 138 are position at the input port 132 and at the output ports 133. In certain implementations, the housing 131 also may define additional output ports at a second side of the housing 131. In some such implementations, connector interfaces 138 also may be disposed in the additional output ports. Of course, in other implementations, one or more connector interfaces 138 may be replaced with a cable gland 137.

An optical connector arrangement 142 is disposed within the interior of the housing 131 of aggregation box 130B. In the example shown, the optical connector arrangement 142 includes one or more adapters 143 configured to align the connectorized ends of one or more fibers from the incoming cable 124 with the connectorized ends of one or more fibers of the outgoing cable 125. In some implementations, the optical connector arrangement 142 includes one or more sliding adapter modules. In certain implementations, the sliding adapter modules include one row of three adapters. In certain implementations, the sliding adapter modules include two rows of three adapters. Example sliding adapter modules have been described in commonly owned U.S. Pat. Nos. 5,497, 444; 5,717,810; 6,591,051; and 7,416,349, the disclosures of which are hereby incorporated by reference in their entirety. In certain implementations, one or more cable management elements 144 also may be disposed within the housing interior.

FIG. 5 is a schematic block diagram of an example aggregation box 130C having an input port 132 defined at a bottom of the housing 131, a first set of output ports 133 disposed at a first side of the housing 131, and a second set of output ports 133' disposed at a second side of the housing 131. A cable gland is disposed at the input port 132. Connector interfaces 138 are position at the output ports 133, 133'. Of course, in other implementations, the output ports 133, 133' may include cable glands 137 and/or the input port 132 may include a connector interface 138.

In the example shown in FIG. 5, a multi-fiber adapter (e.g., MPO adapter) 139, which is configured to receive two multi-fiber connectors, is disposed within the housing 131. In some implementations, the MPO adapter 139 is disposed adjacent the input port 132 and gland 137. In other implementations, the MPO adapter 139 is incorporated into the gland 137. The multi-fiber adapter 139 has a first port that receives a connectorized end of the incoming cable 124 routed through the gland 137 at the input port 132.

At least one optical connector arrangement 142 is disposed within the interior of the housing 131 of aggregation box 130B. The optical connector arrangement 142 includes one or more adapters. In some implementations, the optical connector arrangement 142 includes one or more sliding adapter modules as described above. In some implementations, the optical connector arrangement 142 is configured to receive an MPO connector. In other implementations, the optical connector arrangement 142 is configured to receive individually connectorized ends of multiple fibers.

In the example shown, an optical splice arrangement 141 also is disposed within the interior of the housing 131 of aggregation box 130C. The optical splice arrangement 141 is configured to optically splice together two or more fibers. In some implementations, the optical splice arrangement 141 includes one or more splice trays or cassettes. In other implementations, the optical splice arrangement 141 includes one or more splice holders. In certain implementations, one or more cable management elements 144 also are disposed within the interior of the housing 131.

FIG. 6 is a schematic block diagram of an example aggregation box 130D having one or more input ports 132 defined at a bottom of the housing 131 and one or more output ports 133 disposed at a first side of the housing 131. In the example shown, three input ports 132 and three output ports 133 are defined in the housing 131. The housing 131 is configured to add three additional output ports 133'. Cable glands 137 are position at the input ports 132 and at the output ports 133. In some such implementations, cable glands 137 also may be disposed in the additional output ports 133'. Of course, in other implementations, connector interfaces 138 may be mounted at one or more of the input ports 132 and/or the output ports 133, 133'.

An electrical rail arrangement is disposed within the interior of the housing 131 of aggregation box 130D. In some implementations, the electrical rail arrangement includes a terminal bar that extends along a majority of a height of the housing interior 135. In other implementations, the electrical rail arrangement includes a terminal bar that extends along a majority of a width of the housing interior 135. In other implementations, the electrical rail arrangement includes a first terminal bar 151 and a second terminal bar 153 disposed in the housing 131. In still other implementations, the electrical rail arrangement may include additional bars. In certain implementations, each of the terminal bars forms a rail (e.g., a DIN rail).

In some implementations, the first terminal bar 151 is disposed adjacent to the input port 132 and the second terminal bar 153 is disposed adjacent to the output ports 133. The incoming cables 128 connect to the first terminal bar 151 and the outgoing cables 129 connect to the second terminal bar 153. The first and second terminal bar 151, 153 may be connected by intermediate cables routed between electrical components disposed on the rails 151, 153. In some implementations, the first and second terminal bars 151, 153 are oriented parallel to each other. In other implementations, the first and second terminal bars 151, 153 are angled relative to each other. In the example shown, the second terminal bar 153 is located above the first terminal bar 151.

In certain implementations, the first terminal bar 151 is oriented so that ports defined on the electrical components mounted to the first terminal bar 151 face generally towards the input port 132. In the example shown, the first terminal bar 151 is oriented generally horizontally within the housing 131. Accordingly, the incoming cables 128 may be routed from the input ports 132 to components on the first bar 151 without significant bending of the incoming cables 128. For example, the first bar 151 extends generally from a first side of the housing 131 to a second side of the housing 131 and ports of the electrical components face downwardly towards the input port 132.

In certain implementations, the second terminal bar 153 is oriented so that ports defined on the electrical components mounted to the second terminal bar 153 face generally towards one or more of the output ports 133, 133'. In the example shown, the second terminal bar 153 is oriented generally vertically within the housing 131. Accordingly, the outgoing cables 129 may be routed from the electrical components on the second bar 153 to the output ports 133 without significant bending of the outgoing cables 129. For example, the second bar 153 extends generally from a bottom of the housing 131 to a top of the housing 131 and ports of the electrical components face sideways towards the output ports 133, 133'.

Some electrical components configured for power distribution are mounted to the rails 151, 153. For example, in some implementations, first termination blocks 152 may be mounted to the first rail 151 and second termination blocks 154 may be mounted to the second rail 153. The intermediate cables may be routed between the termination blocks 152, 154. In one example implementation, one of the cable inputs 132 receives a grounding conductor or cable that is routed to a ground termination block 152 while power distribution conductors or cables are routed to power distribution terminal blocks 152. In other implementations, both power and ground conductors may be routed to the same termination block 152.

In accordance with some aspects, one or more overvoltage protection (OVP) devices 155 are disposed within the housing 131. In certain implementations, an OVP device 155 protects the aggregation box 130 and the RRHs 112 against lightning strikes or other power surges. In the example shown, an OVP device 155 is disposed on the second terminal bar 153. In certain implementations, multiple OVP devices 155 are disposed on the second terminal bar 153. In other implementations, the OVP device 155 may be disposed on the first terminal bar 151. In some implementations, the OVP device 155 is a bipolar module. In other implementations, the OVP device 155 is a single pole module (e.g., a Strikesorb® module from Raycap of Post Falls, Id.).

FIG. 7 is a schematic block diagram of an example aggregation box 130E having three input ports 132 at a bottom of the housing 131 and three output ports 133 defined along one side of the housing 131. The housing 131 is configured to add three additional output ports 133' along a second side of the housing 131. Cable glands 137 are position at the input ports 132 and at the output ports 133. A first terminal bar 151 and a second terminal bar 153 are disposed in the housing 131. First termination blocks 152 are mounted to the first rail 151 and an optional OVP device 155 is mounted to the second rail 153.

In some implementations, one or more circuit breakers 156 are disposed on the second rail 153. In the example shown, circuit breakers 156 are disposed on the second rail 153 in place of terminal blocks 154. In other implementations, however, both circuit breakers 156 and terminal blocks 154 may be disposed on the second rail 153. In some implementations, the circuit breakers 156 are monopolar circuit breakers. In other implementations, the circuit breakers 156 are bipolar circuit breakers. In the example shown, three circuit breakers 156 are disposed on the second rail 153. In other implementations, however, a greater or lesser number of circuit breakers 156 may be disposed on the second rail 153.

FIG. 8 is a schematic block diagram of an example aggregation box 130F having three input ports 132 at a bottom of the housing 131 and three output ports 133 defined along one side of the housing 131. The housing 131 is configured to add three additional output ports 133' along a second side of the housing 131. Connection interfaces 138 are position at the input ports 132 and at the output ports 133. In other implementations, however, cable glands 137 may be positioned at one or more of the input ports 132 and output ports 133, 133'.

A first terminal bar 151 and a second terminal bar 153 are disposed in the housing 131. First termination blocks 152 are mounted to the first rail 151 and an optional OVP device 155 is mounted to the second rail 153. In some implementations, one or more switches 157 are disposed on the second rail 153. Switches 157 enable a user to selectively shut off power to individual outgoing cables 129 and, accordingly, individual RRHs. In the example shown, switches 157 are disposed on the second rail 153 in place of terminal blocks 154 or circuit breakers 156. In other implementations, however, any combination of switches 157, circuit breakers 156, and terminal blocks 154 may be disposed on the second rail 153. In some implementations, the switches 157 are monopolar switches. In other implementations, the switches 157 are bipolar switches. In the example shown, three switches 157 are disposed on the second rail 153. In other implementations, however, a greater or lesser number of switches 157 may be disposed on the second rail 153.

FIGS. 9-28 illustrate one example implementation 200 of an aggregation box housing 131. FIGS. 9-18 show the aggregation box housing 200 with a first example mounting arrangement 234 by which the housing may be mounted to a surface and FIGS. 19-28 show the aggregation box housing 200 with a second example mounting arrangement 234' by which the housing may be mounted to a surface. The example aggregation box housing 200 has a front 203, a rear 204, a top 205, a bottom 206, a first side 207, and a second side 208.

The housing 200 includes a body 201 defining an interior 209. A cover 202 is attached to the body 201 and selectively provides and inhibits access to the interior 209 of the body 201 from the front 203. For example, the cover 202 is configured to move between a closed position (see FIGS. 9-18) and an open position (see FIGS. 19-28). In some implementations, the body 201 and/or cover 202 are formed from plastic. In other implementations, the body 201 and/or cover 202 are formed from metal. In still other implementations, portions the body 201 and cover 202 are formed from plastic.

As shown in FIGS. 19-28, the body 201 includes a brim 214 that extends around the front 203 of the body 201. In some implementations, the interior 209 of the body 201 has an open front defined by an inner perimeter of the brim 214. Cable input ports 210 (FIG. 22) are defined through a bottom 206 of the body 201 to enable incoming cables 124, 128 to enter the interior 209 of the body 201. Cable output ports 211 (FIG. 22) are defined through at least the first side 207 of the body 201 to enable outgoing cables 125, 129 to exit the interior 209 of the body 201. In some implementations, cable output ports 211 also are defined through the second side 208. For ease in viewing, the example aggregation box 200 is shown without ports in FIGS. 9-18.

In certain implementations, the brim 214 inhibits access to the input ports 210 and/or output ports 211 from the front 203 of the body 201. For example, the brim 214 may be sufficiently large to extend at least partially in front of any glands or connector interfaces disposed at the ports 210, 211. In certain implementations, the brim 214 is sufficiently large to extend fully in front of any glands or connector interfaces disposed at the ports 210, 211. In some implementations, the brim 214 is larger (i.e., extends further outwardly) at the bottom 206 of the body 201 than at the top 205.

Figure 9:
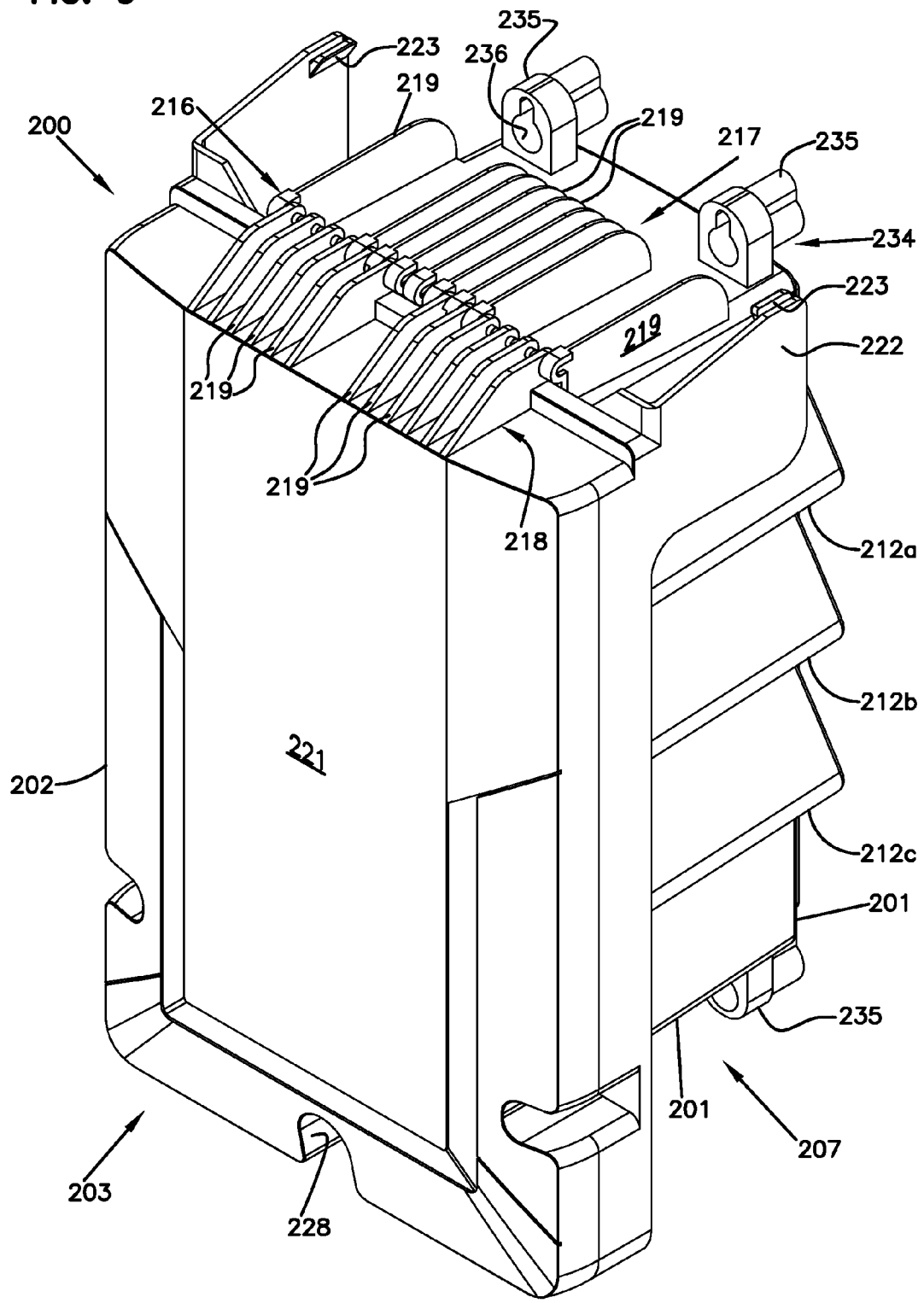
FIG. 9 is a front, top perspective view of an example aggregation box having a cover in a closed position relative to a body and shown without cable ports.
Figure 10:
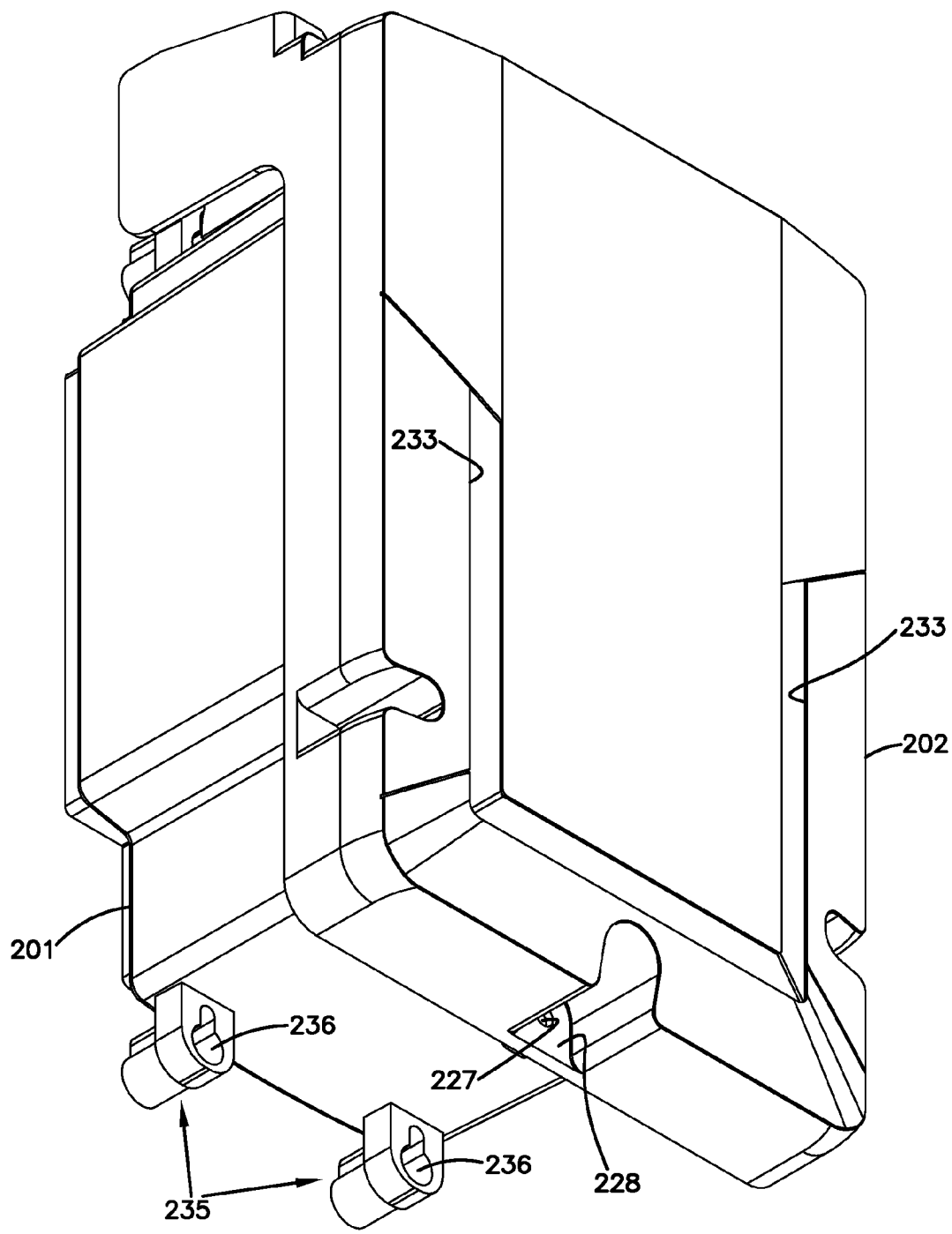
FIG. 10 is a front, bottom perspective view of the example aggregation box of FIG. 9.
Figure 11:
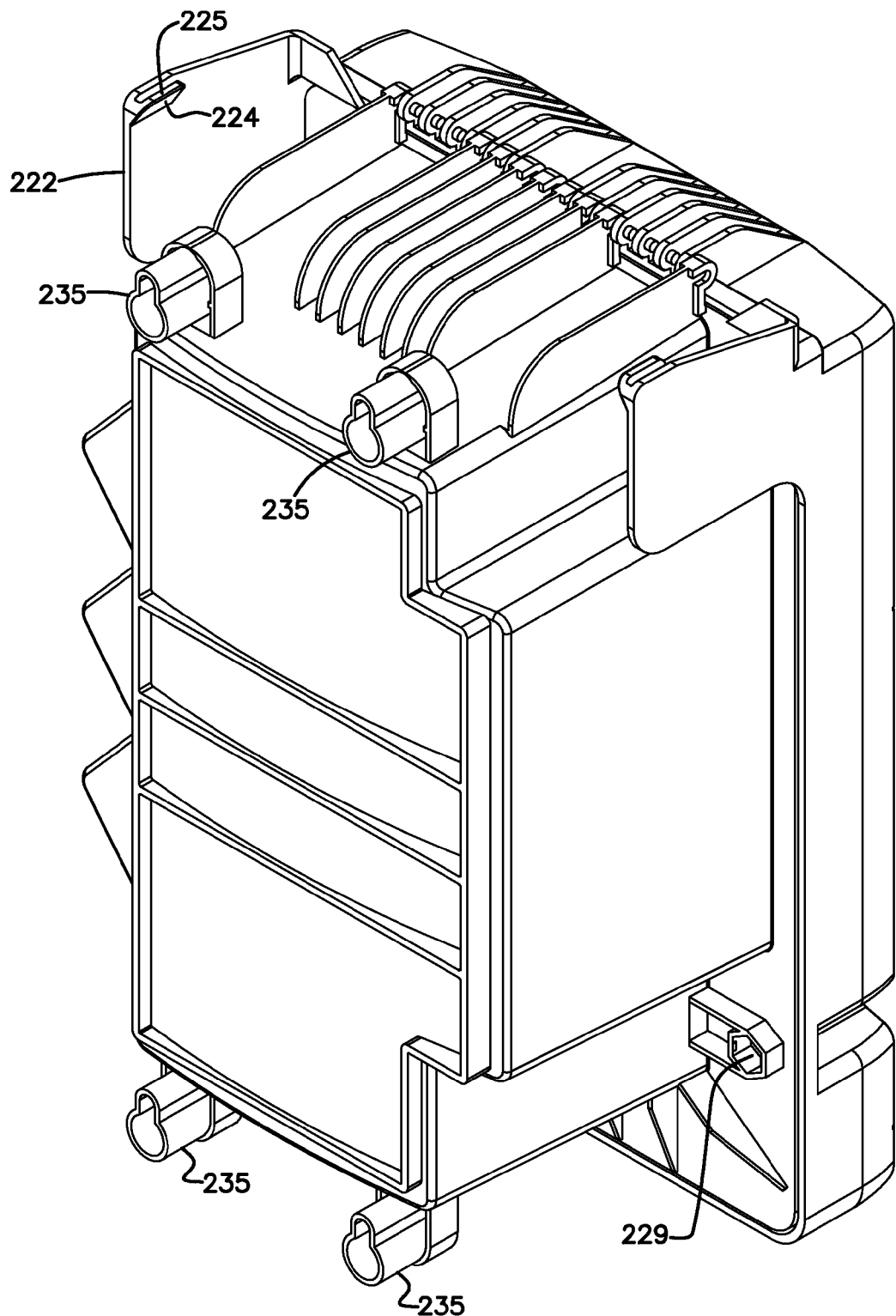
FIG. 11 is a rear, top perspective view of the example aggregation box of FIG. 9.
Figure 12:
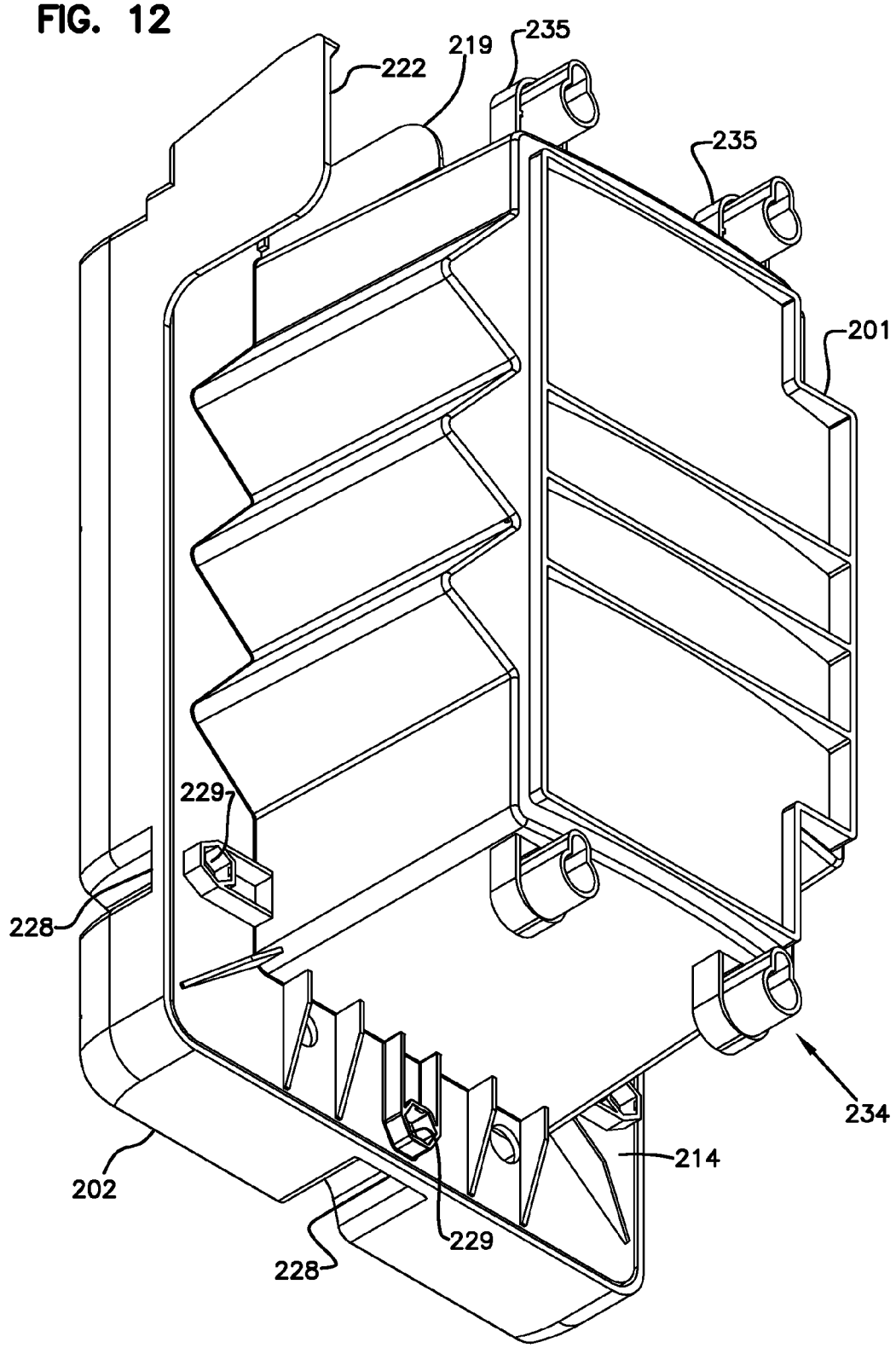
FIG. 12 is a rear, bottom perspective view of the example aggregation box of FIG. 9.
Figure 13:
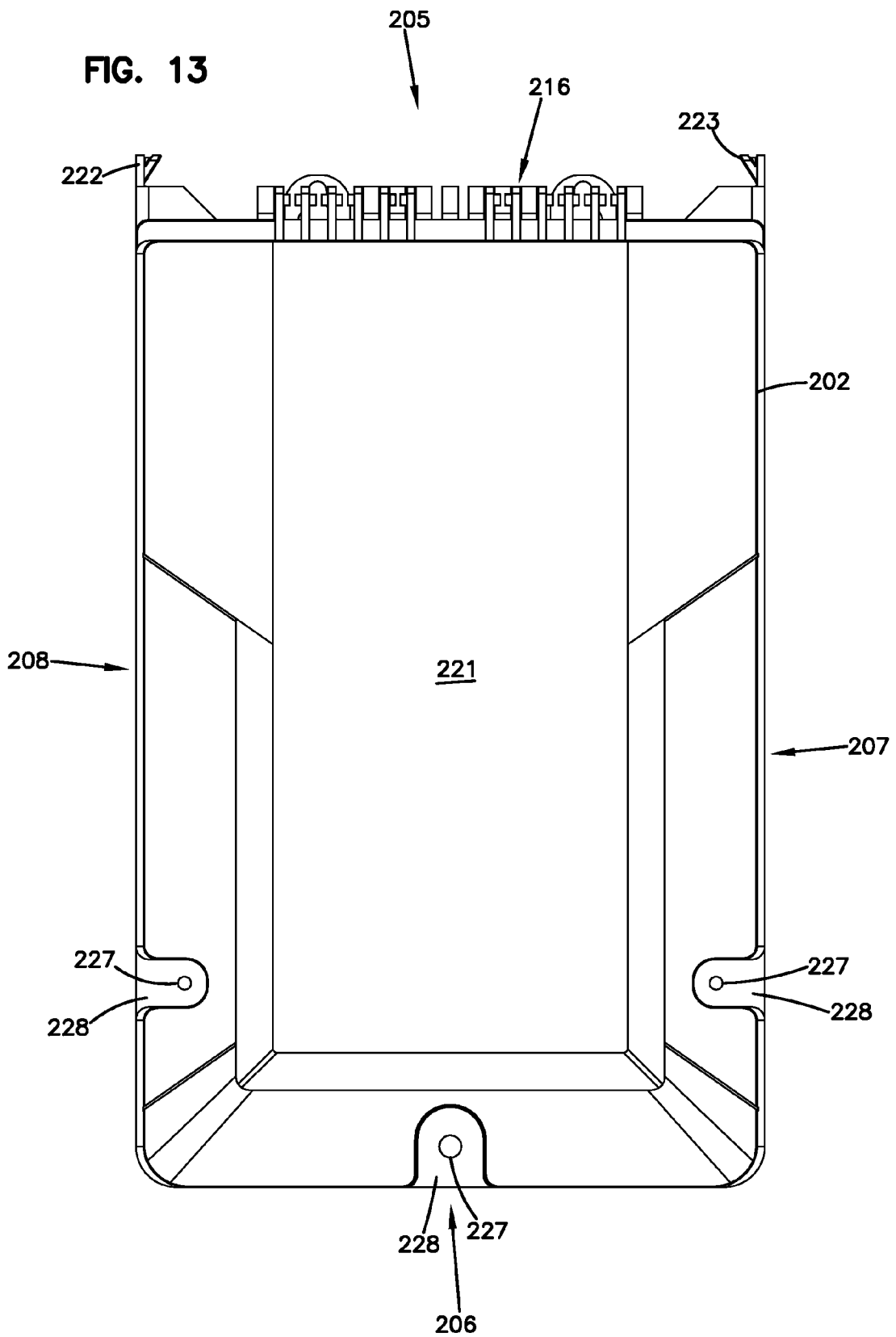
FIG. 13 is a front elevational view of the example aggregation box of FIG. 9.

In some implementations, the cable output ports 211 are disposed in rows or tiers 212. In the example shown, the output ports 211 are disposed in three tiers 212a, 212b, 212c (FIG. 9). In other implementations, however, the output ports 211 may be disposed in a greater or lesser number of tiers 212. In the example shown, each tier 212 includes two output ports 211. In other implementations, each tier 212 may include a greater or lesser number of ports 211. In the example shown, the ports 211 within each tier 212 laterally align with each other and the ports 211 of adjacent tiers 212 longitudinally align with each other. In other implementations, the output ports 211 may be staggered.

Figure 14:
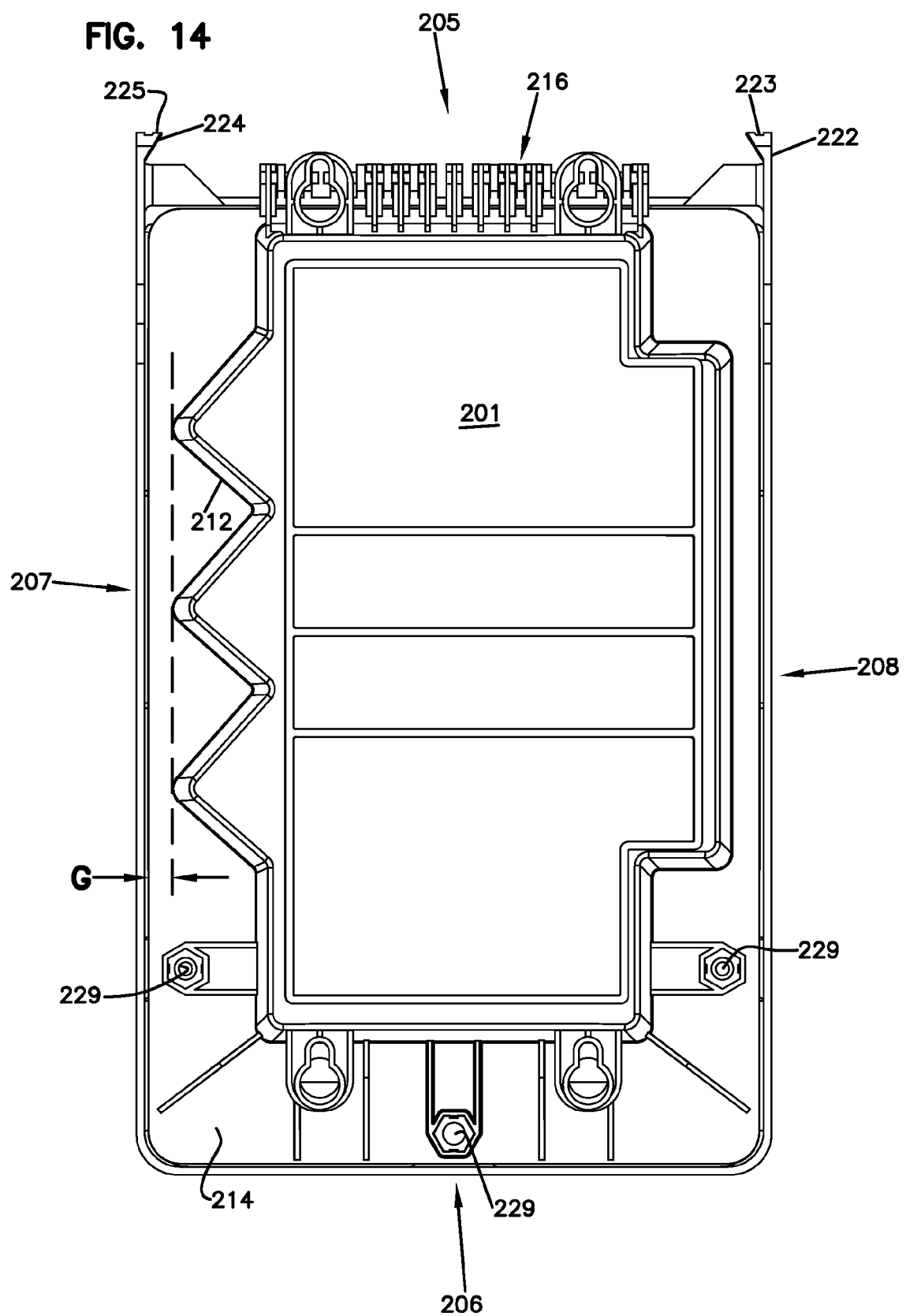
FIG. 14 is a rear elevational view of the example aggregation box of FIG. 9.
Figure 15:
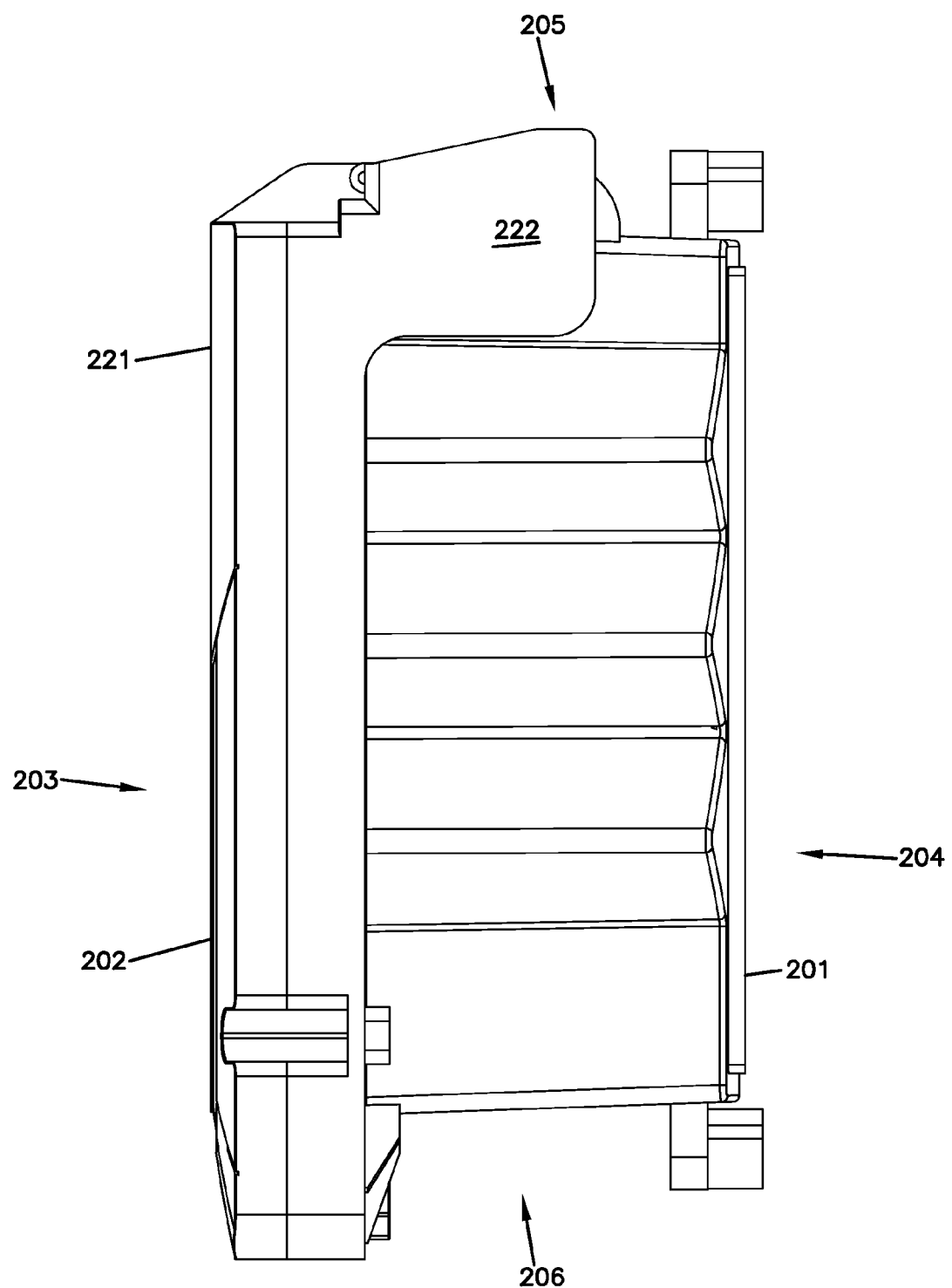
FIGS. 15 and 16 are side elevational views of the example aggregation box of FIG. 9.
Figure 16:
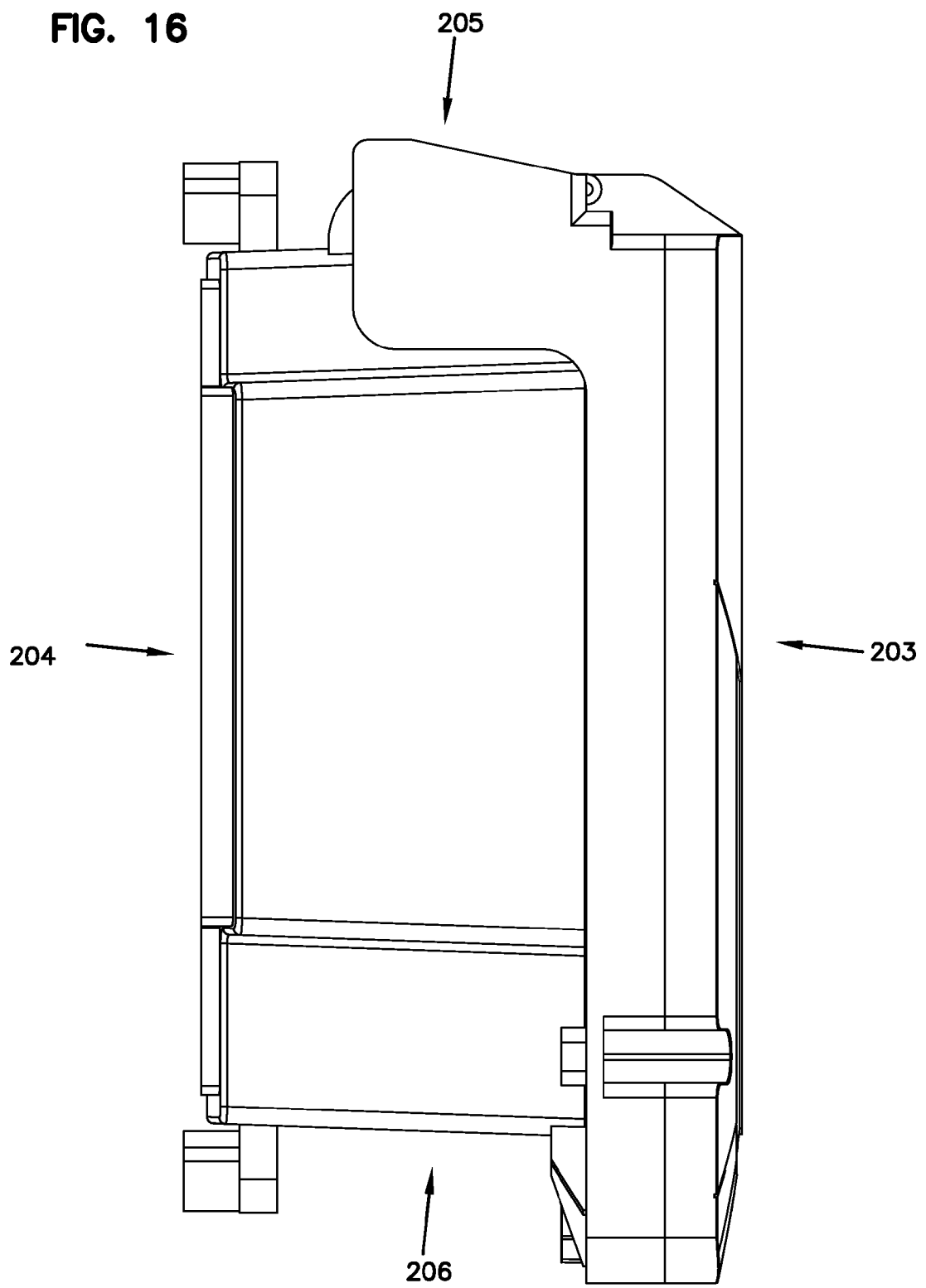
Figure 17:
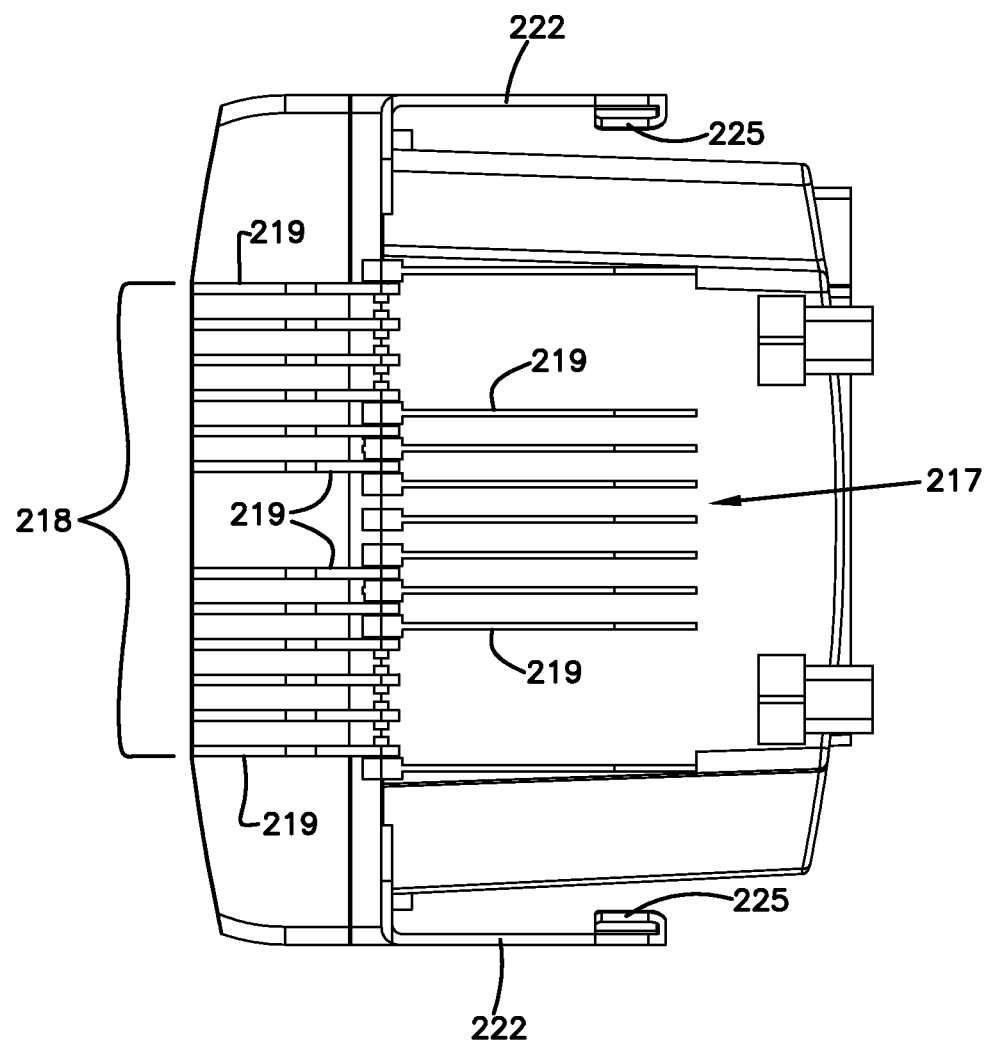
FIG. 17 is a top plan view of the example aggregation box of FIG. 9.
Figure 18:
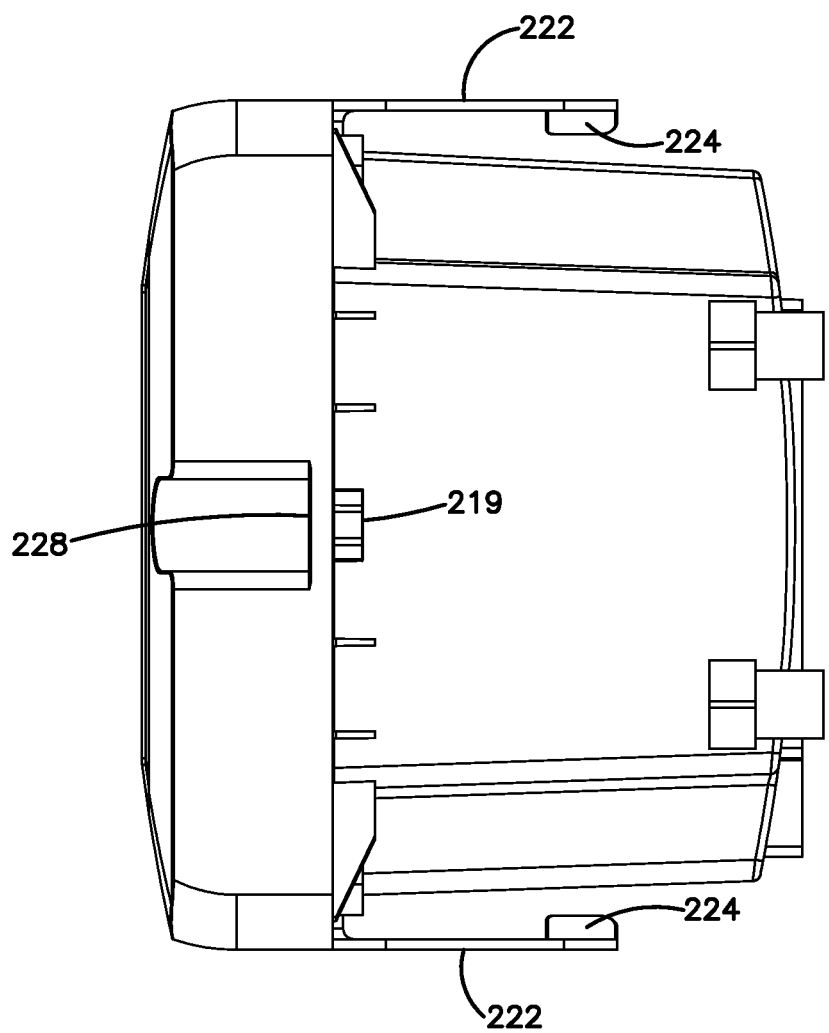
FIG. 18 is a bottom plan view of the example aggregation box of FIG. 9.
Figure 19:
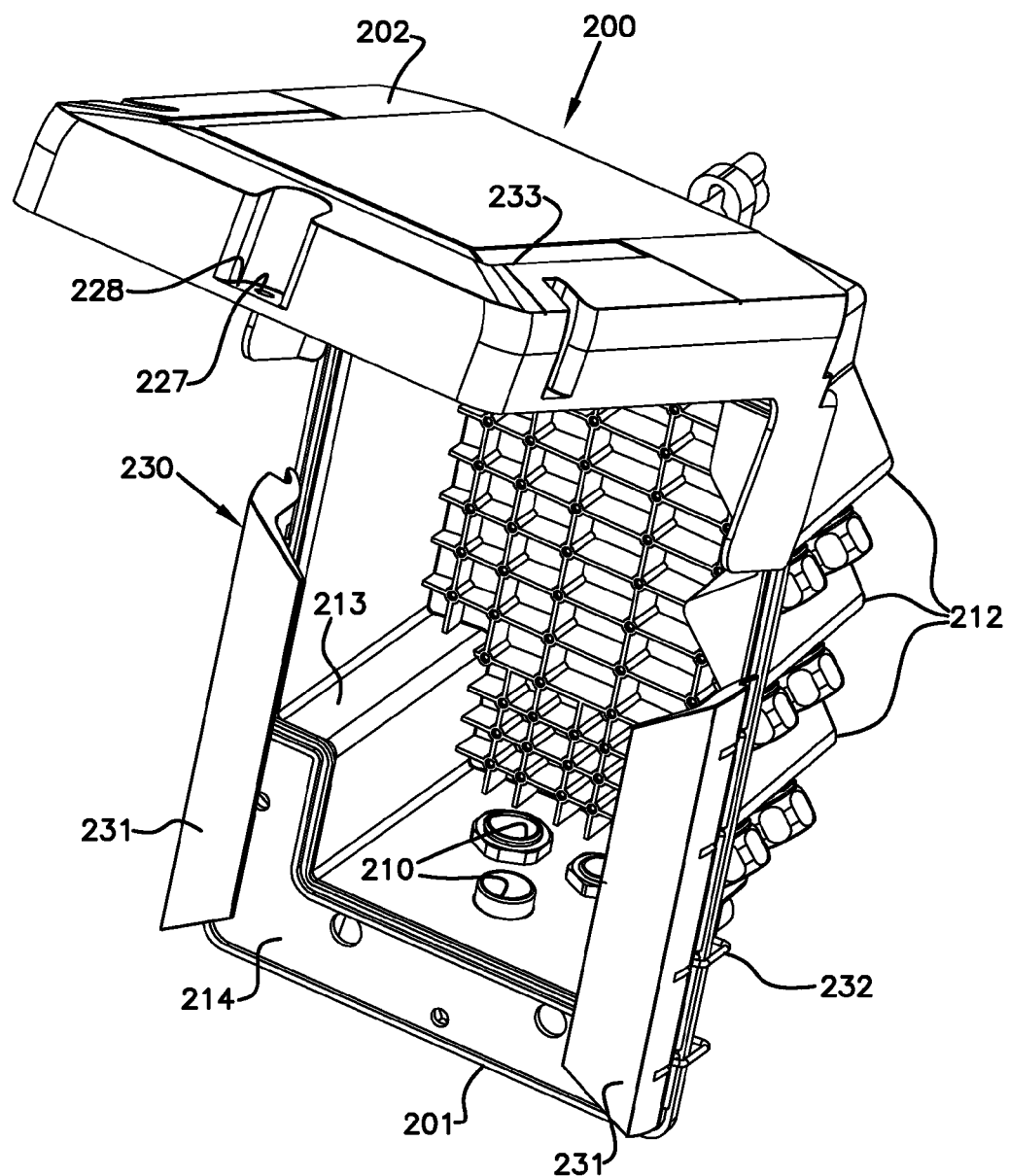
FIG. 19 is a front, top perspective view of another example aggregation box having the cover in an open position relative to the body and shown with cable ports.
Figure 20:
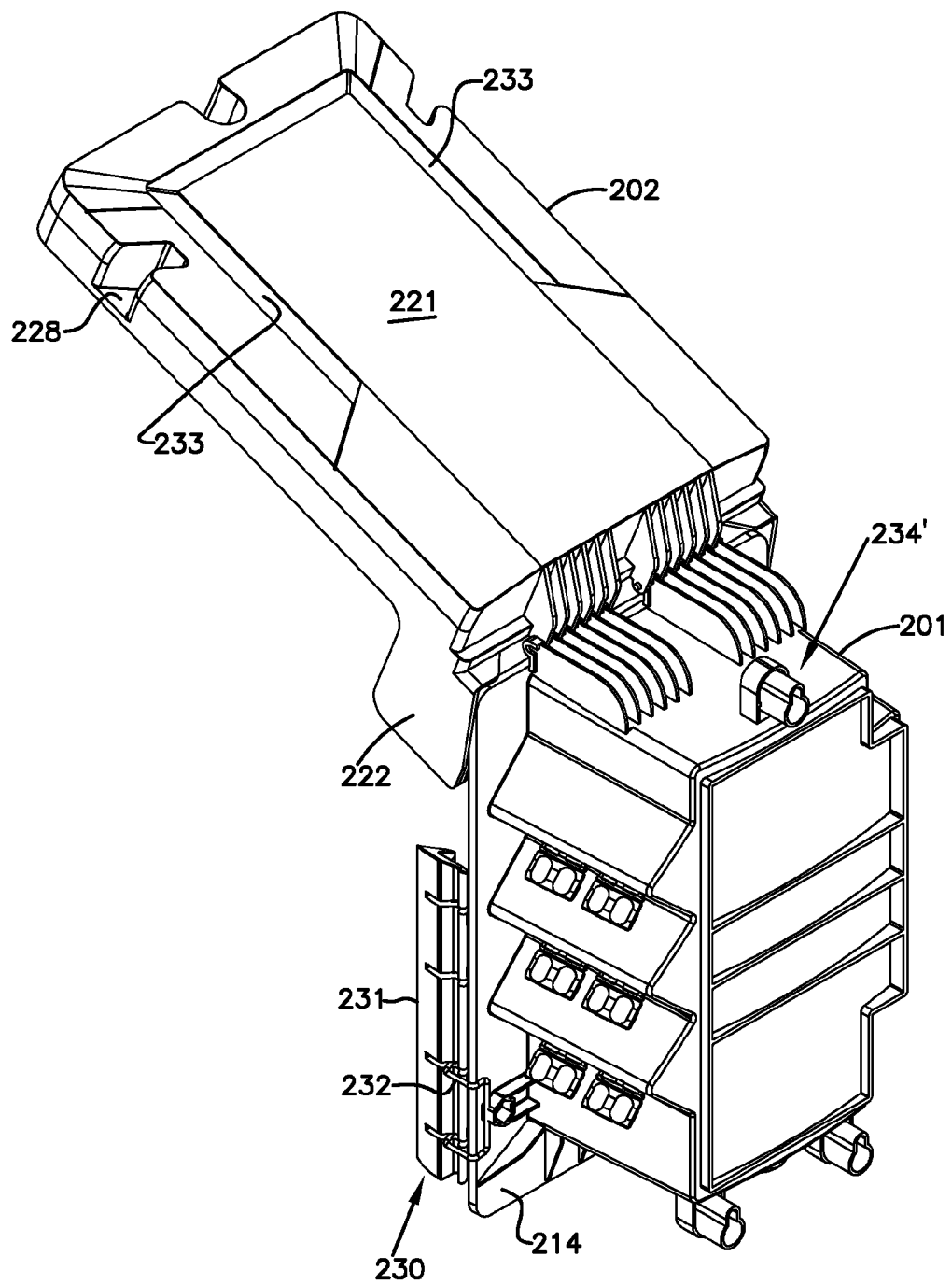
FIG. 20 is a rear, top perspective view of the example aggregation box of FIG. 19.
Figure 21:
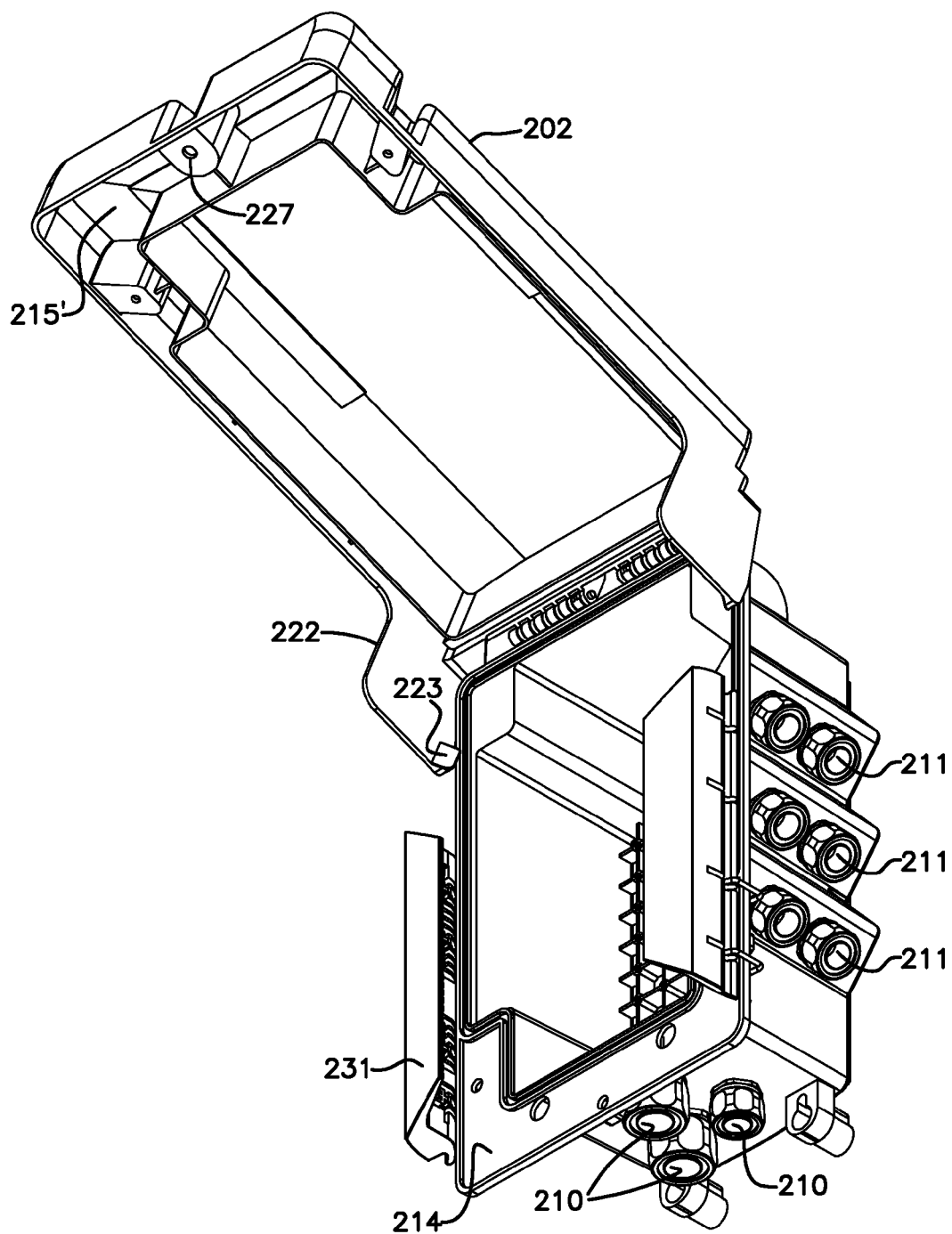
FIG. 21 is a front, bottom perspective view of the example aggregation box of FIG. 19.
Figure 22:
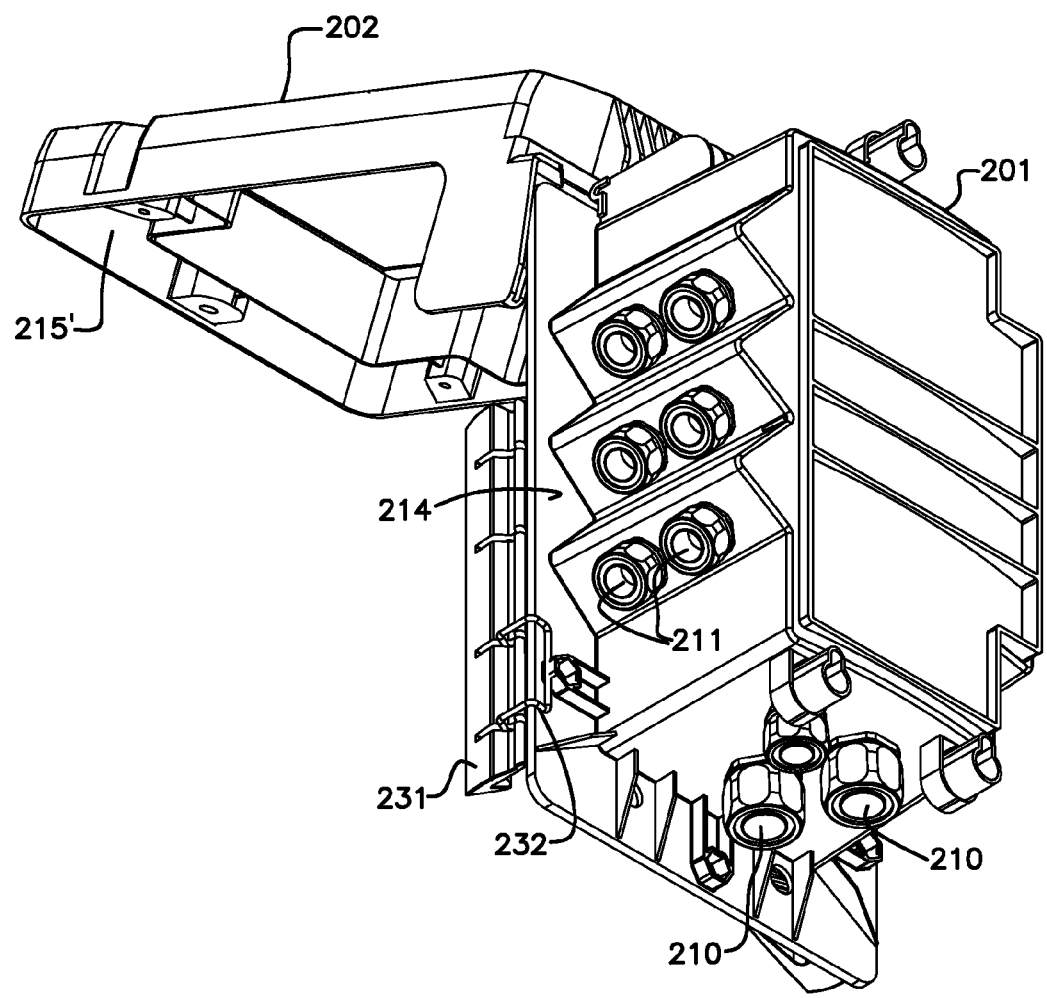
FIG. 22 is a rear, bottom perspective view of the example aggregation box of FIG. 19.
Figure 23:
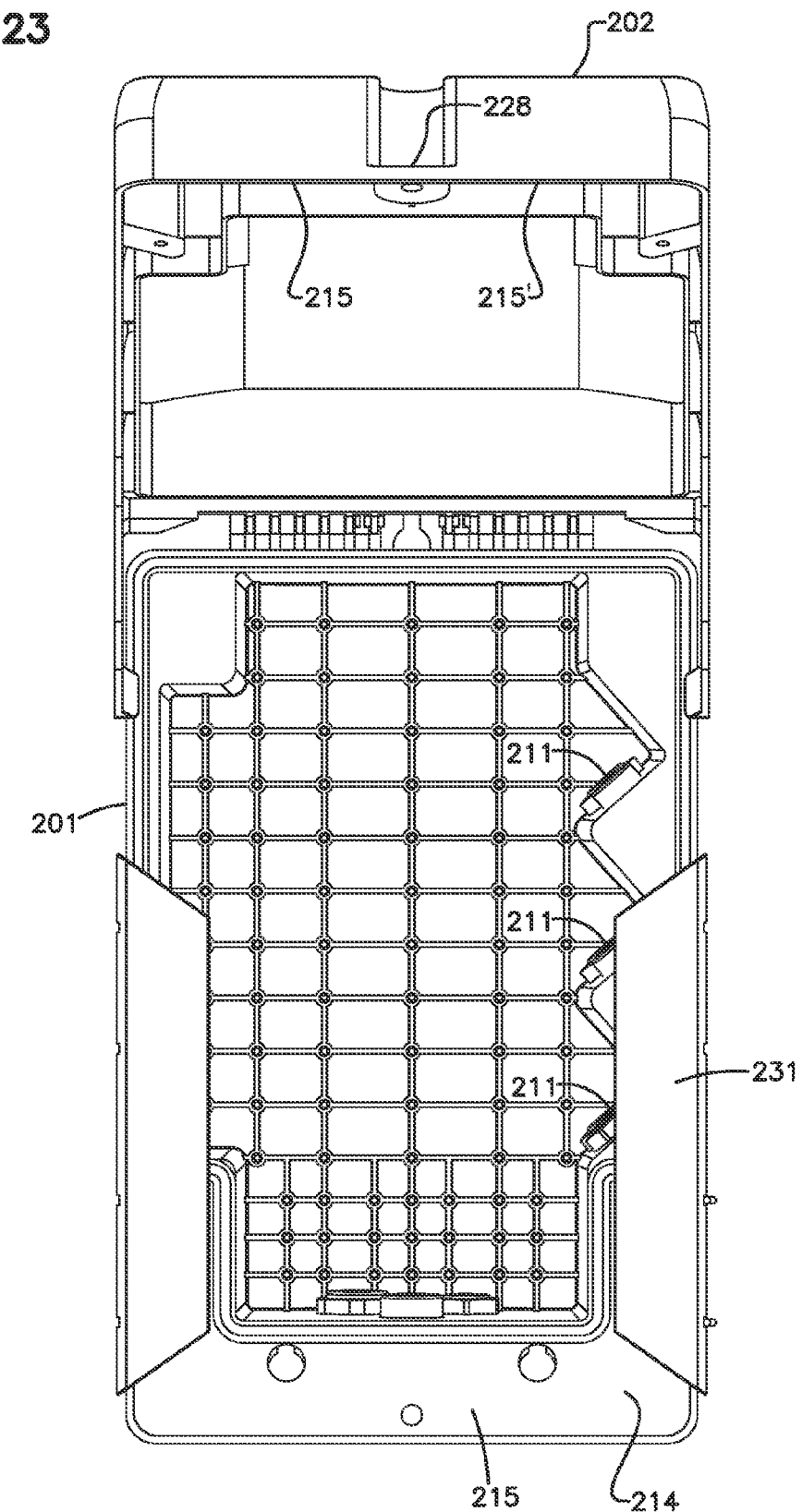
FIG. 23 is a front elevational view of the example aggregation box of FIG. 19.
Figure 24:
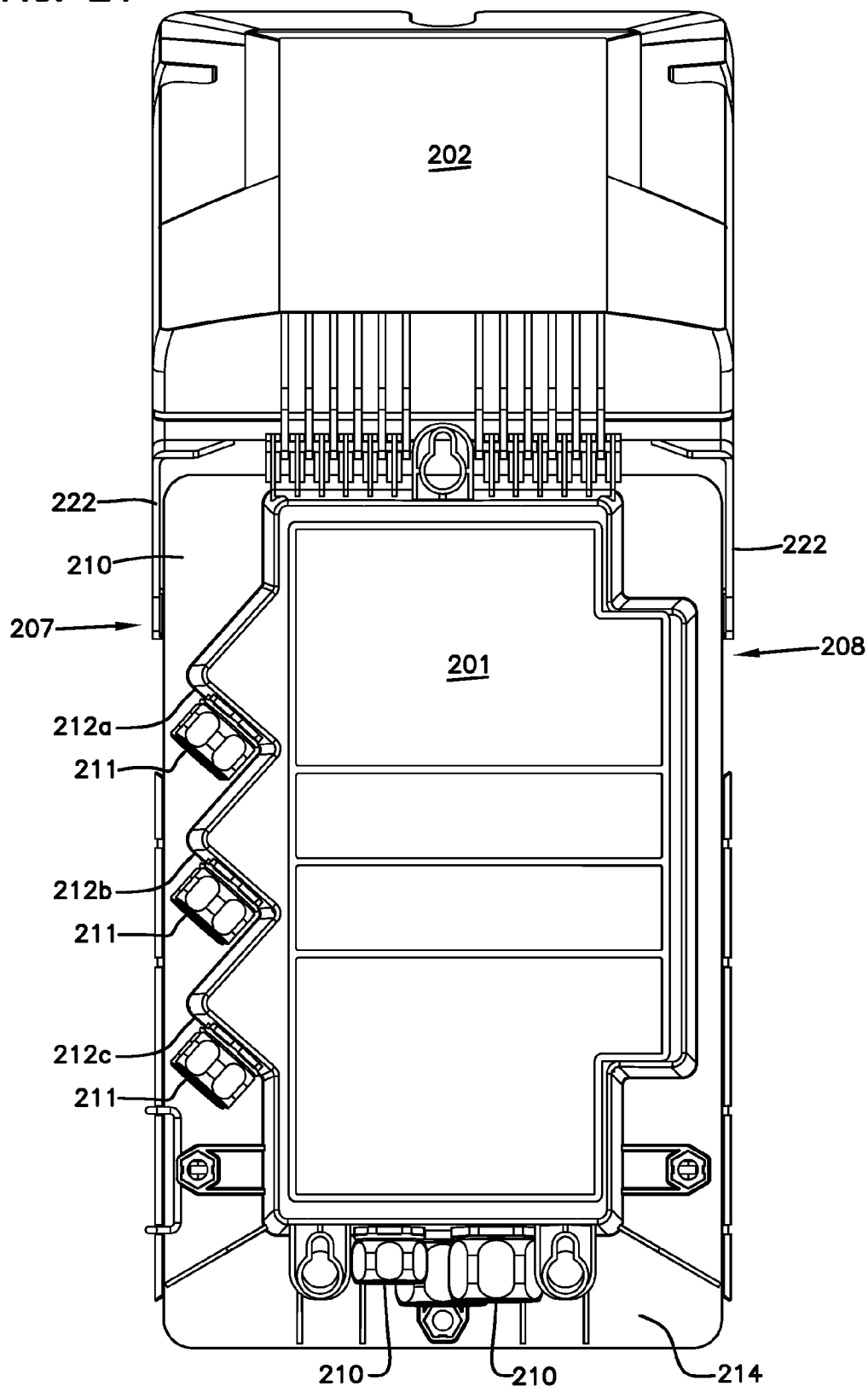
FIG. 24 is a rear elevational view of the example aggregation box of FIG. 19.
Figure 25:
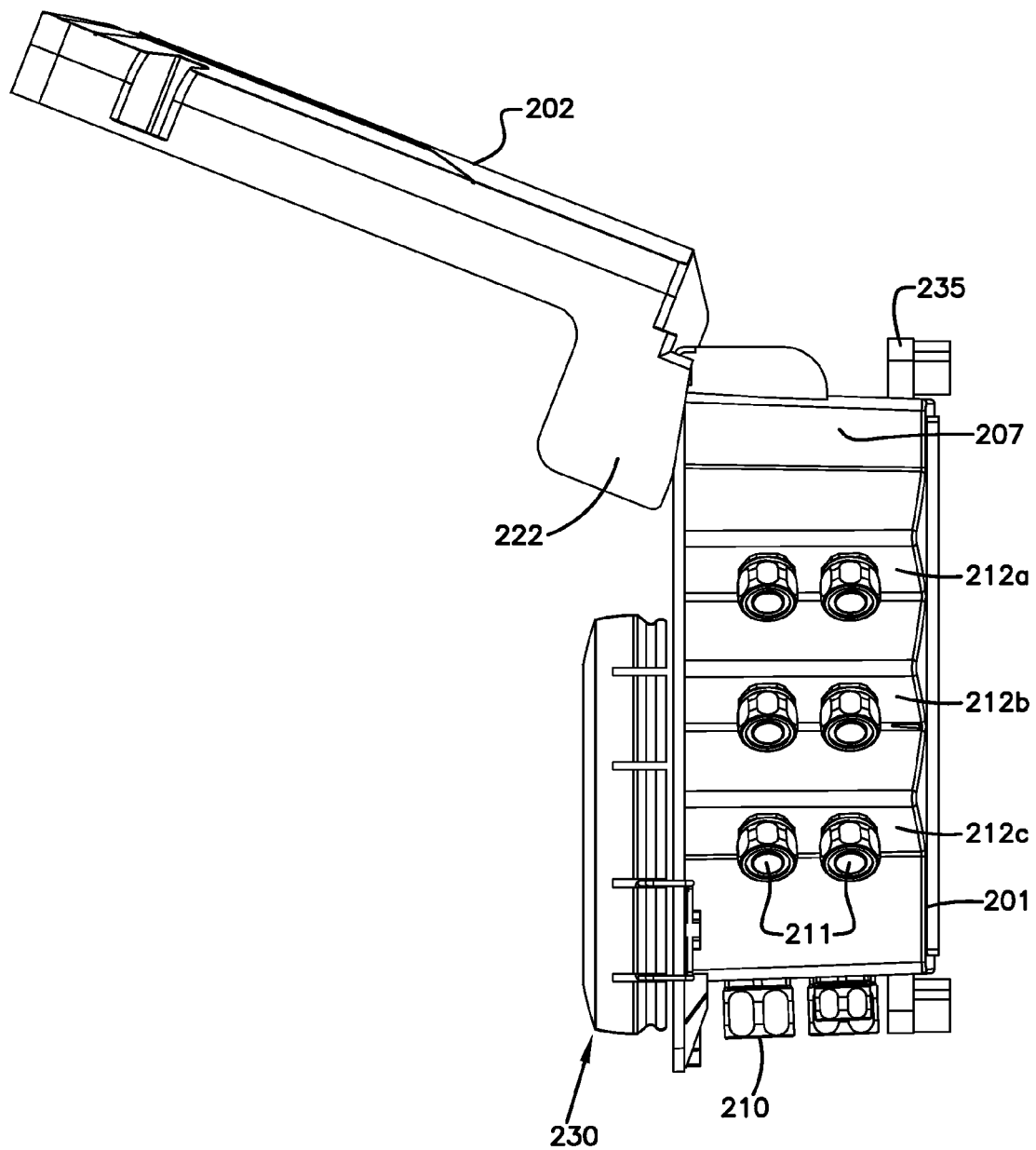
FIGS. 25 and 26 are side elevational views of the example aggregation box of FIG. 19.
Figure 26:
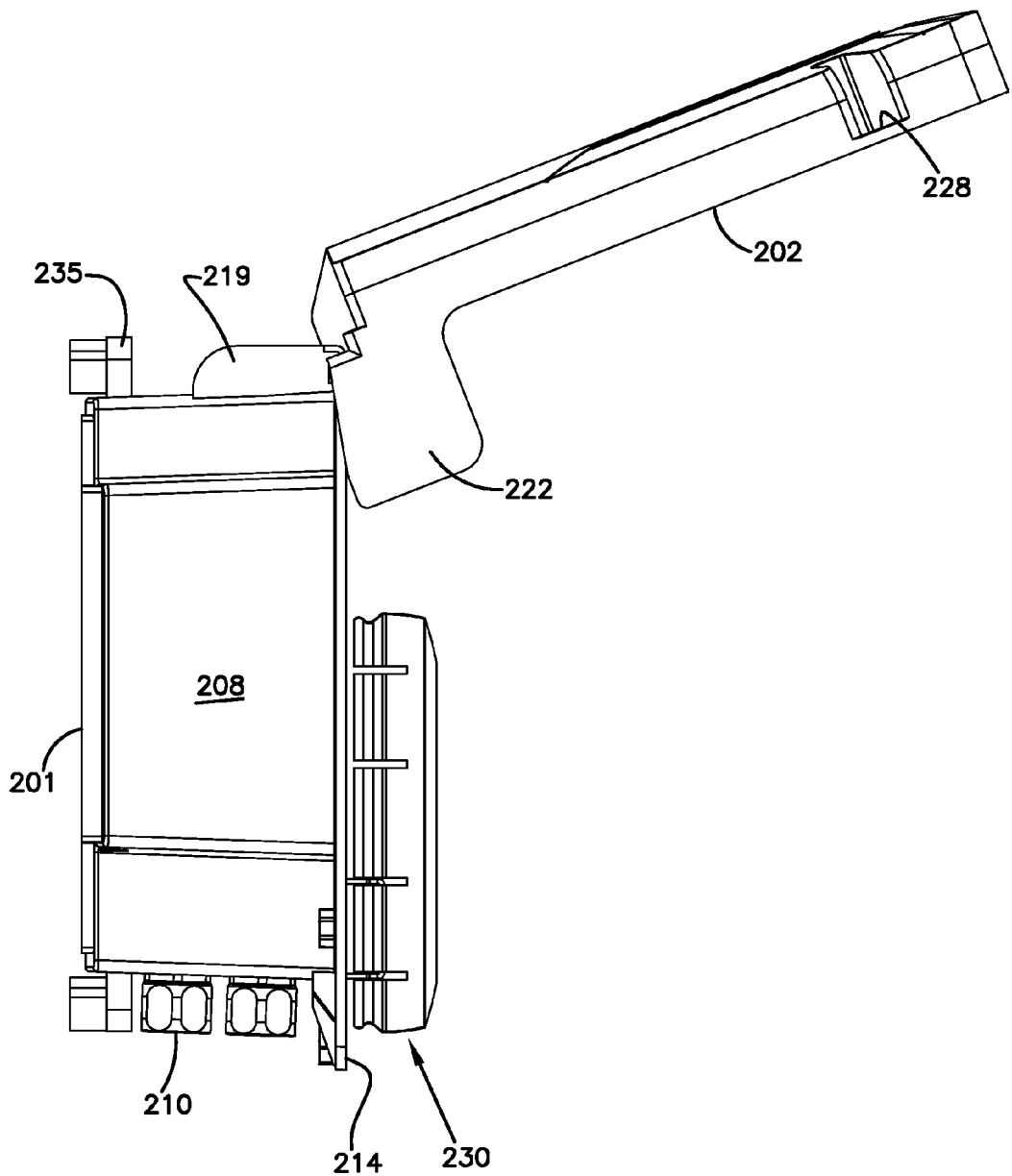
Figure 27:
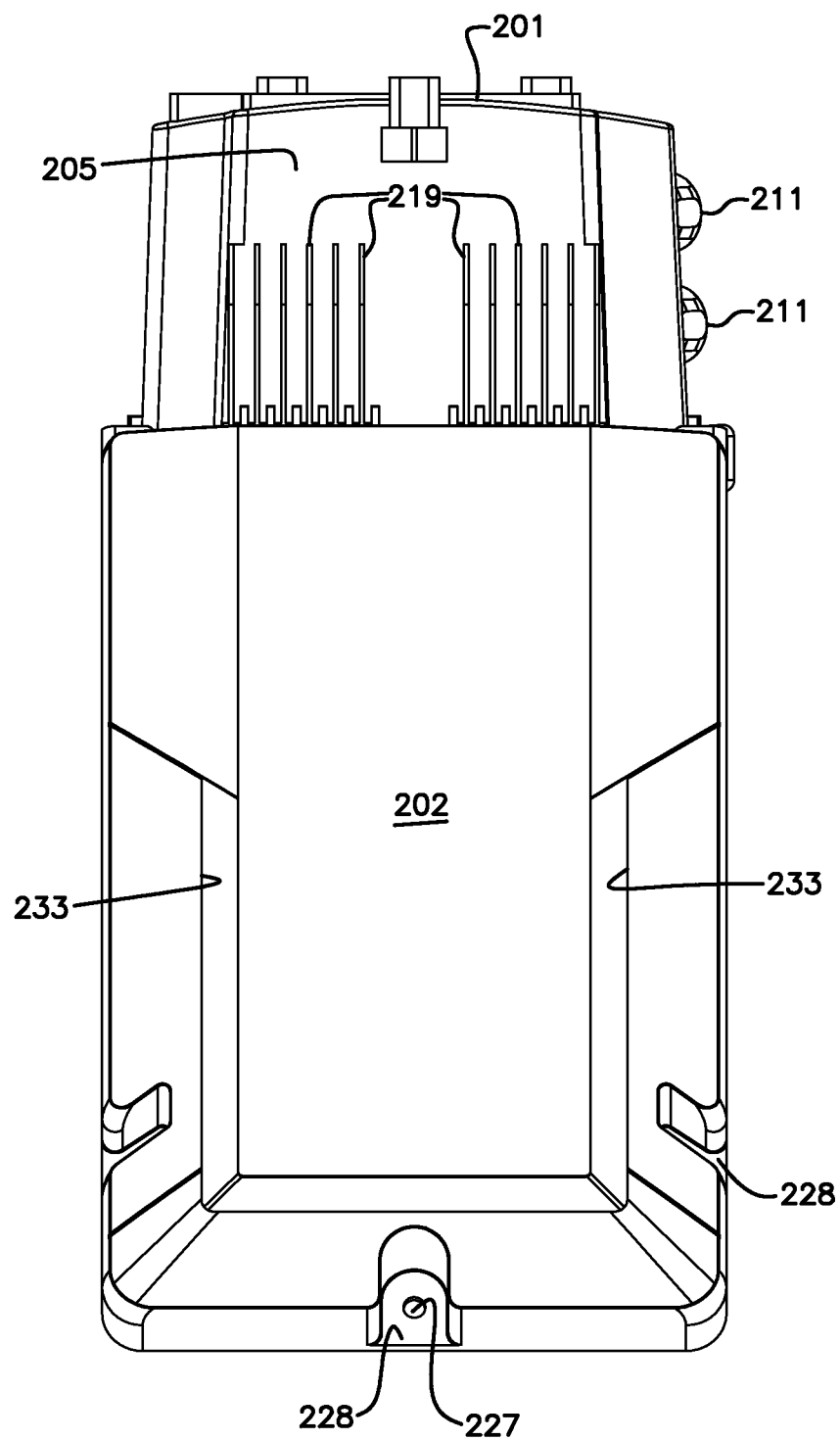
FIG. 27 is a top plan view of the example aggregation box of FIG. 19.
Figure 28:
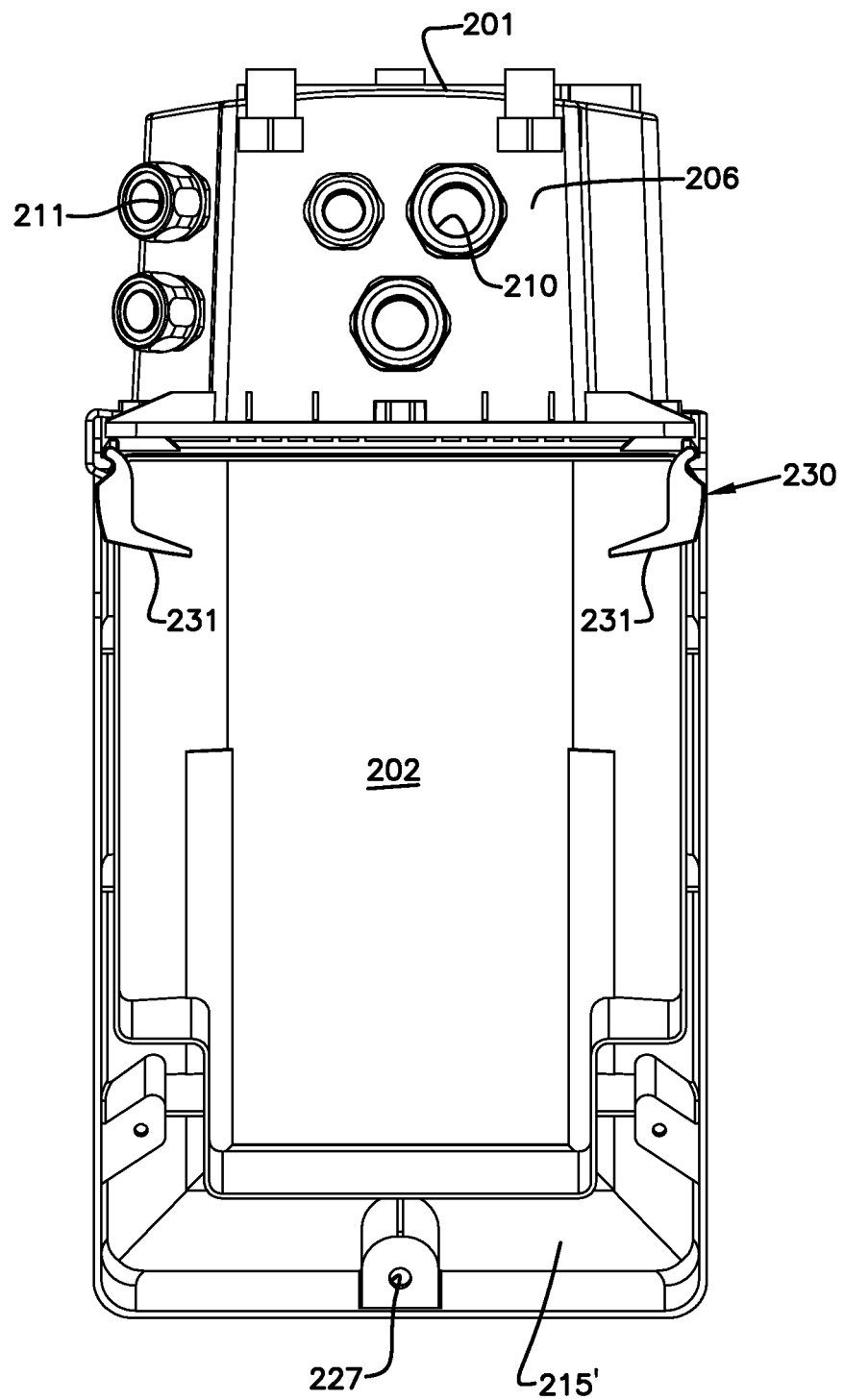
FIG. 28 is a bottom plan view of the example aggregation box of FIG. 19.

In some implementations, the output ports 211 are oriented at an angle relative to the sides 207, 208 of the body 201. For example, the output ports 211 may face at least partially towards the bottom 206 of the body 201. The sides 207, 208 that define the output ports 211 include one or more angled sections. In certain implementations, the sides 207, 208 that do not define output ports 211 may define an inward ledge 213 (see FIG. 19). In certain implementations, an outer periphery of the brim 214 extends outwardly beyond an outer periphery defined by the angled tiers 212. For example, as shown in FIG. 14, a gap G may extend between an outer edge of one or more tiers 212 and the outer edge of the brim 214.

In some implementations, the front of the brim 214 defines a gasket region 215. In certain implementations, the cover 202 has a corresponding gasket region 215' that aligns with the gasket region 215 of the body 201. In certain implementations, a gasket may be disposed at one of the gasket regions 215, 215 so that the gasket (e.g., a rubber ring, a foam, a gel, etc.) is compressed when the cover 202 is in the closed position. In other implementations, each region 215, 215' holds a gasket that compresses against the other gasket when the cover 202 is closed. Compression of the gasket(s) inhibits contaminants (e.g., dirt, moisture, insects, and rodents) from entering the interior 209. In still other implementations, the body 201 and cover 202 fit together to seal the interior 209 without a separate gasket. In still other implementations, the interior 209 is not sealed.

In some implementations, the cover 202 is configured to pivot relative to the body 201. For example, the cover 202 may be attached to the body 201 at a hinge arrangement 216. In certain implementations, the hinge arrangement 216 is disposed at a top 205 of the body 201 and extends side-to-side. In other implementations, however, a laterally-extending hinge arrangement may be disposed at the bottom 206 of the body. In still other implementations, a longitudinally-extending hinge arrangement may be disposed at either side 207, 208 of the body 201.

In some implementations, the hinge arrangement 216 includes at least one first hinge part 217 located on the body 201 and at least one second hinge part 218 disposed on the cover 202. The first and second hinge parts 217, 218 wrap around one or more hinge pins. In certain implementations, each hinge part 217, 218 includes one or more alignment ribs 219. At least some of the alignment ribs 219 of the first hinge part 217 interleave with at least some of the alignment ribs 219 of the second hinge part 218 as the cover 202 is pivoted to the open position. In the example shown, the first hinge part 217 includes a middle section of alignment ribs 219 spaced from an alignment rib 219 on each side. The second hinge part 218 includes two groups of alignment ribs 219, each disposed at least partly between the middle section of alignment ribs and one of the side alignment ribs of the first section 217.

In accordance with some aspects, the cover 202 may be retained in the open position (FIGS. 19-28) by a retaining arrangement 220. In some implementations, the retaining arrangement 220 is located on the cover 202. In certain implementations, the cover 202 includes a main section 221 that extends over the front 203 of the body interior 209. The cover 202 also includes wings 222 that extend rearward from opposite sides 207, 208 of the main section 221 at the top 205. In certain implementations, the wings 222 also extend upwardly past the top of the main section 221. When the cover 202 is closed, the wings extend across the top 205 of the body 201. In certain implementations, the top 205 of the body 201 has a reduced width as compared to an intermediate portion of the body 201.

Each wing 222 includes a tab 223 that extends inwardly from the wing 222. Each tab 223 defines a ramp 224 extending inwardly and upwardly from the wing 222. Each tab 223 defines a shoulder 225 at the top of the ramp 224. When the cover is closed, the tab 223 is disposed at a position raised above the top 205 of the body 201. As the cover 202 is rotated to the open position, the wings 222 slide downwardly and forwardly along the sides 207, 208 of the body 201 and the tabs 223 slide over the brim 214 of the body 201. In some implementations, the wings 222 flex outwardly to enable the ramps 224 of the tabs 223 to cam over the brim 214. In other implementations, the tabs 223 are configured to flex towards the wings 222. The shoulders 225 of the tabs 223 seat on the brim 214 to hold the cover 202 in the open position. To close the cover 202, a user may manually compress the tabs 223 towards the wings 222 until the tabs 223 clear the brim 214 as the cover 202 is rotated downwardly.

In accordance with some aspects, the cover 202 may be locked in the closed position using a locking arrangement 226. In some implementations, the locking arrangement 226 includes one or more apertures 227, 229 defined in the cover 202 and body 201, respectively, through each of which a fastener or lock may extend. In certain implementations, the apertures 227 defined in the cover 202 are located at recessed sections 228 of the cover 202. In one example implementations, the side apertures 227, 229 are configured to receive screws and the bottom aperture 227, 229 is configured to receive a securing screw or padlock.

In some implementations, the housing 200 does not define unsealed apertures into the housing interior 209. For example, in certain implementations, the locking apertures 227, 229 may be located at the gasket regions 215', 215 of the cover 202 and body 201, respectively (see FIG. 21). In other implementations, the locking apertures 227, 229 may be located outside the gasket regions 215', 215.

In some implementations, at least one of the apertures 227 is sized to accommodate a carabiner or other fastener inserted through one of to facilitate deployment of the housing 200. For example, the housing 200 may be pulled up the antenna tower using the carabiner. In other implementations, a separate deployment flange and aperture may be provided on the housing to accommodate the carabiner.

In some implementations, the cover 202 may be latched to the body 201. As shown in the implementation shown in FIGS. 19-22, one or more clip members 230 may be disposed on the body 201. Each clip member 230 includes a latching element 231 and one or more retaining members 232. Each latching element 231 is configured to hook onto a front of the cover 202 (e.g., at indents 233 of FIG. 10). Each latching element 231 also is pivotally coupled to one end of each retaining member 232. The opposite end of each retaining member 232 is configured to latch to the body 201 (e.g., by wrapping around the brim 214). Accordingly, the cover 202 may be locked in the closed position by wrapping the clip members 230 around the sides 207, 208 of the housing 200. The clip members 230 also are suitable for use at the top 205 and bottom 206 of the housing 200.

In accordance with some aspects, the housing 200 includes a mounting arrangement 234 that is configured to secure the housing 200 to a surface or object. In some implementations, the mounting arrangement 234 includes one or more mounting flanges 235 disposed on the rear 204 of the body 201. Apertures 236 extend through the flanges 235 to enable a fastener to pass through to secure the housing 200 to a surface. In the example shown in FIGS. 9-28, four mounting flanges 235 are disposed at the outer corners of the body 201. In other implementations, a greater or lesser number of mounting flanges 235 may be disposed in any desired location.

Figure 30:
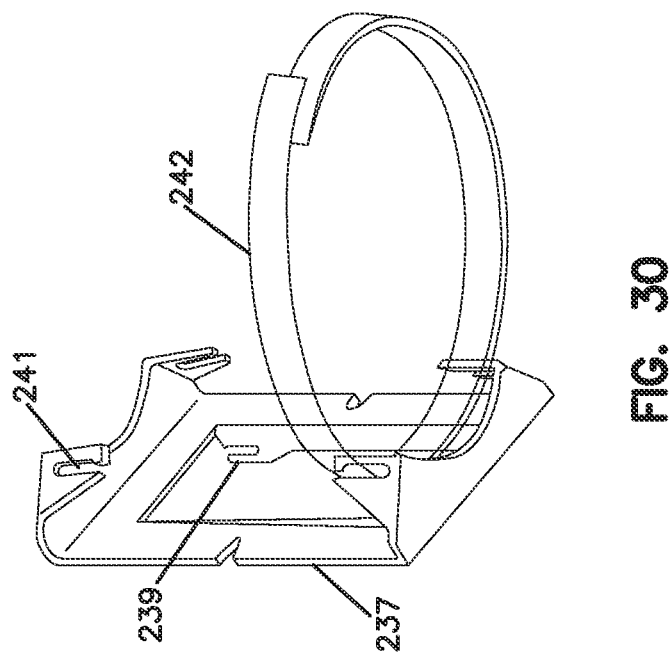
FIGS. 29-32 illustrate some alternative implementations of example mounting arrangement suitable for securing the housing to a surface or object.

In some implementations, the housing 200 may define one or more slots through which one or more wrap-around elements (e.g., cords, straps, or chains) 242 may extend (e.g., see FIG. 30). The wrap-around elements 242 are sufficiently flexible to be wrapped around an object (e.g., a utility pole, a structural support beam, etc.). Ends of the wrap-around element 242 are tied together, glued, fastened, or otherwise secured to mount the housing 200 to the object. In the example shown in FIG. 30, two slots 241 are configured to receive a wrap-around element 242 at a top of the housing and two slots 241 are configured to receive a wrap-around element 242 at a bottom of the housing.

Figure 29:
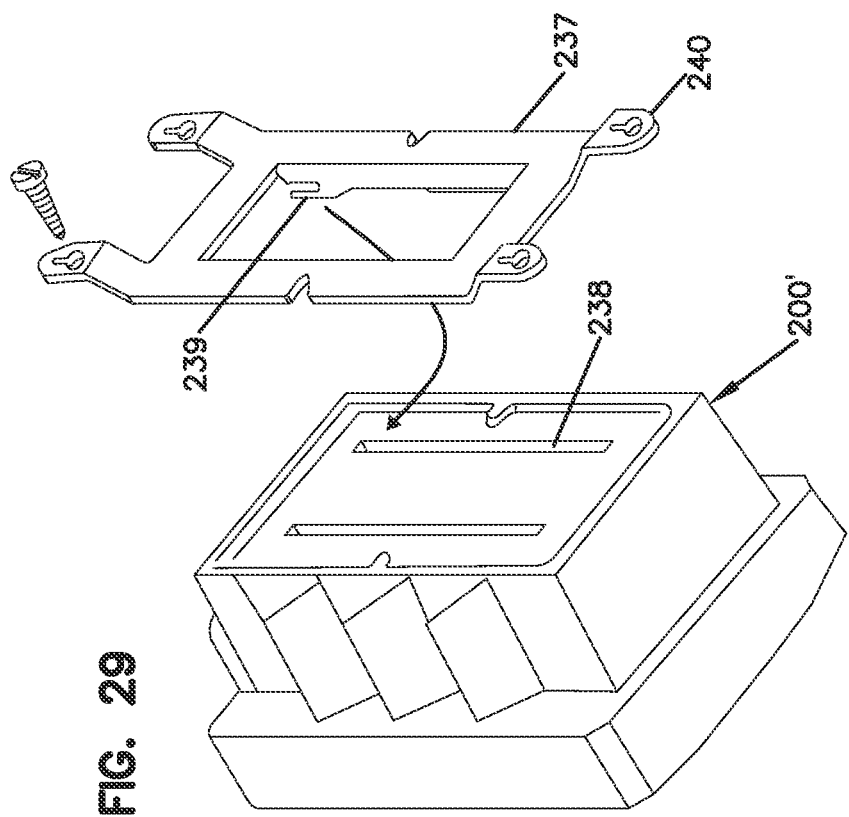

FIGS. 29-32 illustrate some alternative implementations of example mounting arrangement 234 suitable for securing the housing 200 to a surface or object. The mounting arrangements 234 of FIGS. 29-32 include a mounting bracket 237 that is coupled to the housing 200. FIG. 29 illustrates an example housing 200' defining one or more slots 238 at the rear of the body. FIG. 29 also illustrates an example bracket 237 including a corresponding number of hooks 239 that are each sized to fit into one of the slots 238. In the example shown, the housing 200' defines two slots 238.

Such a configuration facilitates deployment of the housing 200' at a top of an antenna tower (e.g., tower 110 of FIG. 1). When the housing 200' is deployed, the bracket 237 may be installed at the top of the tower first. In some implementations, the bracket 237 includes mounting flanges 240 through which fasteners may extend to secure the bracket 237 to a surface. In other implementations, the bracket 237 defines slots 241 through which a wrap-around element 242 extends to secure the bracket 237 to an object. Subsequently, the housing 200' is hung on the bracket 237. Accordingly, the housing need not be held or otherwise maintained at the top of a tower or other structure while the bracket 237 is being secured to the structure.

Figure 32:
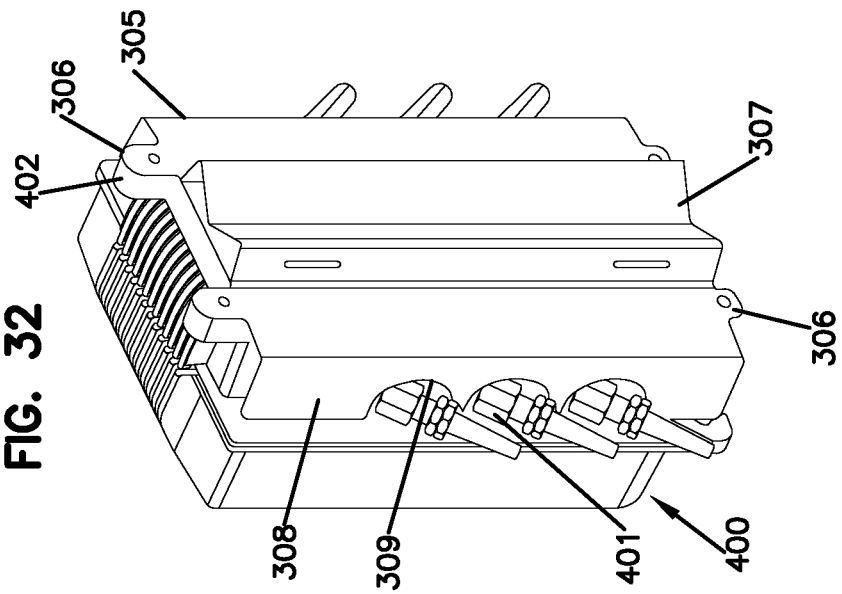
Figure 31:
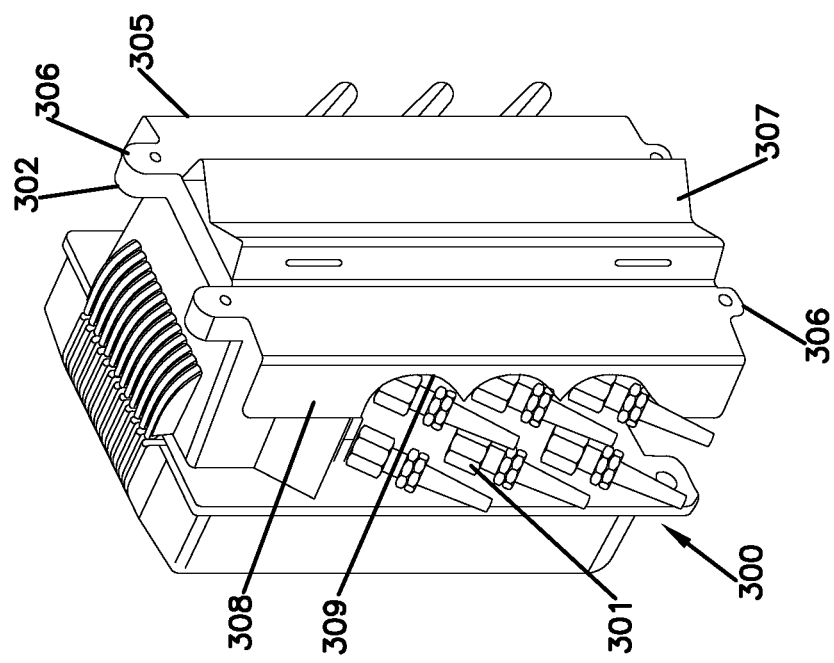

In the examples shown in FIGS. 31 and 32, an example bracket 305 is configured to be fastened to various example aggregation box housings 300, 400. The housing 300 shown in FIG. 31 defines two columns of output ports 301 and the housing 400 shown in FIG. 32 defines one column of output ports 401. In other implementations, the housing may have any desired configuration of output ports. The example bracket 305 include mounting flanges 306 that align with mounting flanges 302, 402 of the housing 300, 400. In the example shown, the housings 300, 400 and the bracket 305 include four mounting flanges 302, 402, 306, respectively.

In some implementations, sides 308 of the bracket 305 extend at least partially over the sides of the housing 300, 400. Cutouts or recessed portions 309 may be defined in the sides 308 of the bracket 305 to accommodate the output ports 301, 401 of the housing 300, 400. The bracket 305 also each include a contoured section 307 that facilitates mounting the housing 300, 400 to various objects. In various implementations, the contoured section 307 may be curved, V-shaped, U-shaped, C-shaped, W-shaped, or otherwise shaped to increase surface contact with an object. In the example shown, the V-shaped contoured section 307 enables the housing 300, 400 to be mounted to poles having a wide range of diameters.

In accordance with some implementations, the aggregation box housing 200 may include one or more ports covered by a breathable membrane. For example, a breathable membrane may inhibit moisture or other contaminants from entering the housing interior 209, while allowing moisture to escape from the inside. In one implementation, the breathable membrane is formed from a GoreTex breathing membrane.

In accordance with some aspects, the components (e.g., components 136 of FIG. 2) provided within a aggregation box are disposed on a removable component panel. The component panel may be fastened, snap-fit, or otherwise attached to the interior of the aggregation box. One or more components may be mounted to the component panel prior to installation of the component panel within the aggregation box. In some implementations, the component panel is installed at the factory prior to deployment of the aggregation box. In other implementations, one component panel may be removed and replaced with another component panel when the aggregation box is deployed.

Figure 33:
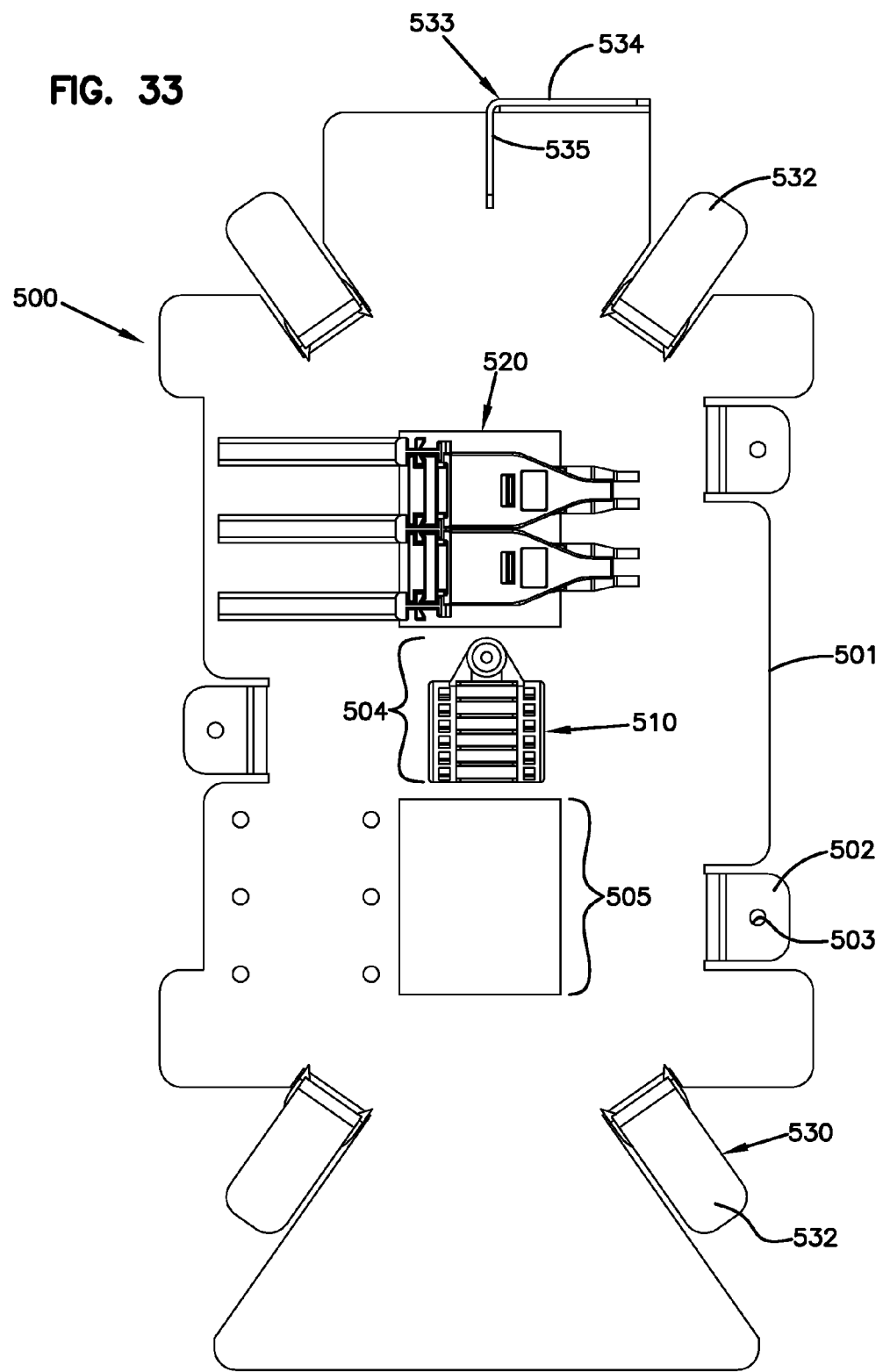
FIGS. 33-35 illustrate one example optical component panel suitable for use within the interior of an example fiber aggregation box.
Figure 34:
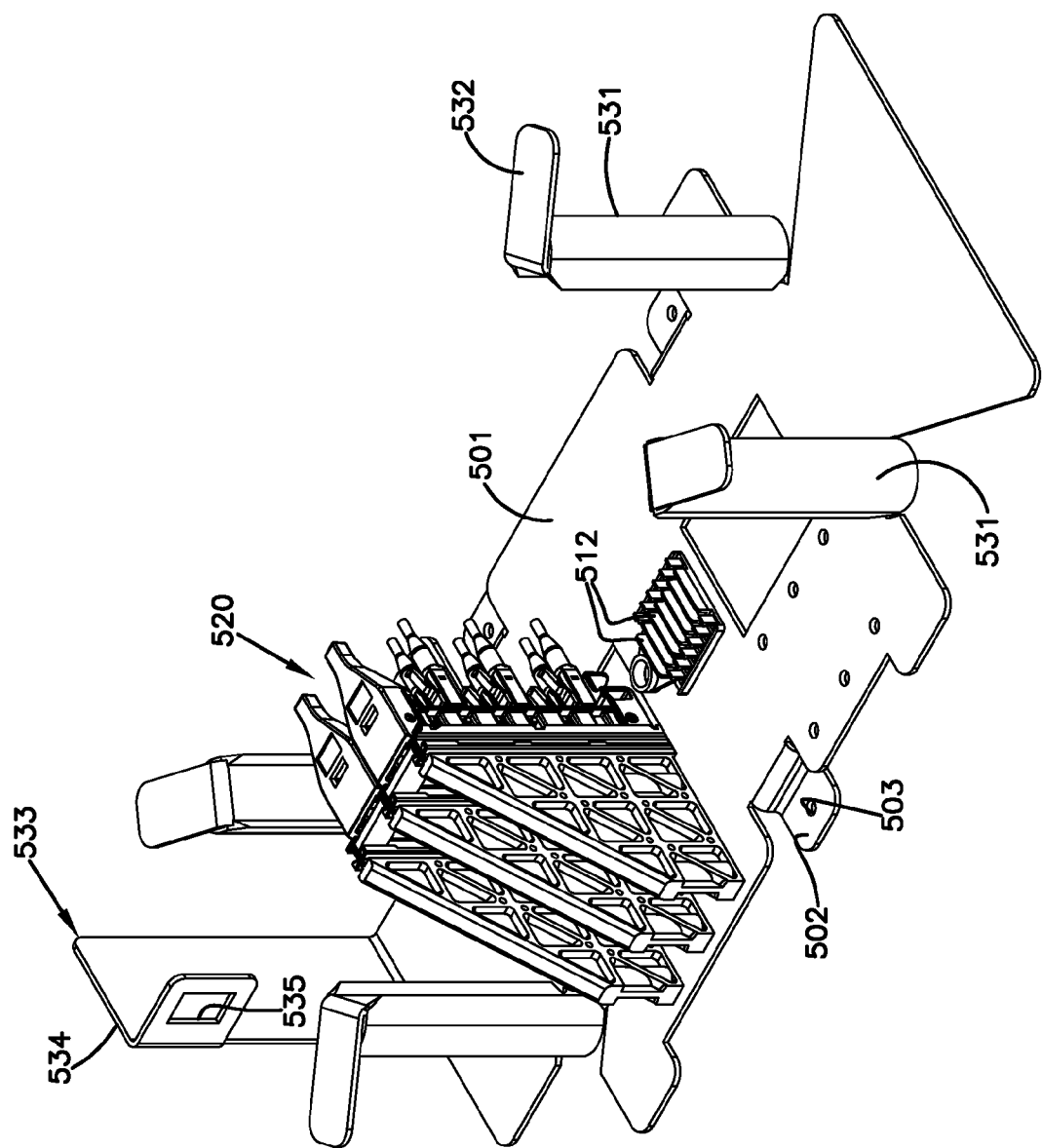
Figure 35:
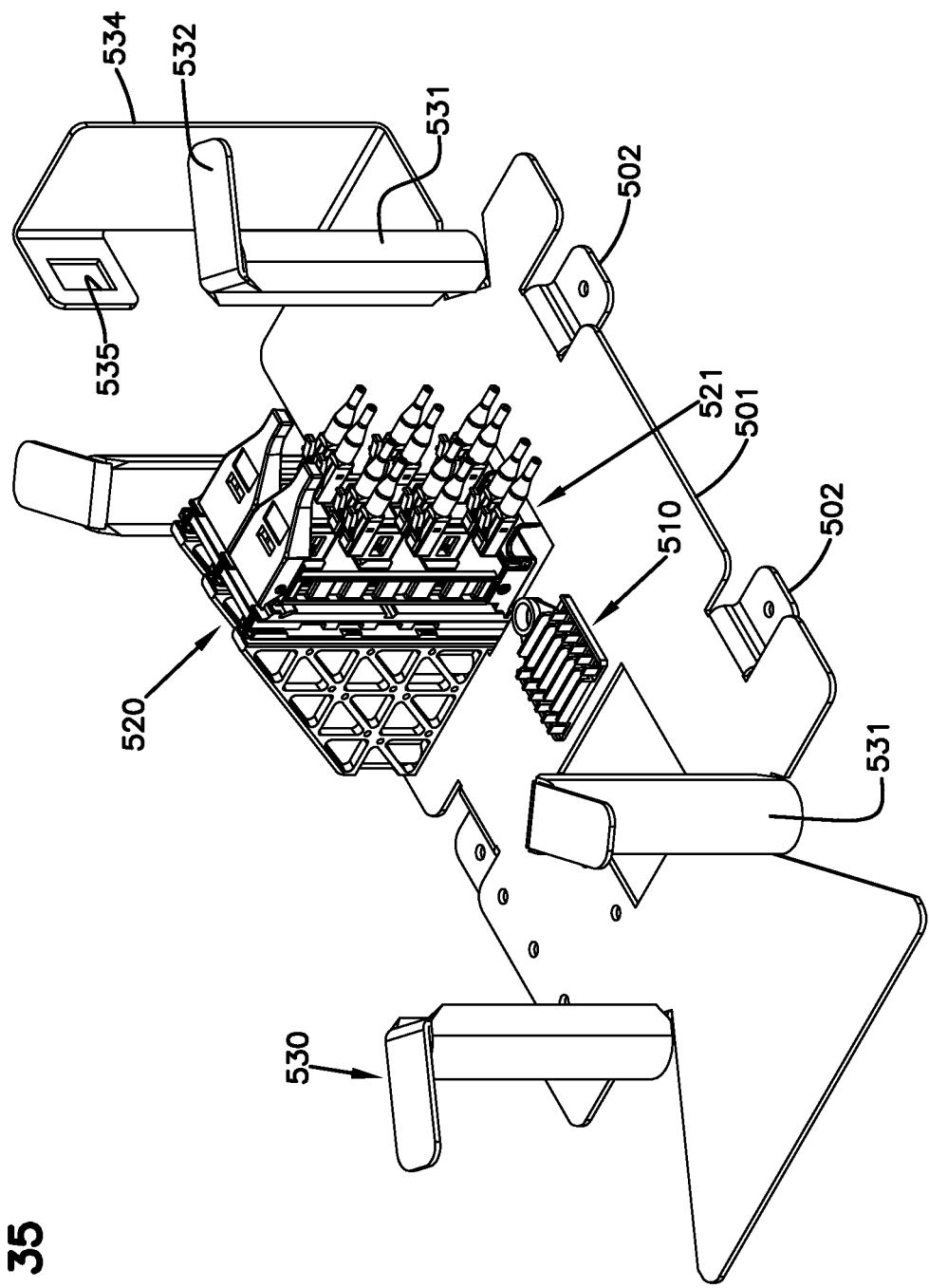

FIGS. 33-35 illustrate one example optical component panel 500 suitable for use within the interior of an example fiber aggregation box, such as aggregation boxes 130, 200 above. The optical component panel 500 includes a base 501 that is configured to mount within the interior of the aggregation box housing. In some implementations, the base 501 includes mounting flanges 502 defining apertures 503 through which fasteners may extend to secure the base 501 to a rear or side wall of the aggregation box housing. In the example shown, the base 501 includes three mounting flanges 502. In other implementations, however, the base 501 may include a greater or lesser number of mounting flanges 502.

In some implementations, the optical component panel 500 may define an optical splicing location 504 at which one or more optical splicing arrangements 510 may be disposed. In certain implementations, the optical splicing arrangements 510 includes one or more splice sleeve holders 512 at which a splice sleeve may be secured. In other implementations, however, the optical splicing arrangement 510 may include splice cassettes or trays that include splice sleeve holders 512. In the example shown, the optical splicing location 504 is provided at a central portion of the base 501. In other implementations, however, the optical splicing location 504 may be provided at any location on the base 501.

In some implementations, the optical component panel 500 may define an optical termination location 505 at which one or more optical termination arrangements 520 may be disposed. The optical termination arrangements 520 include one or more adapters at which connectorized ends of optical fibers may be coupled. In certain implementations, the optical termination arrangements 520 include one or more adapters fixed to a panel or other surface (e.g., the base 501). In certain implementations, the optical termination arrangements 520 include sliding adapter modules 521 (see FIGS. 36-39).

In the example shown, the sliding adapter modules 521 are oriented to slide forwardly and rearwardly. The ports of the sliding adapter modules 521 are oriented to face towards the first and second sides of the aggregation box housing. In other implementations, however, the sliding adapter modules 521 may be oriented to slide along a different axis. In still other implementations, the sliding adapter modules 521 may be oriented so that the ports face upwardly and downwardly or at diagonals to the sides of the aggregation box housing. In the example shown, the base 501 includes an upper termination location 505 above the optical splicing location 504 and a lower termination location 505 below the optical splicing location 504. In other implementations, one or more termination locations 505 may be disposed anywhere on the base 501.

In some implementations, the base 501 also includes one or more fiber management components 530. For example, the base 501 may include one or more bend radius limiters 531 positioned to route optical fibers within the aggregation box interior. In the example shown, the base 501 includes two bend radius limiters 531 positioned to be located at a top of the aggregation box interior and two bend radius limiters 531 positioned to be located at a bottom of the aggregation box interior. In other implementations, the base 501 may have any desired configuration of bend radius limiters 531. In the example shown, the bend radius limiters have retaining ends 532.

In certain implementations, the base 501 also includes a cable tying element 533 at which one or more optical fibers may be secured using cable ties or other wrap-style fasteners. In the example shown, the cable tying element 533 includes a forwardly extending member 534 having a portion that defines an apertures 535. A cable tie or other fastener may be wrapped around the fibers to be secured and looped through the aperture 535 to hold the fibers in place.

Figure 36:
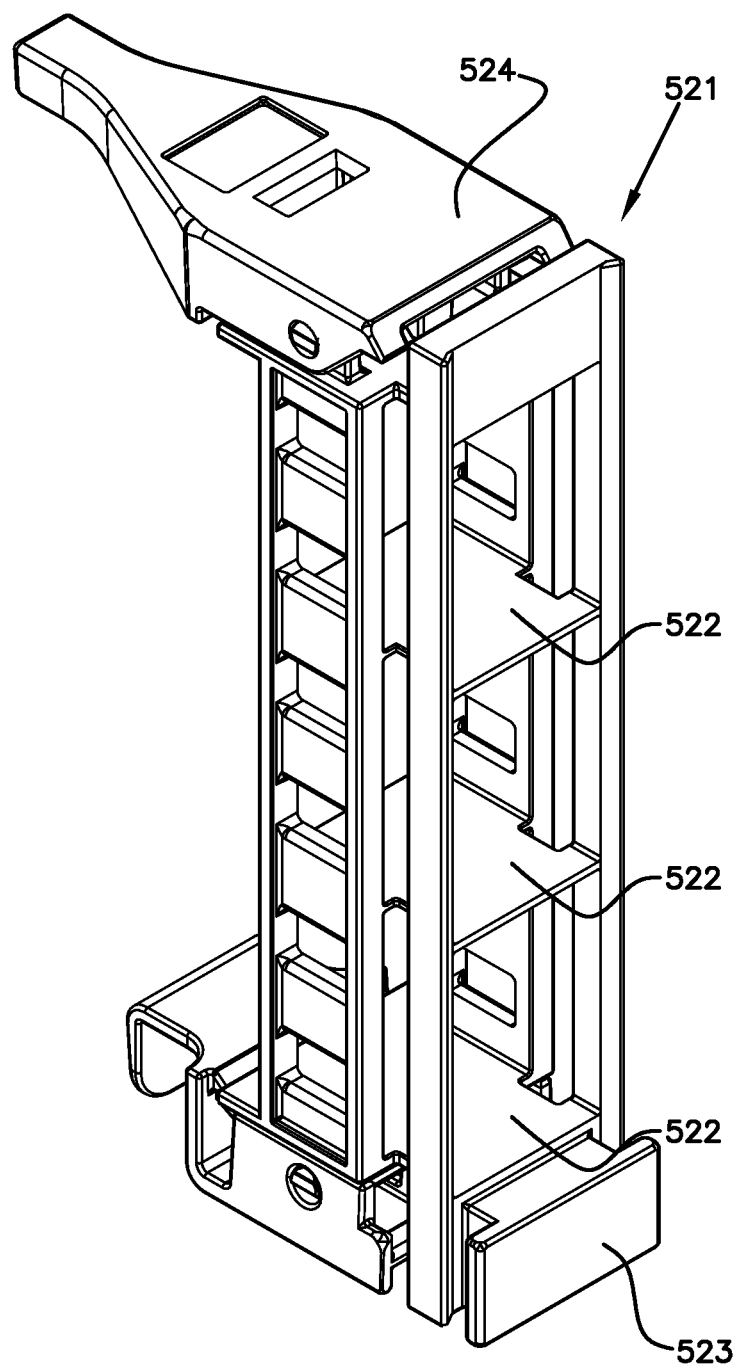
FIGS. 36-38 show one example sliding adapter module suitable for use with an optical component panel.
Figure 37:
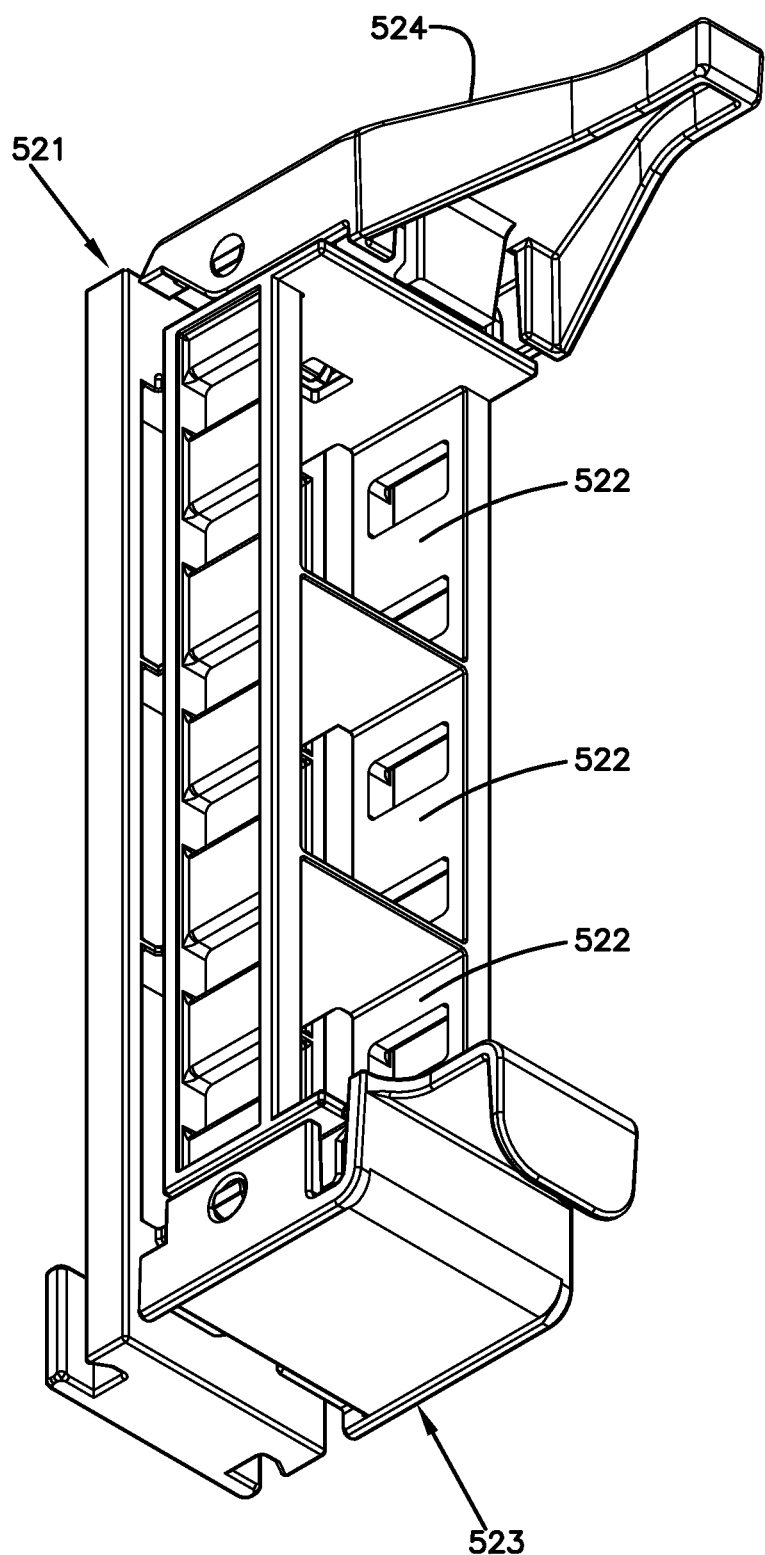
Figure 38:
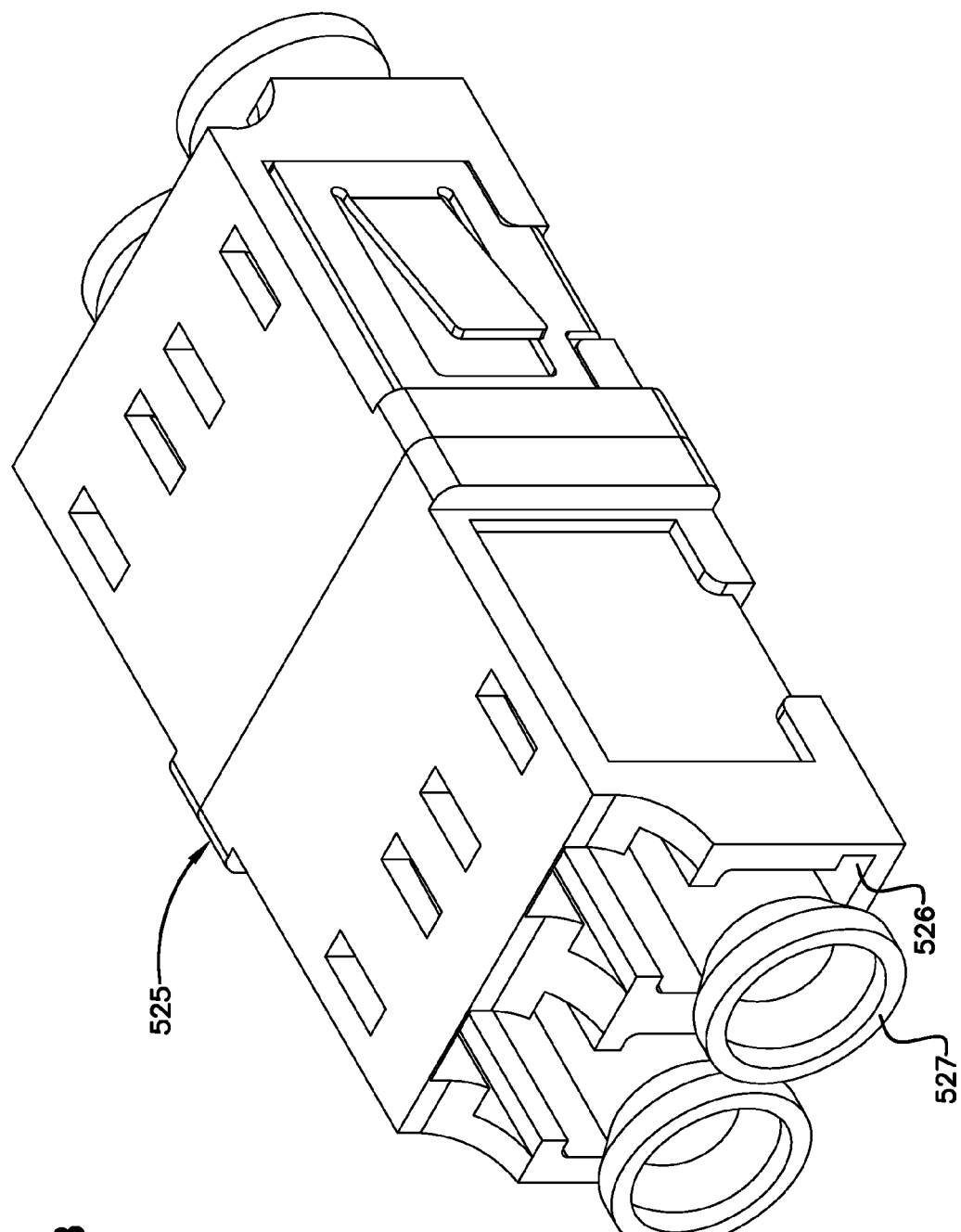

FIGS. 36-38 show one example sliding adapter module 521 suitable for use with the optical component panel 500. In some implementations, the adapter module 521 defines one or more passages 522 configured to receive and align fiber optic adapters 525 (FIG. 38). In the example shown, the adapters 525 define two side-by-side passages that are configured to receive two side-by-side fiber optic connectors at each end. In other implementations, the adapter 525 may define a single passage to receive a single fiber optic connector at each end. In still other implementations, the adapter modules are integral with the sliding adapter module body 521.

Figure 39:
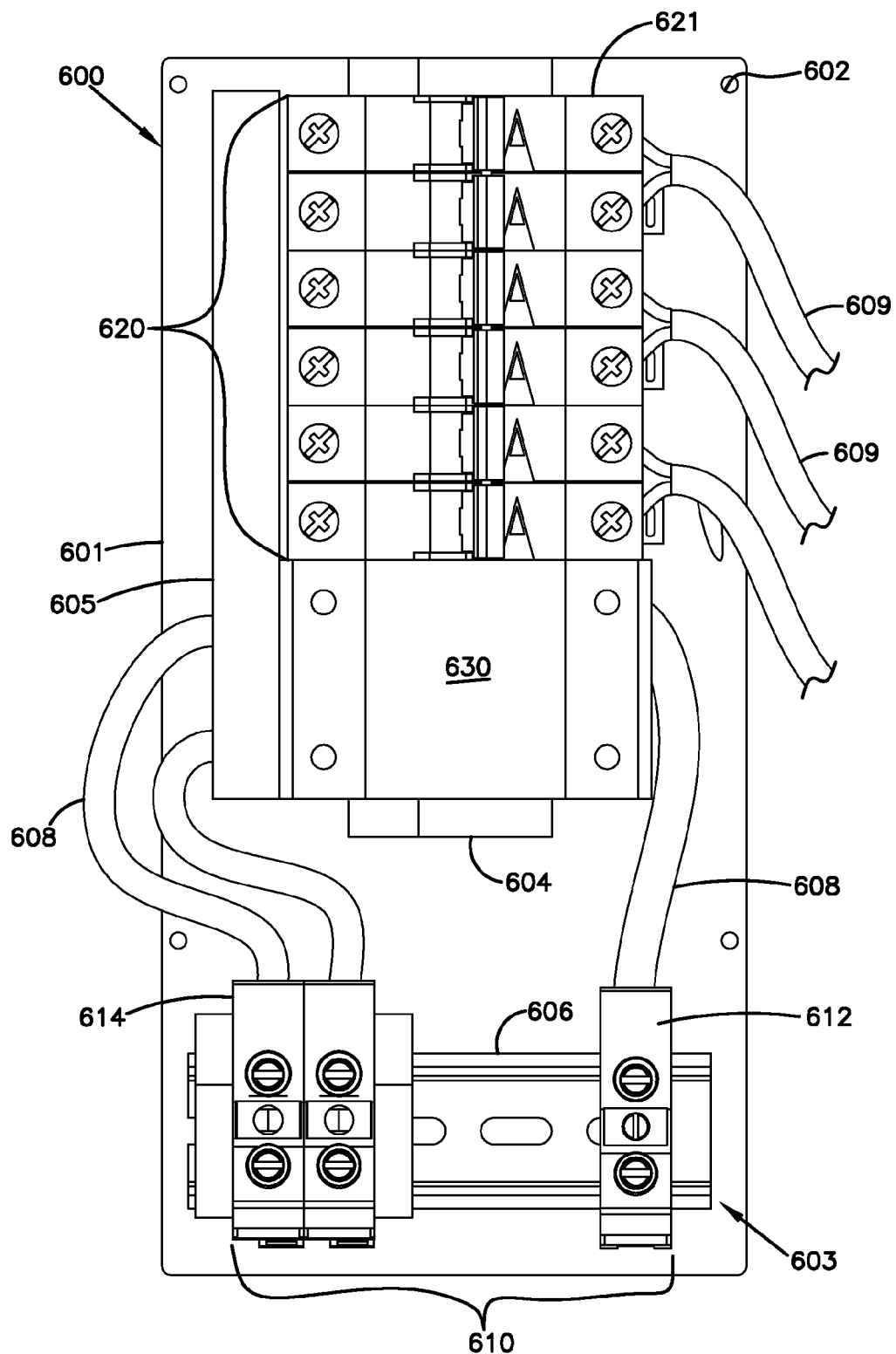
FIGS. 39-41 illustrate one example electrical component panel suitable for use within the interior of an example fiber aggregation box.
Figure 40:
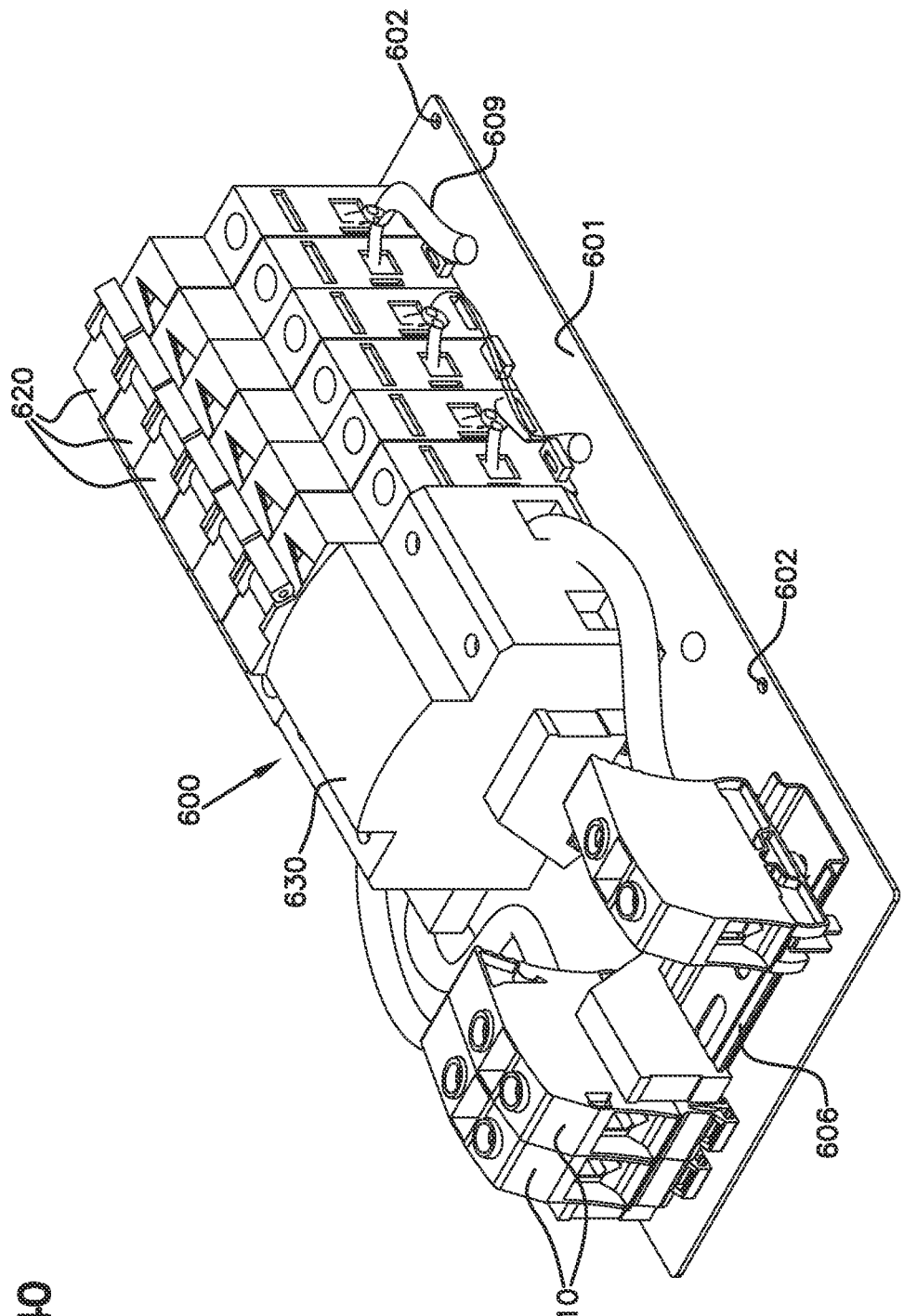
Figure 41:
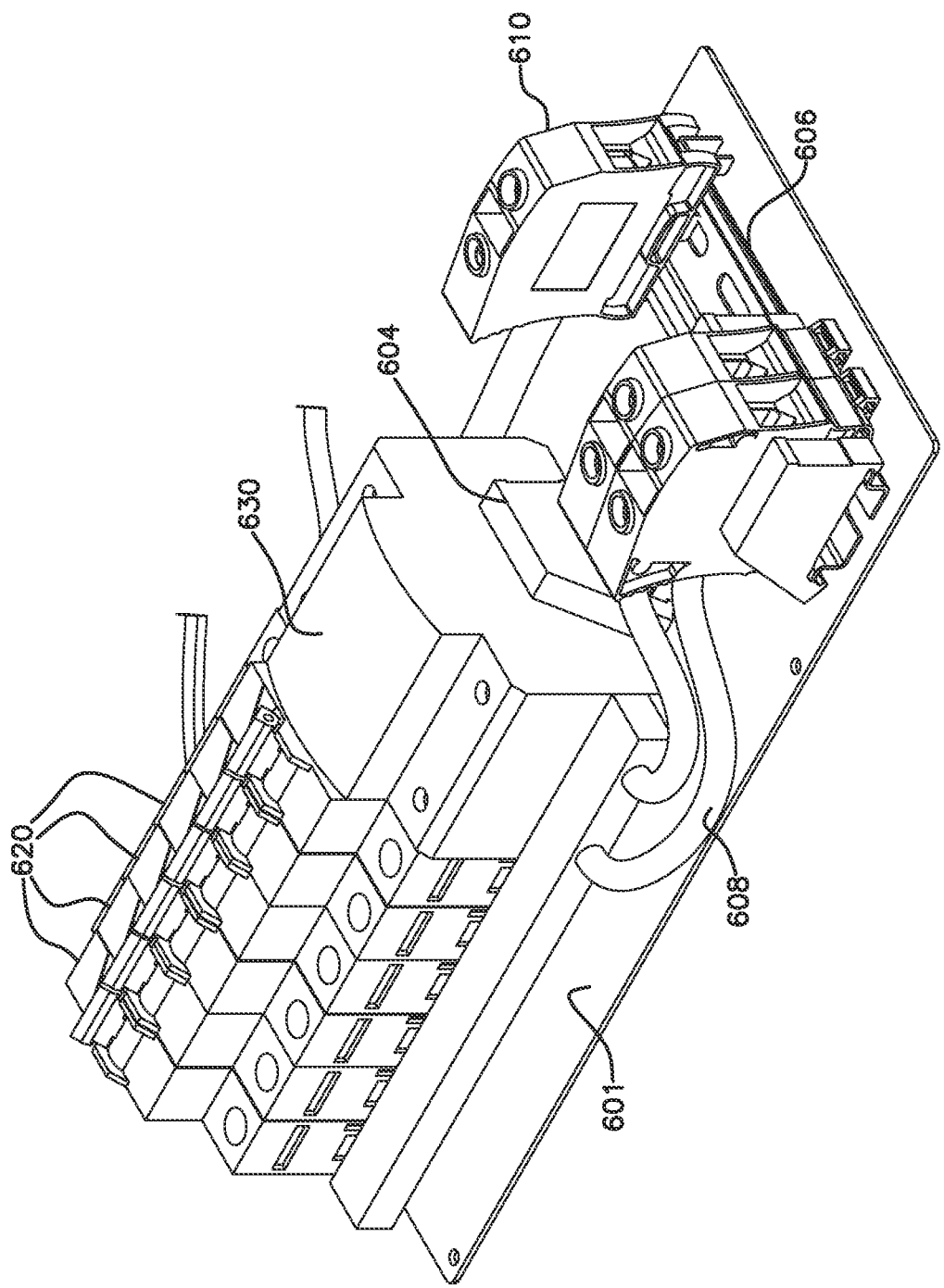

FIGS. 39-41 illustrate one example electrical component panel 600 suitable for use within the interior of an example fiber aggregation box, such as aggregation boxes 130, 200 above. The electrical component panel 600 includes a base 601 that is configured to mount within the interior of the aggregation box housing. In some implementations, the base defines mounting apertures 602 through which fasteners may extend to secure the base 601 to a rear or side wall of the aggregation box housing. In the example shown, the base 601 defines four apertures 602. In other implementations, however, the base 601 may define a greater or lesser number of mounting apertures 602.

In some implementations, the electrical component panel 600 includes an electrical rail arrangement 603. For example, the rail arrangement 603 may include a first terminal bar or rail 604 disposed on a front of the base 601. In certain implementations, the first terminal rail 604 is a DIN rail. In the example shown, a power bar arrangement 605 is disposed on the first terminal rail 604, which is oriented vertically and located at a top of the base panel 601. In one implementation, the power bar arrangement 605 includes two bars extending along the rail.

In some implementations, a plurality of circuit breakers 620 are disposed on the first termination rail 604 (e.g., over the power bar 605). The power bar 605 distributes incoming voltage to each of the individual circuit breakers 620 along the first termination rail 604. The circuit breakers 620 receive power from the incoming cable 128 and output power to the outgoing cables 129. In certain implementations, the outgoing cables 129 are shielded and grounded.

In other implementations, switches may be used in place of one or more of the circuit breakers 620. In still other implementations, termination blocks may be used in place of one or more of the circuit breakers 620. In some implementations, one or more OVP devices 630 also are disposed on the rail arrangement 603. In the example shown, an OVP device 630 is disposed on the first terminal rail 604. In certain implementations, multiple OVP devices 630 may be disposed on the first terminal rail 604.

In some implementations, the rail arrangement 603 also includes a second terminal bar or rail 606 that is oriented horizontally and located at a bottom of the base panel 601. In certain implementations, the OVP device 630 may be disposed on the second terminal rail 606 in addition to or instead of the first terminal rail 604. In certain implementations, the incoming cables 128 are sufficiently rigid to inhibit bending of the cable. Accordingly, one or more termination blocks 610 or other electrical components may be disposed on the second terminal rail 606. The termination blocks 610 receive the incoming cable 128 and outputs one or more intermediate cables 608 to components on the first terminal rail 604.

For example, in some implementations, the intermediate cables 608 may be routed to the OVP device 630. In other implementations, the intermediate cables 608 may be routed to the circuit breakers 620, switches, or other distribution components. The intermediate cables 608 are generally more flexible than the incoming cable 128. For example, the intermediate cables 608 may have thinner conductors and/or thinner insulation than the incoming cable 128. In other implementations, one or more termination blocks 610 may be mounted to the first rail 604. In still other implementations, one or more circuit breakers 620 or switches may be mounted to the second terminal rail 606.

In some implementations, the termination blocks 610 include one or more grounding blocks 612 and one or more power distribution blocks 614. The grounding block 612 is coupled to the grounding structure of the tower. The power distribution blocks 614 receive conductors of the incoming cable 128. The termination blocks 612, 614 are configured to mount to the second terminal rail 606 (e.g., to slide onto or clip to a DIN rail). In certain implementations, the grounding block 612 is spaced from or otherwise separated from the power distribution blocks 614. As shown, a separate intermediate cable 608 may connect the grounding block 612 to the components on the first rail 604.

Figure 42:
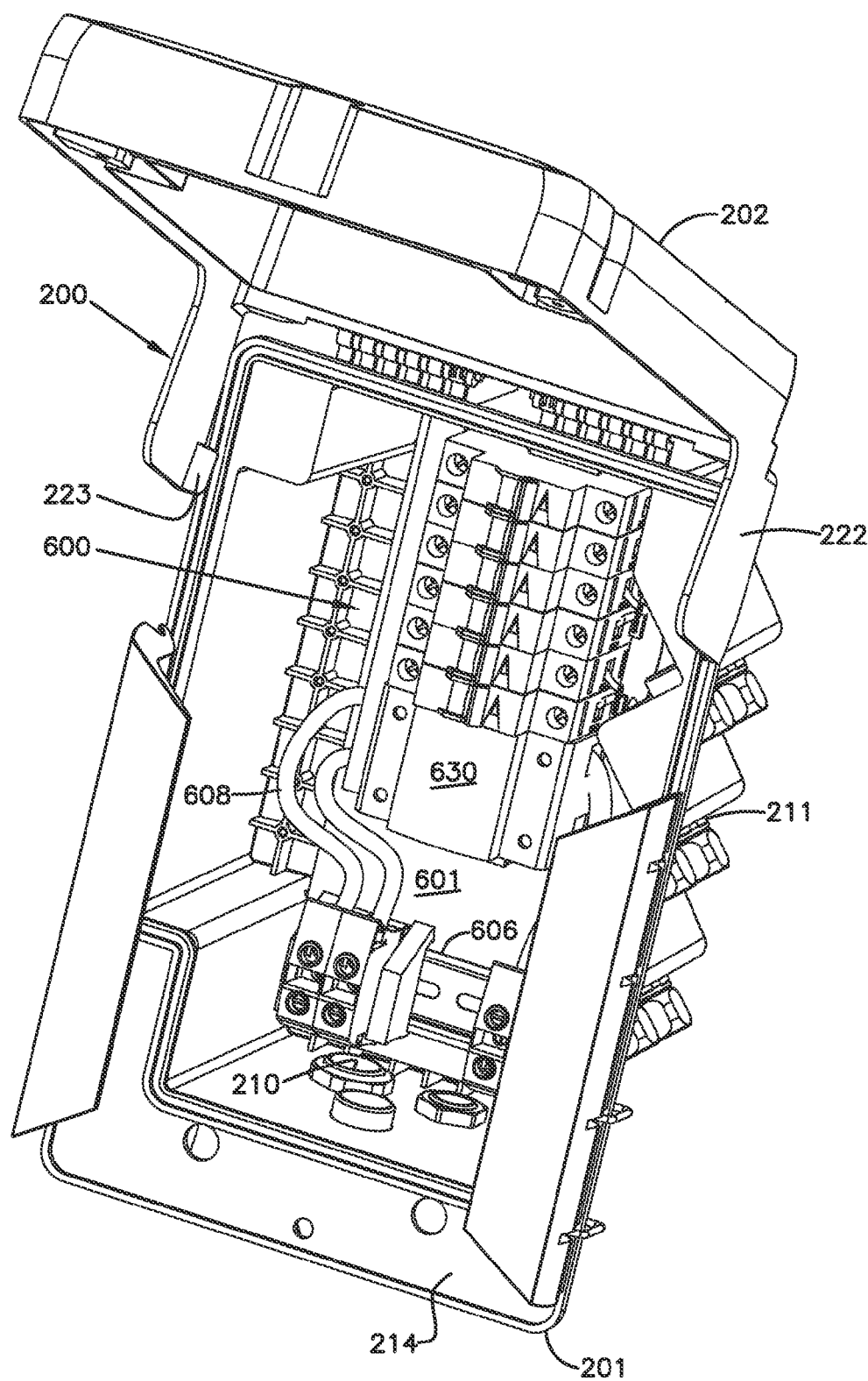
FIGS. 42-43 illustrate an example aggregation box holding an electrical component panel.
Figure 43:
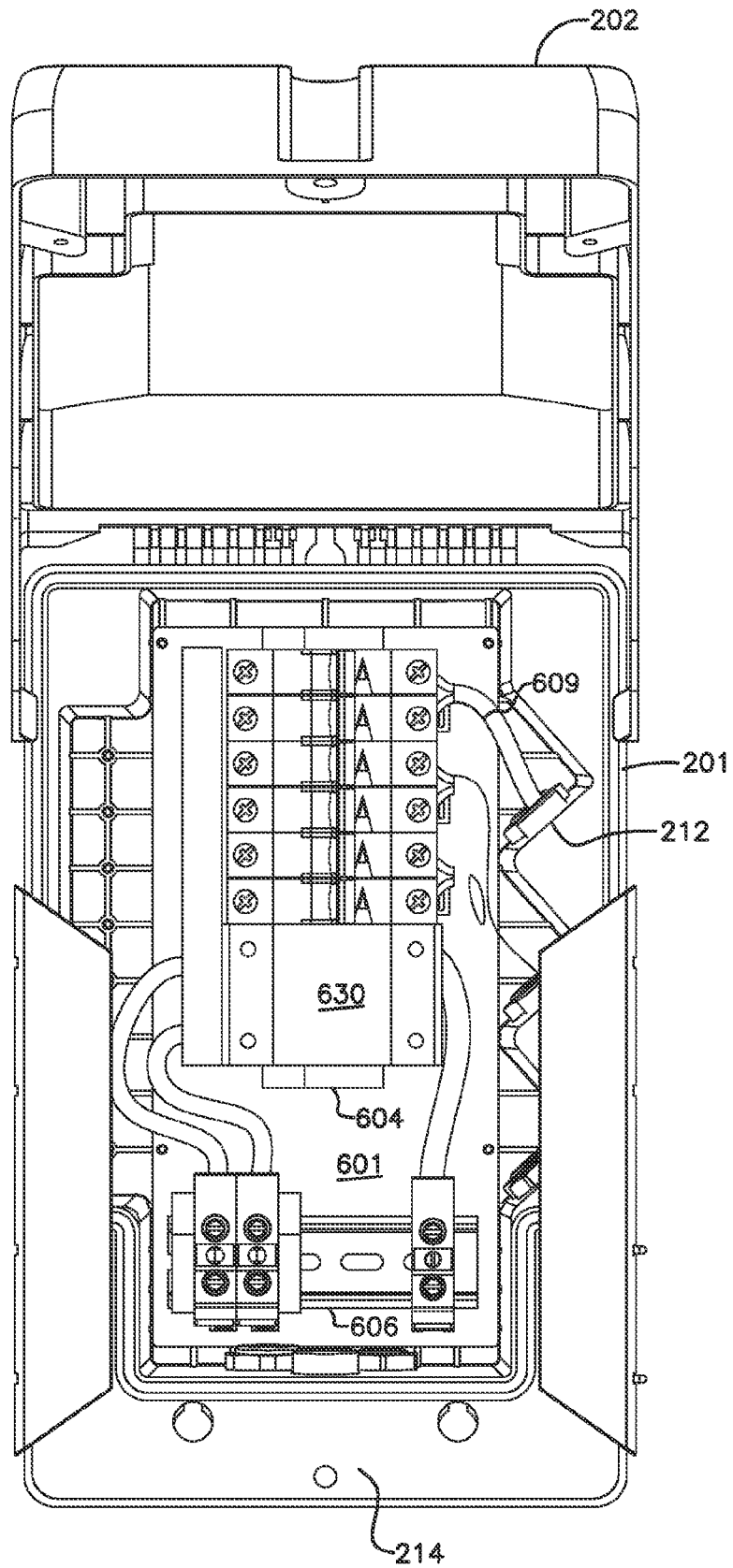

FIGS. 42 and 43 illustrate the example aggregation box housing 200 of FIGS. 9-28 enclosing the example electrical component panel 600 of FIGS. 39-41. The panel base 601 is mounted and oriented so that the termination blocks 610 are disposed at the incoming cable input ports 210 and the circuit breakers 620 are disposed adjacent the outgoing cable output ports 211.

In accordance with some aspects, the component panel 600 is precabled at the factory or manufacturing center so that the components are mounted to the rail arrangement 603 and the intermediate cables 608 are routed between the components. In some implementations, the component panel 600 is intended to be mounted in a aggregation box housing 200 having cable connector interfaces disposed at the output ports 211. In some such implementations, cable pigtails 609 are output from the circuit breakers 620 or other distribution components on the panel 600. Connectorized ends of the pigtails 609 are plugged into the connector interfaces at the output ports 211 when the component panel 600 is installed at the aggregation box housing 200.

In some implementations, a component panel (e.g., fiber panel 500 or electrical panel 600) are installed within the aggregation box housing 200 prior to deployment of the housing 200 at the tower. For example, the component panel may be installed at the housing 200 at the factory or other manufacturing facility. In other implementations, the component panel may be installed at the tower.

Figure 44:
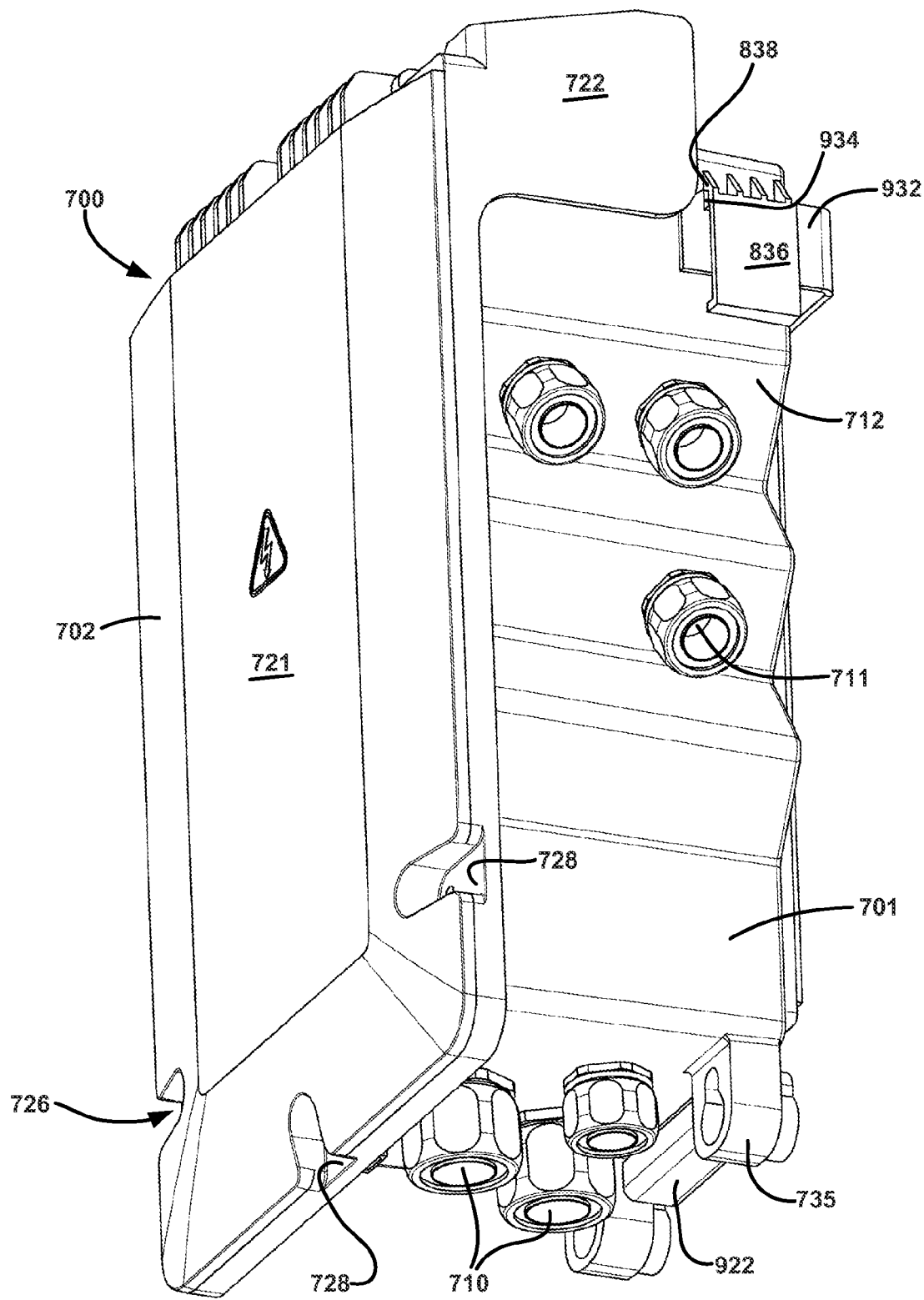
FIG. 44 is a forward, bottom view of an example aggregation box having a cover in a closed position and having three input ports at the bottom of the box and three angled output ports at a side of the box.

FIG. 44 is a front, bottom perspective view of another example implementation 700 of an aggregation box suitable for mounting to an antenna tower or rooftop. In some implementations, the aggregation box 700 is configured to receive and manage power cables. In other implementations, the aggregation box 700 is configured to receive and manage fiber optic cables instead of or in addition to the power cables. The aggregation box 700 includes a body 701 defining an interior and a pivotal cover 702 that provides and inhibits access to the interior of the body 701 from the front of the aggregation box 700. For example, the cover 202 is configured to move between a closed position and an open position. In some implementations, the body 701 and/or cover 702 are formed from plastic. In other implementations, the body 701 and/or cover 702 are formed from metal. In still other implementations, portions the body 701 and cover 702 are formed from plastic.

One or more cable input ports 710 are defined through a bottom of the body 701 to enable incoming cables (e.g., cables 124, 128 of FIG. 1) to enter the interior of the body 701. In some implementations, only a single cable input port 710 is defined in the body 701 of the aggregation box 700. In other implementations, multiple cable input ports 710 are defined in the body 701. In the example shown, three cable input ports 710 are defined in a bottom of the body 701. In some implementations, each cable input port 710 is generally the same size. In other implementations, the input ports 710 may have different sizes. In the example shown, the input ports 710 include one smaller input port and two larger input ports. For example, in one implementation, the larger input ports may receive power cables and the smaller input port may receive a grounding cable.

Cable output ports 711 are defined through at least a first side of the body 701 to enable outgoing cables (e.g., cables 125, 129 of FIG. 1) to exit the interior of the body 701. In some implementations, cable output ports 711 also are defined through a second side of the aggregation box body 701. In some implementations, the cable output ports 711 are disposed in rows or tiers 712. In the example shown, the body 701 defines three tiers 712. In other implementations, however, the body 701 may define a greater or lesser number of tiers 712. In some implementations, each tier 712 includes two output ports 711. In other implementations, each tier 712 may include a greater or lesser number of ports 711. In the example shown, a top tier 712 includes two output ports 711, a middle tier 712 includes one output port 711, and a bottom tier 712 does not define any output ports. In other implementations, however, a greater or lesser number of output ports 711 may be disposed at each tier 712. In some implementations, the output ports 711 are oriented at an angle relative to the sides of the body 701. For example, the output ports 711 may face at least partially towards the bottom of the body 701. In some implementations, the sides of the body 701 that define the tiers 712 include one or more angled sections having downwardly facing portions.

In accordance with some aspects, the cover 702 may be locked in the closed position using a locking arrangement 726. In some implementations, the locking arrangement 726 includes one or more apertures defined in the cover 702 and body 701 through each of which a fastener or lock may extend. In certain implementations, the apertures defined in the cover 702 are located at recessed sections 728 of the cover 702. In one example implementations, the cover 702 defines side apertures configured to receive fasteners (e.g., screws) and a bottom aperture configured to receive a securing screw or padlock. In some implementations, at least one of the apertures is sized to accommodate a carabiner or other fastener inserted through one of to facilitate deployment of the housing 700. In other implementations, a separate deployment flange and aperture may be provided on the housing to accommodate the carabiner.

Figure 45:
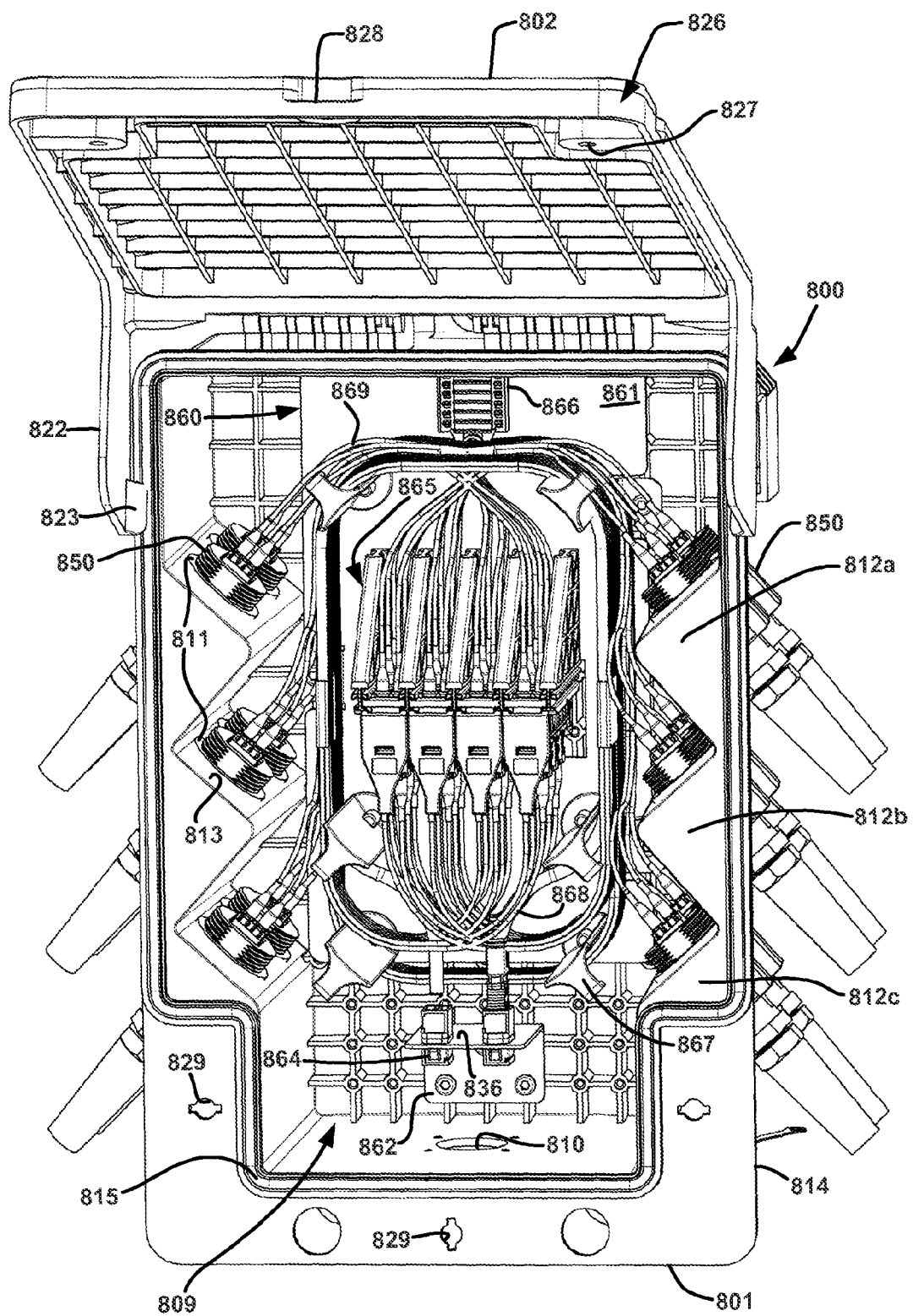
FIG. 45 is a front perspective view of an example aggregation box having a cover in an open position and having an example fiber optic component panel installed inside an interior of the box, the example fiber optic component having first pigtails extending from an MPO connector to multiple sliding adapter modules and having second pigtails extending from the sliding adapter modules to output ports located at both sides of the box.
Figure 46:
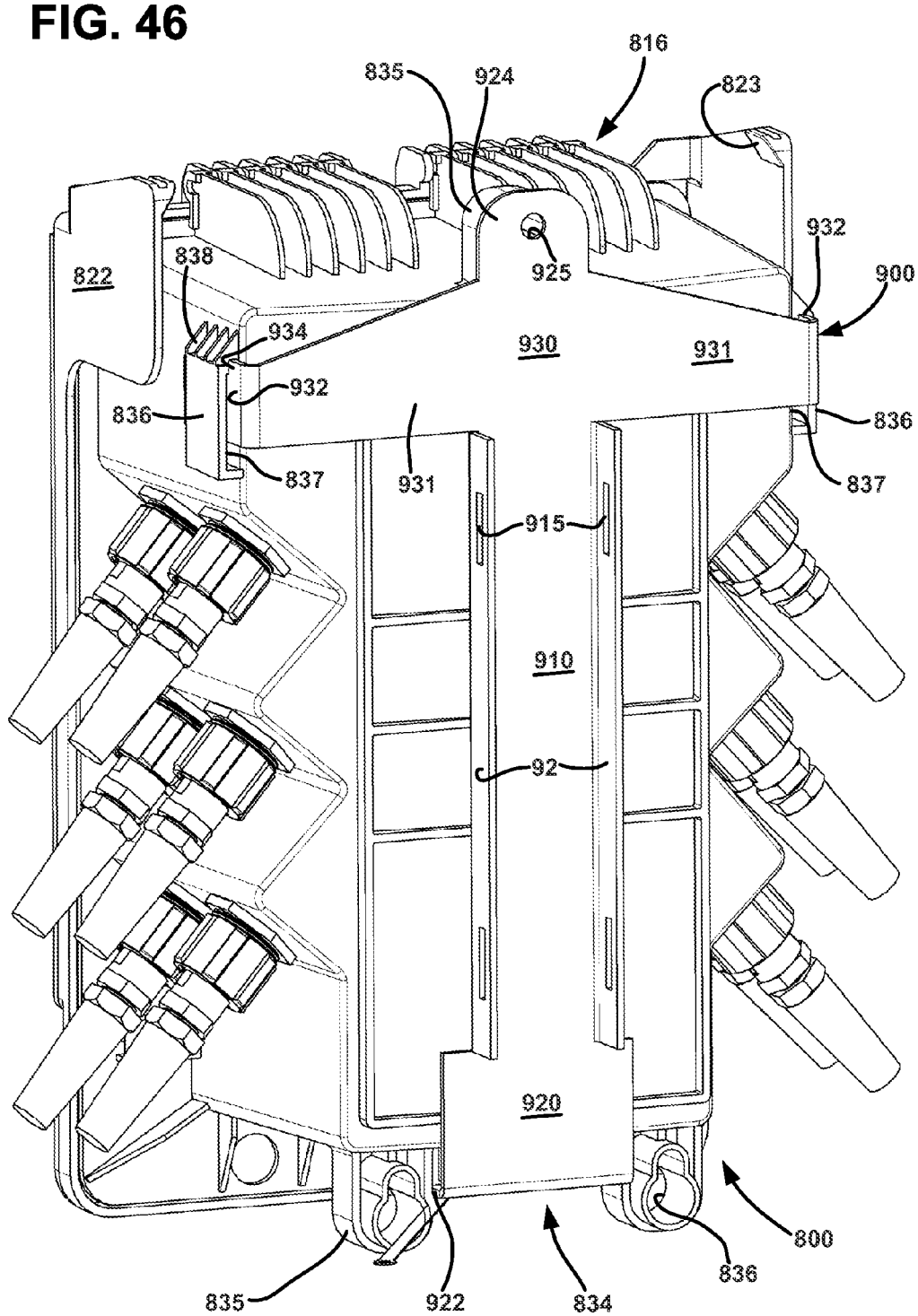
FIG. 46 is a rear perspective view of the aggregation box of claim 45 with the cover in the closed position and a mounting bracket secured to a rear wall of the box.

FIGS. 45 and 46 are front and rear perspective views of another example implementation 800 of an aggregation box. The housing 800 includes a body 801 defining an interior 809. A cover 802 is attached to the body 801 and selectively provides and inhibits access to the interior 809 of the body 801 from the front. For example, the cover 802 is configured to move between a closed position (see FIG. 46) and an open position (see FIG. 45). In some implementations, the body 801 and/or cover 802 are formed from plastic. In other implementations, the body 801 and/or cover 802 are formed from metal. In still other implementations, portions the body 801 and cover 802 are formed from plastic.

The body 801 includes a brim 814 that extends around the front of the body 801. In some implementations, the interior 809 of the body 801 has an open front defined by an inner perimeter of the brim 814. Cable input ports 810 are defined through a bottom of the body 801 to enable incoming cables (e.g., cables 124, 128 of FIG. 1) to enter the interior 809 of the body 801. Cable output ports 811 are defined through at least the first side of the body 801 to enable outgoing cables to exit the interior 809 of the body 801. In the example shown, cable output ports 811 also are defined through the second side of the body 801. Sealing structures (e.g., glands, optical adapters, electrical sockets, etc.) 850 may be disposed in the ports 810, 811.

In certain implementations, the brim 814 is sufficiently sized to inhibit access to the input ports 810 and/or output ports 811 from the front of the body 801. For example, the brim 814 may be sufficiently large to extend at least partially in front of any sealing structures 850 disposed at the ports 810, 811. In certain implementations, the brim 814 is sufficiently large to extend fully in front of any sealing structures 850 disposed at the ports 810, 811. In some implementations, the brim 814 is larger (i.e., extends further outwardly) at the bottom of the body 801 than at the top.

In some implementations, the cable output ports 811 are disposed in rows or tiers 812. In the example shown, the output ports 811 are disposed in three tiers 812*a*, 812*b*, 812*c* on each side of the body 801. In other implementations, however, the output ports 811 may be disposed in a greater or lesser number of tiers 812. In the example shown, each tier 812 includes two output ports 811. In other implementations, each tier 812 may include a greater or lesser number of ports 811. In the example shown, the ports 811 within each tier 812 laterally align with each other and the ports 811 of adjacent tiers 812 longitudinally align with each other. In other implementations, the output ports 811 may be staggered.

In some implementations, the output ports 811 are oriented at an angle relative to the sides of the body 801. For example, the output ports 811 may face at least partially towards the bottom of the body 801. The sides that define the output ports

811 include one or more angled sections. In certain implementations, the sides that do not define output ports 811 may define an inward ledge 813. In certain implementations, an outer periphery of the brim 814 extends outwardly beyond an outer periphery defined by the angled tiers 812.

In some implementations, a gasket channel 815 is disposed around an inner perimeter of the open front of the body 801. In certain implementations, the cover 802 has a corresponding gasket region that aligns with the gasket channel 815 of the body 801. A gasket (e.g., a rubber ring, a foam, a gel, etc.) may be disposed in the gasket channel 815 to seal the interior 809 from the environment when the cover 802 is in the closed position relative to the body 801. In still other implementations, the body 801 and cover 802 fit together to seal the interior 809 without a separate gasket. In still other implementations, the interior 809 is not sealed.

In some implementations, the cover 802 is configured to pivot relative to the body 801. For example, the cover 802 may be attached to the body 801 at a hinge arrangement 816 (FIG. 46). In certain implementations, the hinge arrangement 816 is disposed at a top of the body 801 and extends side-to-side. In other implementations, however, a laterally-extending hinge arrangement may be disposed at the bottom of the body 801. In still other implementations, a longitudinally-extending hinge arrangement may be disposed at either side of the body 801.

In accordance with some aspects, the cover 802 may be retained in the open position (FIG. 45) by a retaining arrangement 820. In some implementations, the retaining arrangement 820 is located on the cover 802. In certain implementations, the cover 802 includes a main section that extends over the front of the body interior 809. The cover 802 also includes wings 822 that extend rearward from opposite sides of the main section at the top. Each wing 822 includes a tab 823 that extends inwardly from the wing 822. Each tab 223 defines a ramp and a shoulder. When the cover is closed, the tab 823 is disposed at a position raised above the top of the body 801 (see FIG. 46). As the cover 802 is rotated to the open position, the wings 822 slide downwardly and forwardly along the sides of the body 801 and the tabs 823 slide over the brim 814 of the body 801. In some implementations, the wings 822 flex outwardly to enable the ramps of the tabs 823 to cam over the brim 814. The shoulders of the tabs 823 seat on the brim 814 to hold the cover 802 in the open position.

In accordance with some aspects, the cover 802 may be locked in the closed position using a locking arrangement 826. In some implementations, the locking arrangement 826 includes one or more apertures 827, 829 defined in the cover 802 and body 801, respectively, through each of which a fastener or lock may extend. In certain implementations, the apertures 827 defined in the cover 802 are located at recessed sections 828 of the cover 802. In one example implementations, side apertures 827, 829 are configured to receive screws and a bottom aperture 827, 829 is configured to receive a securing screw or padlock. In some implementations, at least one of the apertures 827, 829 is sized to accommodate a carabiner or other fastener inserted through one of to facilitate deployment of the housing 800. In other implementations, a separate deployment flange and aperture may be provided on the housing to accommodate the carabiner.

In the example aggregation box 800 shown, the body 801 houses an example optical fiber component panel 860 of FIGS. 39-41. The component panel 860 includes a panel base 861 that is mounted to an inner surface of the rear wall of the body 801. One or more optical components are mounted to the panel base 861. In accordance with some aspects, the component panel 860 is installed at the factory or manufacturing center prior to deployment at the tower. In other implementations, the component panel 860 may be installed at the antenna tower 110.

In the example shown, the component panel 860 includes an input interface bracket 862 disposed adjacent the input port 810 so that an incoming cable received at the input port 810 may be routed to the interface bracket 862. In some implementations, the input interface bracket 862 is mounted to the panel base 861. In other implementations, the input interface bracket 862 is separately mounted to the interior 809 of the body 801. The interface bracket 862 includes a shelf 863 holding one or more optical adapters 864 having ports facing the input port 810. In certain implementations, the shelf 863 is configured to hold two optical adapters 864. In the example shown, the optical adapters 864 are MPO adapters. In other implementations, other types of optical adapters may be utilized.

The component panel 860 also includes one or more sliding adapter modules 865. Each sliding adapter module includes a plurality of optical adapters mounted to a module housing that is slidingly coupled to a frame. Each module 865 is independently movable along the frame between an extended position and a retracted position. In certain implementations, the sliding adapter modules 865 are oriented so that first ports face towards the interface bracket 862. In certain implementations, the first ports of the adapter modules 865 face towards ports of the adapters 864 held at the interface bracket 862. In the example shown, the first ports of the sliding adapter modules 865 face downwardly.

In some implementations, one or more connectorized pigtails 868 are plugged into the first ports of the sliding adapter modules 865. Distal ends of two or more of the pigtails 868 are terminated at a common optical connector (e.g., an MPO connector). Excess length of the pigtails 868 may be stored within the interior 809 of the body 801 by wrapping the excess length around the component panel 860. For example, in some implementations, the component panel 860 includes bend radius limiters 867 or other fiber management structures to guide the excess length in one or more storage loops. Sufficient slack length is stored to enable each sliding adapter module 865 to be moved to the extended position.

One or more connectorized pigtails 869 may be plugged into second ports of the sliding adapter modules 865 to align with the connectorized ends of the pigtails 868 plugged into the first ports of the sliding adapter modules 865. The pigtails 869 are routed from the second ports of the sliding adapter modules 865 to connector interfaces disposed at the output ports 811. In some implementations, the connector interfaces include duplex fiber optic adapters (FIG. 45). In other implementations, the connector interfaces may include any desired type of optical adapter. In some implementations, the connector interfaces are sealed (e.g., the optical adapters may be disposed in a ruggedized body that is environmentally sealed). The connector interfaces may be configured to receive connectorized ends of the outgoing cables routed to the RRHs. In certain implementations, excess length of the pigtails 869 is stored within the body interior 809 by wrapping the excess length around the bend radius limiters 867.

In some implementations, the component panel 860 also includes a splice mounting region 866. In the example shown, the splice mounting region 866 is located at a top of the component panel 860. In other implementations, however the splice mounting region 866 may be located at any desired position on the component panel 860. In some implementations, the splice mounting region 866 includes fingers configured to hold one or more optical splices (e.g., within a protection sleeve). In other implementations the splice mounting region 866 is configured to receive one or more splice cassettes.

In accordance with some aspects, the housing 800 includes a mounting arrangement 834 that is configured to secure the housing 800 to a surface or object. In some implementations, the mounting arrangement 834 includes one or more mounting flanges 835 disposed on the rear of the body 801. Apertures 836 extend through the flanges 835 to enable a fastener to pass through to secure the housing 800 to a surface. In the example shown, one mounting flange 835 is disposed at a top, central portion of the body 801 and two mounting flanges 835 are disposed at a bottom, portion of the body 801. In other implementations, a greater or lesser number of mounting flanges 835 may be disposed in any desired location on the body 801.

In some implementations, the housing 800 may be secured to an object (e.g., a telephone pole, an antenna tower pole, etc.) with which one or more wrap-around elements (e.g., cords, straps, or chains) as disclosed herein. In certain implementations, the housing 800 is configured to secure to a mounting bracket 900 that engages the wrap-around elements. FIG. 46 illustrates one example bracket 900 that is constructed and adapted to receive two wrap-around elements. In the example shown in FIG. 46, the bracket 900 is generally T-shaped. In other implementations, however, the bracket 900 may be have desired shape.

The bracket 900 includes a longitudinal section 910 that extends at least partially between the top and bottom of the body 801. In certain implementations, the longitudinal section 910 includes retaining flanges 912 that extend rearwardly from the longitudinal section 910. The retaining flanges 912 define slots 915 that are configured to receive the wrap-around element threaded there-through. In the example shown, the retaining flanges 912 define two sets of aligned slots 915 to cooperate with two wrap-around elements. In other implementations, the retaining flanges 912 define any desired number of slots 915.

The bracket 900 also includes mounting flanges 920, 924 at which the bracket 900 is secured to the body 801. In certain implementations the flanges 920, 924 secure the bracket 900 to a rear of the body 801. In some implementations, a bottom mounting flange 920 includes a hooked portion 922 that wraps around a portion of the body 801 (e.g., see FIG. 44). In certain implementations, the hooked portion 922 extends between two bottom mounting flanges 835. The top mounting flange 924 defines an aperture 925 that aligns with an aperture defined in a top mounting flange 835. A fastener may be inserted through the top mounting flange 835 of the body 801 and the top mounting flange 924 of the bracket 900 to secure the bracket 900 to the body 801.

In some implementations, the bracket 900 also may include a cross-piece 930 formed by two arms 931 extending sideways from the longitudinal section 910. Each arm 931 includes a finger 932 that extends forwardly of the arm 931. For example, a distal end of each arm 931 may be bent to form a finger 932. The fingers 932 may be slid through passages 837 defined by tab arrangements 836 disposed at the sides of the body 801. In certain implementations, a tab arrangement 836 is disposed at a top of each side of the body 801. In certain implementations, each finger 932 defines a notch 934 that engages a portion 838 of the tab arrangement 836 to further secure the bracket 900 to the body 801.

In accordance with some aspects of the disclosure, an example aggregation enclosure includes a body defining at least one input port defined through a bottom of the body and at least one output port defined through a first side of the body. A rear of the body is configured to face a mounting location when the body is secured to the mounting location. A first sealing structure is disposed in the output port to environmentally seal the interior of the body. A second sealing structure is disposed in the input port to environmentally seal the interior of the body. In certain implementations, optical and/or electrical components are disposed within the body.

In accordance with some aspects of the disclosure, an example cellular network system includes an elevated location at which at least a first RRH and at least one antenna are located. The antenna is cabled to the first RRH. Base station equipment is disposed at a location spaced from the elevated location. At least a first aggregation box is disposed at the elevated location. The bottom of the aggregation box defines at least one sealed input port and at least one of the sides of the aggregation box defines at least one sealed output port. At least one incoming cable rises from the base station equipment to the input port of the first aggregation box at the elevated location. At least one outgoing cable is routed between the first RRH and the sealed output port at the side of the first aggregation box. In certain implementations, the elevated location is outdoors.

In accordance with some aspects of the disclosure, an example aggregation enclosure includes a body including a rear wall extending between opposite side walls and between a top wall and a bottom wall to define an interior. The rear wall defines a major surface of the body and the side walls define minor surfaces of the body. The body defines an open front that provides access to the interior. The body also defines at least one input port through the bottom wall and at least one output port through a first of the side walls. The rear wall of the body is constructed and adapted to be secured to a mounting location. A cover is pivotally coupled to the body to move between a closed position and an open position. The cover extends across at least a portion of the open front when in the closed position and the cover allows access to the interior of the body through the open front when in the open position. A sealing structure is disposed in the output port to environmentally seal the interior of the body.

In accordance with some aspects of the disclosure, an example aggregation enclosure includes a body including a rear wall extending between opposite side walls and between a top wall and a bottom wall to define an interior. The body defines an open front that provides access to the interior. The body also defines at least one input port through the bottom wall and at least one output port through a first of the side walls. The rear wall of the body is constructed and adapted to be secured to a mounting location. A cover is pivotally coupled to the body to move between a closed position and an open position. A component panel is disposed within the interior of the body. The component panel includes at least one component arrangement that is configured to connect an incoming cable and an outgoing cable. The component arrangement has at least a first port that generally faces the input port and at least a second port that generally faces the output port.

In some implementations, the component arrangement includes a first termination module defining the first port that faces downwardly towards the bottom wall of the body. The component arrangement also includes a connection module defining a second port that faces sideways towards the first side wall of the body. The first termination module and the connection module are connected by at least one intermediate cable. In certain implementations, the first termination module is disposed at a first terminal rail and the connection module is disposed at a second terminal rail located above the first terminal rail. In one implementation, the first terminal rail is oriented to extend generally horizontally within the housing and the second terminal rail is oriented to extend generally vertically within the housing. In other implementations, the first termination module includes a fiber optic adapter and the connection module includes at least one sliding adapter module.

In accordance with some aspects of the disclosure, an example cellular network system includes a hut including base station equipment; at least one antenna tower located adjacent the hut, and at least a first aggregation box disposed on the antenna tower. The antenna tower includes at least a first RRH and at least one antenna located at a top of the antenna tower. The antenna is cabled to the first RRH. The first aggregation box has a rear wall, a top wall, a bottom wall, a first side wall, and a second side wall defining an interior. The bottom wall defines at least one input port. The first side wall defines a plurality of output ports angled at least partially downwardly. At least one incoming cable runs from the base station equipment in the hut, vertically up the antenna tower, to the input port of the first aggregation box. At least one outgoing cable routed between the first RRH and one of the output ports at the first side wall of the first aggregation box.

In accordance with some aspects of the disclosure, an example method of deploying an aggregation box having at least one component includes disposing a aggregation box at an elevated location; vertically routing an incoming cable to a sealed input port located at a bottom of the aggregation box and connecting the incoming cable to the component; and routing an outgoing cable to a sealed output port located at a side of the aggregation box and connecting the outgoing cable to the component so that the outgoing cable and the incoming cable are connected through the component. In certain implementations, the method also includes pivoting a cover to an open position and locking the cover in the open position.

Having described the preferred aspects and implementations of the present disclosure, modifications and equivalents of the disclosed concepts may readily occur to one skilled in the art. However, it is intended that such modifications and equivalents be included within the scope of the claims which are appended hereto.

What is claimed is:

1. An enclosure assembly comprising:
an enclosure including a first housing part and a second housing part that cooperate to define a sealed interior of the enclosure, the enclosure being elongated between a first end and a second end, the enclosure defining an input port at the first end, the enclosure including first and second sides extending between the first end and the second end;
an optical line extending into the interior of the enclosure through the input port;
a power line extending into the interior of the enclosure through the input port; and
a plurality of output ports disposed at the enclosure, the output ports including sealing structures that seal the interior of the enclosure from an external environment of the enclosure, the sealing structures including ruggedized connection interfaces so that hybrid output cables received at the ruggedized connection interfaces are optically coupled to the optical line and electrically connected to the power line, the output ports including a plurality of first output ports disposed along the first side of the enclosure and a plurality of second output ports disposed along the second side of the enclosure.

2. The enclosure assembly of claim 1, wherein the optical line includes a plurality of optical fibers extending into the interior of the enclosure through the input port.

3. The enclosure assembly of claim 2, wherein the input port includes a pass-through gland.

4. The enclosure assembly of claim 1, wherein each of the first output ports is configured to receive a plurality of output cables.

5. The enclosure assembly of claim 1, wherein each of the first output ports is configured to receive a single output cable.

6. The enclosure assembly of claim 1, wherein each of the first output ports includes an optical adapter.

7. The enclosure assembly of claim 6, wherein each optical adapter is configured to receive duplex fiber optic connectors.

8. The enclosure of claim 1, wherein each of the first output ports includes an electrical socket.

9. The enclosure assembly of claim 1, wherein the first sealing structures are configured to provide optical strain-relief to optical cables received thereat.

10. The enclosure assembly of claim 1, wherein the plurality of first output ports includes three output ports.

11. The enclosure assembly of claim 10, wherein the plurality of second output ports includes three output ports.

12. The enclosure assembly of claim 1, wherein the plurality of first and second output ports are laterally aligned.

13. The enclosure assembly of claim 1, wherein some output ports of the first and second output ports are longitudinally aligned.

14. The enclosure assembly of claim 1, wherein the power line includes at least one conductor that is not pre-terminated.

15. The enclosure assembly of claim 1, wherein the power line includes at least one conductor that is pre-terminated at a plug.

16. The enclosure assembly of claim 1, wherein the optical line includes optical fibers separately terminated by single-fiber connectors.

17. The enclosure assembly of claim 1, wherein the optical line and the power line are part of a hybrid cable extending to the input port.

18. The enclosure assembly of claim 1, wherein the enclosure is configured to mount to an antenna tower.

19. The enclosure assembly of claim 1, wherein the input port is defined at a bottom of the enclosure.

20. The enclosure assembly of claim 1, further comprising a gasket disposed between the first and second housing parts to seal the interior of the enclosure.

21. The enclosure assembly of claim 1, further comprising a mounting arrangement including a mounting flange defining an aperture.

* * * * *